(12) United States Patent
Goh et al.

(10) Patent No.: US 11,762,240 B2
(45) Date of Patent: Sep. 19, 2023

(54) SIDE-EDGE TYPE SURFACE LIGHT EMITTING APPARATUS HAVING LIGHT GUIDE PLATE SANDWICHED BY UPPER AND LOWER PRISM SHEETS

(71) Applicant: Stanley Electric Co., Ltd., Tokyo (JP)

(72) Inventors: Lingwei Goh, Tokyo (JP); Yoji Oki, Tokyo (JP)

(73) Assignee: STANLEY ELECTRIC CO., LTD., Tokyo (JP)

(*) Notice: Subject to any disclaimer, the term of this patent is extended or adjusted under 35 U.S.C. 154(b) by 0 days.

(21) Appl. No.: 17/811,464

(22) Filed: Jul. 8, 2022

(65) Prior Publication Data

US 2023/0013111 A1  Jan. 19, 2023

(30) Foreign Application Priority Data

Jul. 15, 2021 (JP) .................. 2021-116940

(51) Int. Cl.
*G02F 1/13357* (2006.01)
*G02F 1/1335* (2006.01)

(52) U.S. Cl.
CPC .. *G02F 1/133615* (2013.01); *G02F 1/133603* (2013.01); *G02F 1/133607* (2021.01)

(58) Field of Classification Search
CPC ......... G02F 1/133615; G02F 1/133607; G02F 1/133603
See application file for complete search history.

(56) References Cited

U.S. PATENT DOCUMENTS

| | | |
|---|---|---|
| 6,846,089 B2 | 1/2005 | Stevenson et al. |
| 10,684,405 B2 | 6/2020 | Oki et al. |
| 2019/0346614 A1* | 11/2019 | Joo ........................ G02B 6/0058 |
| 2020/0054202 A1* | 2/2020 | Yamamoto .......... A61B 1/00096 |
| 2021/0325597 A1* | 10/2021 | Wang ................... G02B 6/0055 |

* cited by examiner

*Primary Examiner* — Lucy P Chien
(74) *Attorney, Agent, or Firm* — Kenealy Vaidya LLP

(57) ABSTRACT

A side-edge type surface light emitting apparatus includes: a light guide plate having a first light emitting surface, a light distribution controlling surface, and a light incident surface; a light source; an upper prism sheet disposed on the upper side of the light guide plate, the upper prism sheet having multiple first prisms on a lower side and a second light emitting surface on an upper side; and a first lower prism sheet disposed on the lower side of the light guide plate, the first lower prism sheet having multiple second prims on an upper side and a first flat surface on a lower side.

20 Claims, 64 Drawing Sheets

Fig.9C

TRAVERSE(Y-DIRECTION)
PRIVACY EFFECT

| APPARATUS | | Fig.48<br>(PRIOR ART) | Fig.1<br>(1st EMBODIMENT) |
|---|---|---|---|
| $I_1/I_0$ | −35deg | 1.74% | 1.82% |
| | 35deg | 1.34% | 2.24% |
| | AVE | 1.54% | 2.03% |
| $I_2/I_0$ | −45deg | 0.48% | 0.56% |
| | 45deg | 0.35% | 0.76% |
| | AVE | 0.41% | 0.66% |

Fig.11C

LONGITUDINAL(X-DIRECTION)
PRIVACY EFFECT

| APPARATUS | | Fig.48 (PRIOR ART) | Fig.1 (1st EMBODIMENT) |
|---|---|---|---|
| $I_1/I_0$ | −35deg | 0.50% | 0.75% |
| | 35deg | 0.74% | 0.71% |
| | AVE | 0.62% | 0.73% |
| $I_2/I_0$ | −45deg | 0.37% | 0.50% |
| | 45deg | 0.55% | 0.74% |
| | AVE | 0.46% | 0.62% |

LONGITUDINAL(X-DIRECTION) PRIVACY EFFECT $I_1/I_0$

LONGITUDINAL(X-DIRECTION) PRIVACY EFFECT $I_2/I_0$

TRAVERSE(Y-DIRECTION) ABSOLUTE LUMINOUS INTENSITY

TRAVERSE(Y-DIRECTION) RELATIVE LUMINOUS INTENSITY

Fig.15C

TRAVERSE(Y-DIRECTION) PRIVACY EFFECT

| APPARATUS | | Fig.48 (PRIOR ART) | Fig.13 (2nd EMBODIMENT) |
|---|---|---|---|
| $I_1/I_0$ | −35deg | 1.74% | 1.72% |
| | 35deg | 1.34% | 1.74% |
| | AVE | 1.54% | 1.73% |
| $I_2/I_0$ | −45deg | 0.48% | 0.55% |
| | 45deg | 0.35% | 0.57% |
| | AVE | 0.41% | 0.56% |

Fig.17C

LONGITUDINAL(X-DIRECTION)
PRIVACY EFFECT

| APPARATUS | | Fig.48 (PRIOR ART) | Fig.13 (2nd EMBODIMENT) |
|---|---|---|---|
| $I_1/I_0$ | −35deg | 0.50% | 0.51% |
| | 35deg | 0.75% | 0.45% |
| | AVE | 0.62% | 0.48% |
| $I_2/I_0$ | −45deg | 0.37% | 0.29% |
| | 45deg | 0.55% | 0.51% |
| | AVE | 0.46% | 0.40% |

Fig.21C

TRAVERSE(Y-DIRECTION)
PRIVACY EFFECT

| APPARATUS | | Fig.48 (PRIOR ART) | Fig.19 (COMPARATIVE) |
|---|---|---|---|
| $I_1/I_0$ | −35deg | 1.74% | 0.66% |
| | 35deg | 1.34% | 0.81% |
| | AVE | 1.54% | 0.73% |
| $I_2/I_0$ | −45deg | 0.48% | 0.34% |
| | 45deg | 0.35% | 0.46% |
| | AVE | 0.41% | 0.40% |

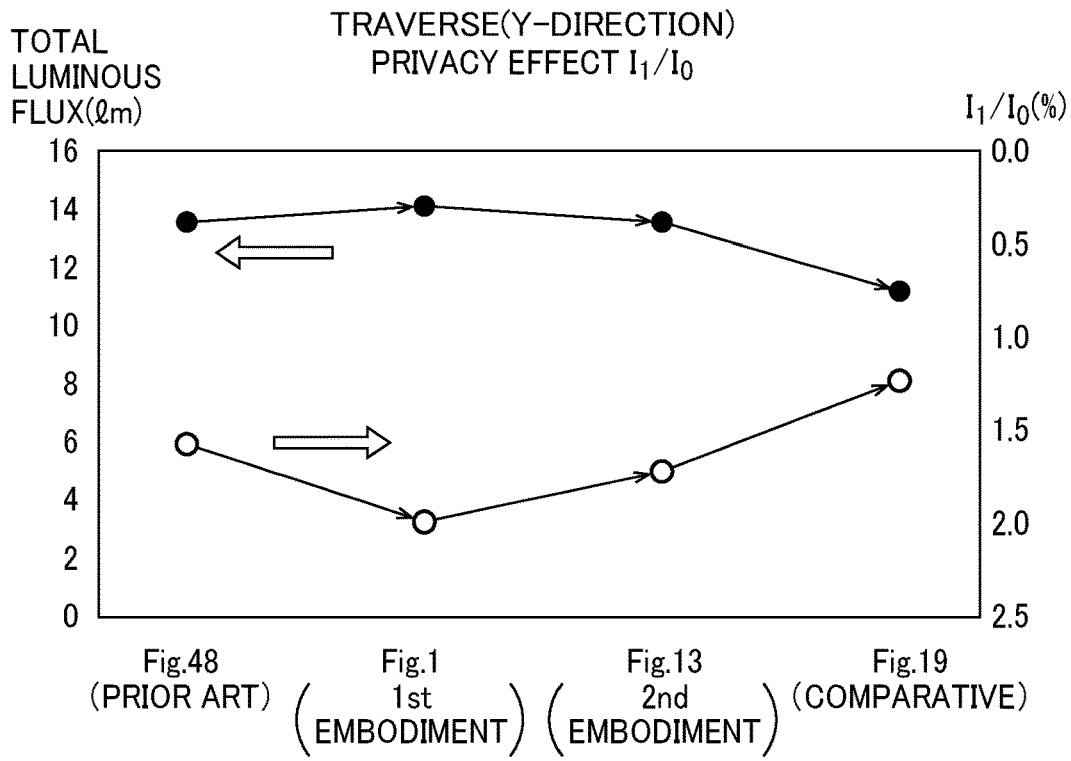
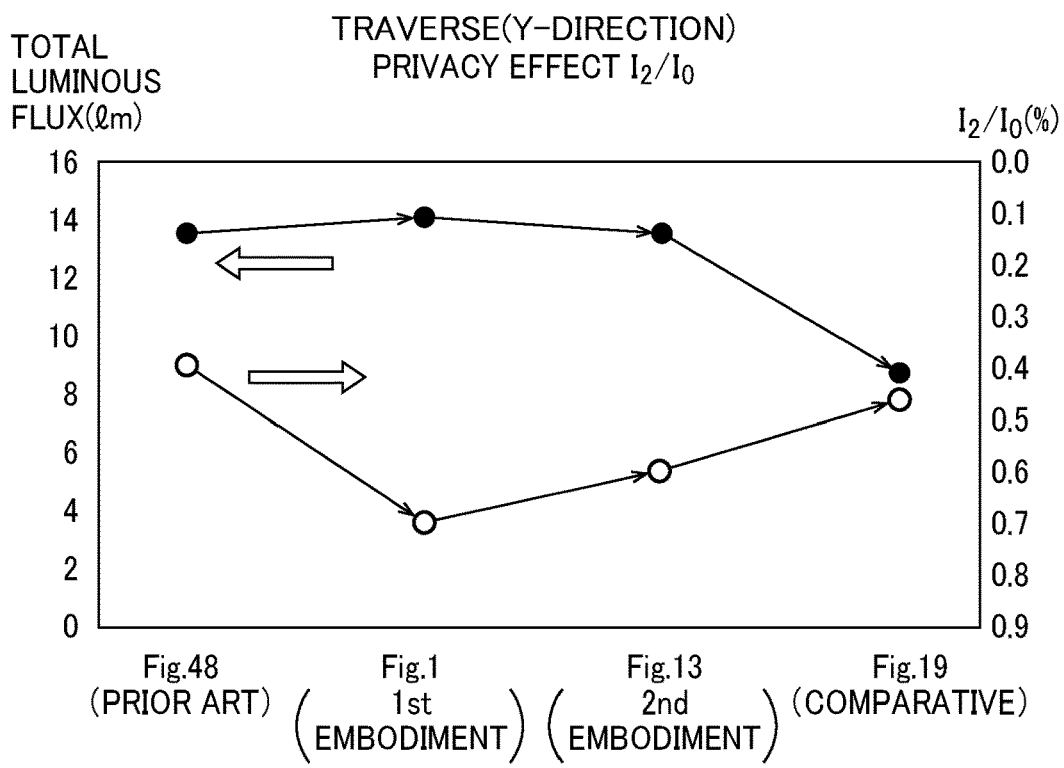

Fig.23C

LONGITUDINAL(X-DIRECTION)
PRIVACY EFFECT

| APPARATUS | | Fig.48 (PRIOR ART) | Fig.19 (COMPARATIVE) |
|---|---|---|---|
| $I_1/I_0$ | −35deg | 0.50% | 0.47% |
| | 35deg | 0.74% | 0.30% |
| | AVE | 0.62% | 0.39% |
| $I_2/I_0$ | −45deg | 0.37% | 0.41% |
| | 45deg | 0.55% | 0.49% |
| | AVE | 0.46% | 0.45% |

Fig.28C

TRAVERSE(Y-DIRECTION)
PRIVACY EFFECT

| APPARATUS | | Fig.48<br>(PRIOR ART) | Fig.25<br>(3rd EMBODIMENT) |
|---|---|---|---|
| $I_1/I_0$ | −35deg | 1.74% | 2.22% |
| | 35deg | 1.34% | 1.92% |
| | AVE | 1.54% | 2.07% |
| $I_2/I_0$ | −45deg | 0.48% | 0.82% |
| | 45deg | 0.35% | 0.89% |
| | AVE | 0.41% | 0.86% |

Fig.30C

LONGITUDINAL(X-DIRECTION)
PRIVACY EFFECT

| APPARATUS | | Fig.48 (PRIOR ART) | Fig.25 (3rd EMBODIMENT) |
|---|---|---|---|
| $I_1/I_0$ | −35deg | 0.50% | 0.87% |
| | 35deg | 0.74% | 0.84% |
| | AVE | 0.62% | 0.85% |
| $I_2/I_0$ | −45deg | 0.37% | 0.51% |
| | 45deg | 0.55% | 0.50% |
| | AVE | 0.46% | 0.50% |

Fig.34C

TRAVERSE(Y-DIRECTION)
PRIVACY EFFECT

| APPARATUS | | Fig.48 (PRIOR ART) | Fig.32 (4-th EMBODIMENT) |
|---|---|---|---|
| $I_1/I_0$ | −35deg | 1.74% | 1.96% |
| | 35deg | 1.34% | 2.07% |
| | AVE | 1.54% | 2.01% |
| $I_2/I_0$ | −45deg | 0.48% | 0.76% |
| | 45deg | 0.35% | 0.71% |
| | AVE | 0.41% | 0.74% |

Fig.36C

LONGITUDINAL(X-DIRECTION)
PRIVACY EFFECT

| APPARATUS | | Fig.48 (PRIOR ART) | Fig.32 (4-th EMBODIMENT) |
|---|---|---|---|
| $I_1/I_0$ | −35deg | 0.50% | 0.74% |
| | 35deg | 0.74% | 0.65% |
| | AVE | 0.62% | 0.69% |
| $I_2/I_0$ | −45deg | 0.37% | 0.34% |
| | 45deg | 0.55% | 0.59% |
| | AVE | 0.46% | 0.46% |

Fig.40C

TRAVERSE(Y-DIRECTION)
PRIVACY EFFECT

| APPARATUS | | Fig.48 (PRIOR ART) | Fig.38 (5-th EMBODIMENT) |
|---|---|---|---|
| $I_1/I_0$ | −35deg | 1.74% | 1.55% |
| | 35deg | 1.34% | 1.53% |
| | AVE | 1.54% | 1.54% |
| $I_2/I_0$ | −45deg | 0.48% | 0.54% |
| | 45deg | 0.35% | 0.43% |
| | AVE | 0.41% | 0.49% |

Fig.42C

LONGITUDINAL(X-DIRECTION)
PRIVACY EFFECT

| APPARATUS | | Fig.48 (PRIOR ART) | Fig.38 (5-th EMBODIMENT) |
|---|---|---|---|
| $I_1/I_0$ | −35deg | 0.50% | 0.40% |
| | 35deg | 0.74% | 0.51% |
| | AVE | 0.62% | 0.45% |
| $I_2/I_0$ | −45deg | 0.37% | 0.24% |
| | 45deg | 0.55% | 0.44% |
| | AVE | 0.46% | 0.34% |

Fig.45A

AVERAGE LUMINOUS INTENSITY
CORRESPONDING TO
TOTAL LUMINOUS FLUX

| APPARATUS | Fig.48 (PRIOR ART) | Fig.38 by Fig.44 | IMPROVEMENT RATIO | Fig.38 5-th (EMBODIMENT) |
|---|---|---|---|---|
| AVE.LUMINOUS INTENSITY | 24843(cd/m$^2$) | 24275(cd/m$^2$) | – | – |
| RATIO | 100% | 97.7% | – | 99.9% |

Fig.45B

TRAVERSE(Y-DIRECTION)
PRIVACY EFFECT

| APPARATUS | | Fig.48 (PRIOR ART) | Fig.38 by Fig.44 | IMPROVEMENT RATIO | Fig.38 5-th (EMBODIMENT) |
|---|---|---|---|---|---|
| $I_1/I_0$ | −35deg | 2.82% | 2.36% | 16.31% | 10.9% |
| | 35deg | 2.80% | 2.35% | 16.07% | −14.2% |
| | AVE | 2.81% | 2.355% | 16.19% | 0.0% |
| $I_2/I_0$ | −45deg | 1.10% | 0.95% | 13.64% | −12.5% |
| | 45deg | 1.13% | 1.01% | 10.62% | −22.9% |
| | AVE | 1.115% | 0.98% | 12.135% | −19.5% |

(EXPERIMENT)   (SIMULATION)

Fig.45C

LONGITUDINAL(X-DIRECTION)
PRIVACY EFFECT

| APPARATUS | | Fig.48 (PRIOR ART) | Fig.38 by Fig.44 | IMPROVEMENT RATIO | Fig.38 5-th (EMBODIMENT) |
|---|---|---|---|---|---|
| $I_1/I_0$ | −35deg | 1.47% | 1.03% | 29.93% | 20.00% |
| | 35deg | 1.55% | 1.14% | 26.45% | 31.08% |
| | AVE | 2.46% | 1.085% | 28.19% | 27.42% |
| $I_2/I_0$ | −45deg | 0.99% | 0.65% | 34.34% | 35.14% |
| | 45deg | 1.10% | 0.78% | 29.09% | 20.00% |
| | AVE | 1.045% | 0.715% | 31.715% | 26.09% |

(EXPERIMENT)　(SIMULATION)

TRAVERSE(Y-DIRECTION)
ABSOLUTE LUMINOUS INTENSITY
PRIOR ART

TRAVERSE(Y-DIRECTION)
RELATIVE LUMINOUS INTENSITY
PRIOR ART

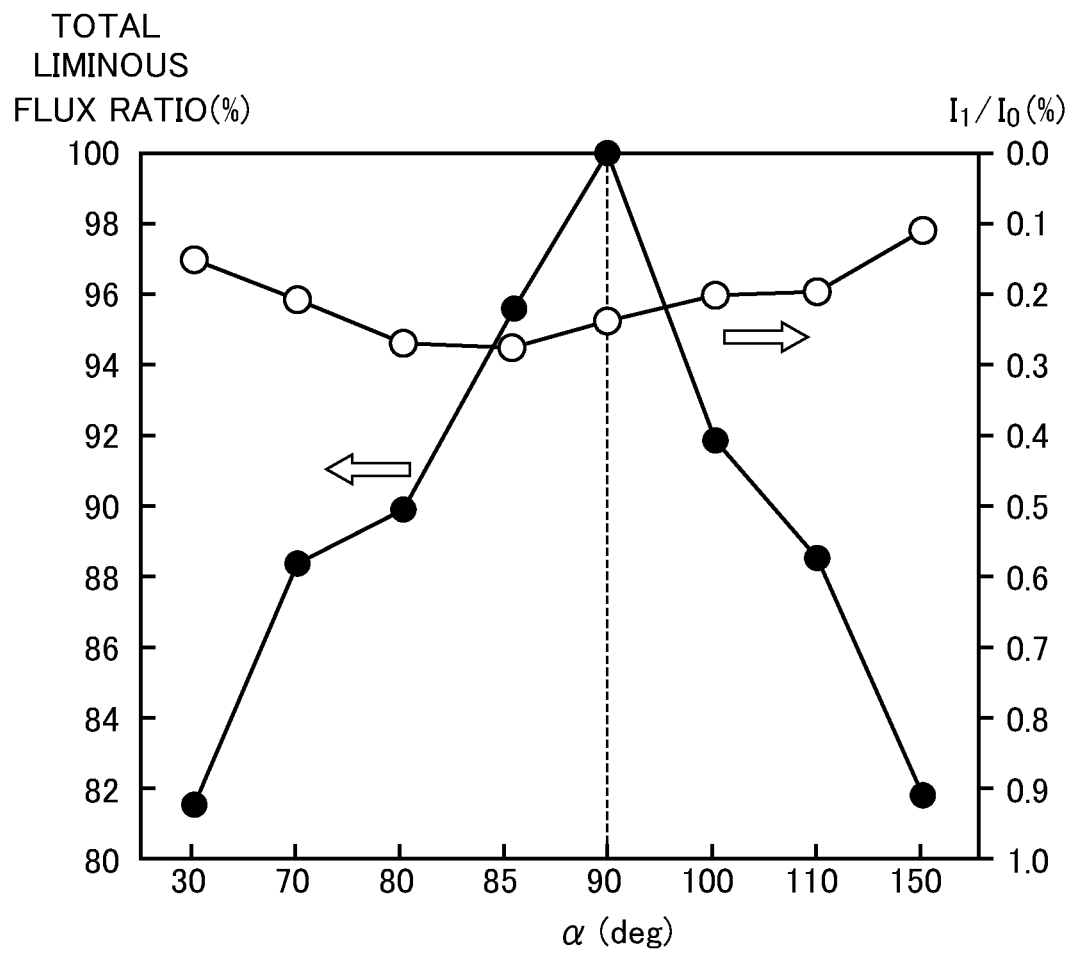

SIDE-EDGE TYPE SURFACE LIGHT EMITTING APPARATUS HAVING LIGHT GUIDE PLATE SANDWICHED BY UPPER AND LOWER PRISM SHEETS

This application claims the priority benefit under 35 U.S.C. § 119 to Japanese Patent Application No. JP2021-116940 filed on Jul. 15, 2021, which disclosure is hereby incorporated in its entirety by reference.

BACKGROUND

Field

The presently disclosed subject matter relates to a side-edge type surface light emitting apparatus.

Description of the Related Art

A side-edge type surface light emitting apparatus, which is constructed by a light guide plate with multiple light emitting elements such as light emitting diode (LED) elements disposed on the side thereof, has broadly been used as a backlight for a display unit such as a liquid crystal display (LCD) unit in terms of its thin and light structure. When the display unit is used in a public place, a narrow light distribution characteristic or a narrow-viewing characteristic is required to prevent others from viewing the display unit from the side. This is called the privacy effect.

FIG. 48 is a perspective view illustrating a prior art side-edge type surface light emitting apparatus (see: U.S. Pat. No. 10,684,405B2).

In FIG. 48, the prior art side-edge type surface light emitting apparatus is constructed by a double-face prism light guide plate 1 having an upper light emitting surface $S_e$, a lower light distribution controlling surface $S_d$ opposing the light emitting surface $S_e$, a light incident surface $S_{in}$ on the sides of the light emitting surface $S_e$ and the light distribution controlling surface $S_d$, multiple LED elements 2 disposed on the light incident surface $S_{in}$, a single-face prism upper prism sheet 3 including triangular prisms 31 along a Y-direction in parallel with the light incident surface $S_{in}$ and an upper flat light emitting surface 32 disposed on the light emitting surface $S_e$, a lower single-face lower prism sheet 4 including triangular prisms 41 along an X-direction perpendicular to the light incident surface $S_{in}$ and an upper flat surface 42 opposing the light distribution controlling surface $S_d$, and a light absorbing sheet (black sheet) 5 opposing the triangular prisms 41 of the lower prism sheet 4 for absorbing leakage light therefrom. As will be explained later with reference to FIG. 2, the light waveguide plate 1 is of a double structure which includes multiple upper prisms 11 formed along the perpendicular direction (X-direction) on the light emitting surface $S_e$ and multiple lower prisms 12 formed along the parallel direction (Y-direction) on the light distribution controlling surface $S_d$. Provided between the lower prism sheet 4 and the light absorption sheet 5 is an air-gap layer for securing the total reflection of the triangular prisms 41 of the lower prism sheet 4. That is, the light absorption sheet 5 is separated from the lower prism sheet 4. Also, an LCD panel (not shown) is provided outside of the upper prism sheet 3. Note that $I_0$, $I_1$ and $I_2$ are absolute luminous intensities at the azimuth θ=0°, ±35° and ±45° of the light emitting surface 32 of the upper prism sheet 3.

In FIG. 49, which is a traverse directional (Y-direction) cross-sectional view of the lower prism sheet 4 of FIG. 48, the lower prism sheet 4 is constructed by a series of equidistantly-disposed triangular prisms 41 perpendicular to the light incident surface $S_{in}$ (see: FIG. 48), and each of the prisms 41 has symmetrical straight-sloped surfaces 41-1 and 41-2 along the X-direction. The prisms 41 oppose the light absorbing sheet 5. In this case, the apical angle α between the straight-sloped surfaces 41-1 and 41-2 is 90°, for example.

In FIG. 50, which is a traverse directional (Y-direction) cross-sectional view for explaining the operation of the lower prism sheet 4 of FIG. 49, the light L2 leaked from the light distribution controlling surface $S_d$ of the light guide plate 1 is incident to the flat light incident surface 42 of the lower prism sheet 4.

The light L21 of the light L2, which has a relatively small incident angle to the flat light incident surface 42 of the lower prism sheet 4, is totally reflected by the straight-sloped surfaces 41-1 and 41-2 of the triangular prisms 41 and returns to the light guide plate 1. In this case, the incident angle of the light L21 to the straight-sloped surfaces 41-1 or 41-2 is larger than the critical angle of the lower prism sheet 4, so that the light L21 is totally reflected by the straight-sloped surface 41-1 or 41-2 to return to the light guide plate 1. As a result, 90% or more of the light L2 can be emitted from the upper prism sheet 3 at the azimuth θ between −35° and 35°, which would enhance the absolute luminous intensity $I_0$ at the azimuth θ=0° as illustrated in FIG. 51A, which is a traverse (Y-direction) absolute luminous intensity light distribution.

On the other hand, the light L22 of the light L2, which has a relatively large incident angle to the flat light incident surface 42 of the lower prism sheet 4, is refracted at the straight-sloped surface 41-1 or 41-2 of the triangular prism 41 and propagates to the light absorbing sheet 5. In this case, the incident angle of the light L22 to the straight-sloped surface 41-1 or 41-2 is smaller than the critical angle of the lower prism sheet 4. This would decrease the absolute luminous intensity $I_1$ at the azimuth θ=35° and θ=−35° and the absolute luminous intensity $I_2$ at the azimuth θ=45° and −45°, as illustrated in FIG. 51A. Therefore, as illustrated in FIG. 51B which is a traverse (Y-direction) relative luminous intensity light distribution, the relative luminous intensity $I_1/I_0$ at the azimuth θ=35° and θ=−35° and the relative luminous intensity $I_2/I_0$ at the azimuth θ=45° and θ=−45° would decrease, i.e., enhance the privacy effect.

Further, the light L23 of the light L2, which has a medium incident angle to the flat light incident surface 42, has an incident angle at the straight-sloped surface 41-1 or 41-2 of the lower prism sheet 4, which is a little larger than the critical angle thereof. In this case, the light L23 is totally reflected by the straight-sloped surface 41-1 or 41-2 to generate a broad light distribution whose luminous intensity is large outside the azimuth θ=−35° and θ=35°, which would increase the relative luminous intensities $I_1/I_0$ and $I_2/I_0$, to degrade the privacy effect. Note that, the closer to zero the relative luminous intensities $I_1/I_0$ and $I_2/I_0$ the better the privacy effect.

FIG. 52 shows the total luminous flux ratio (%) and the privacy effect $I_1/I_0$ with respect to the apical angle α of the prisms 41 of the lower prism sheet 4 of FIGS. 49 and 50. In FIG. 52, the total luminous flux ratio at the azimuth θ=0° is defined as 100% when the apical angle α is 90°.

As illustrated in FIG. 52, when the apical angle α is 90°, the total luminous flux ratio at the azimuth θ=0° is maximum. Also, when the apical angle α is 70°~110°, the total luminous flux ratio is larger than 88%, and when the apical angle α is 85°~100°, the total luminous flux ratio is larger than 90%. On the other hand, when the apical angle α is 85° to 100°, the privacy effect $I_1/I_0$ is slightly worse; however, this privacy effect is acceptable. Therefore, the apical angle α of the prisms 41 is 70° to 110°, preferably, 85° to 100°, and more preferably, the apical angle α of the prisms 41 is 90°.

As stated above, the privacy effect is described by using the traverse (Y-direction) absolute and relative luminous intensity light distributions; however, the same privacy effect would be described by the longitudinal (X-direction) luminous absolute and relative luminous intensity light distributions.

In the side-edge type surface light emitting apparatus of FIG. 48, however, since the air gap layer is present between the lower prism sheet 4 and the light absorbing sheet 5, and also, the apical portions of the triangular prisms 41 of the lower prism sheet 4 oppose the light absorbing sheet 5, the handling in the manufacturing steps would be troublesome, and also, contaminant matters could enter thereinto. Further, when the triangular prisms 41 of the lower prism sheet 4 are brought into contact with the light absorbing sheet 5 by external force, vibration and the like, the triangular prisms 41 and/or the light absorbing sheet 5 could be shaved to create fine defects. Particularly, since the light absorbing sheet 5 is black, the above-mentioned defects would serve as white or bright reflecting points, to decrease the manufacturing yield, i.e., increase the manufacturing cost.

SUMMARY

The presently disclosed subject matter seeks to solve one or more of the above-described problems.

According to the presently disclosed subject matter, a side-edge type surface light emitting apparatus includes: a light guide plate having a first light emitting surface on an upper side thereof, a light distribution controlling surface on a lower side thereof, and a light incident surface on sides of the first light emitting surface and the light distribution controlling surface; a light source disposed on the light incident surface of the light guide plate; an upper prism sheet disposed on the upper side of the light guide plate, the upper prism sheet having multiple first prisms on a lower side thereof opposing the first light emitting surface of the light guide plate and a second light emitting surface on an upper side thereof, the first prisms being in parallel with the light incident surface of the light guide plate; and a first lower prism sheet disposed on the lower side of the light guide plate, the first lower prism sheet having multiple second prims on an upper side thereof opposing the light distribution controlling surface of the light guide plate and a first flat surface on a lower side thereof, the second prisms being perpendicular to the light incident surface of the light guide plate.

According to the presently disclosed subject matter, since the outer surface of the lower prism sheet is flat, the handling in the manufacturing steps would be easy, and also, contaminant matters would not be inserted thereinto. Further, in the component carrying operations, fine defects are hardly generated.

BRIEF DESCRIPTION OF THE DRAWINGS

The above and other advantages and features of the presently disclosed subject matter will be more apparent from the following description of certain embodiments, taken in conjunction with the accompanying drawings, as compared with the prior art, wherein:

FIG. 9C is a table showing the privacy effect of the traverse (Y-direction) operation of FIG. 8A;

FIG. 11C is a table showing the privacy effect of the longitudinal (X-direction) operation of FIG. 8B;

FIG. 15C is a table showing the privacy effect of the traverse (Y-direction) operation of FIG. 14A;

FIG. 17C is a table showing the privacy effect of the longitudinal (X-direction) operation of FIG. 14B;

FIG. 21C is a table showing the privacy effect of the traverse (Y-direction) operation of FIG. 20A;

FIG. 22A is a graph showing the total luminous flux and the privacy effect $I_1/I_0$ of the simulated traverse (Y-direction) operation of FIG. 20A;

FIG. 22B is a graph showing the total luminous flux and the privacy effect $I_2/I_0$ of the simulated traverse (Y-direction) operation of FIG. 20A;

FIG. 23C is a table showing the privacy effect of the longitudinal (X-direction) operation of FIG. 20B;

FIG. 28C is a table showing the privacy effect of the traverse (Y-direction) operation of FIG. 27A;

FIG. 30C is a table showing the privacy effect of the longitudinal (X-direction) operation of FIG. 29B;

FIG. 34C is a table showing the privacy effect of the traverse (Y-direction) operation of FIG. 33A;

FIG. 36C is a table showing the privacy effect of the longitudinal (X-direction) operation of FIG. 33B;

FIG. 40C is a table showing the privacy effect of the traverse (Y-direction) operation of FIG. 40A;

FIG. 42C is a table showing the privacy effect of the longitudinal (X-direction) operation of FIG. 39B;

FIG. 45A is a table showing the average luminous intensity of the modification of the side-edge type surface light emitting apparatus of FIG. 38 using the integral lower prism sheets of FIG. 44;

FIG. 45B is a table showing the privacy effect of the traverse (Y-direction) operation of the modification of the side-edge type surface light emitting apparatus of FIG. 38 using the integral lower prism sheets of FIG. 44;

FIG. 45C is a table showing the privacy effect of the longitudinal (X-direction) operation of the modification of the side-edge type surface light emitting apparatus of FIG. 38 using the integral lower prism sheets of FIG. 44;

FIG. 52 is a graph showing the apical angle of the triangular prisms of the lower prism sheet of FIGS. 49 and 50 and the luminous intensity ratio (privacy effect).

DETAILED DESCRIPTION OF EXEMPLARY EMBODIMENTS

Figure 1:
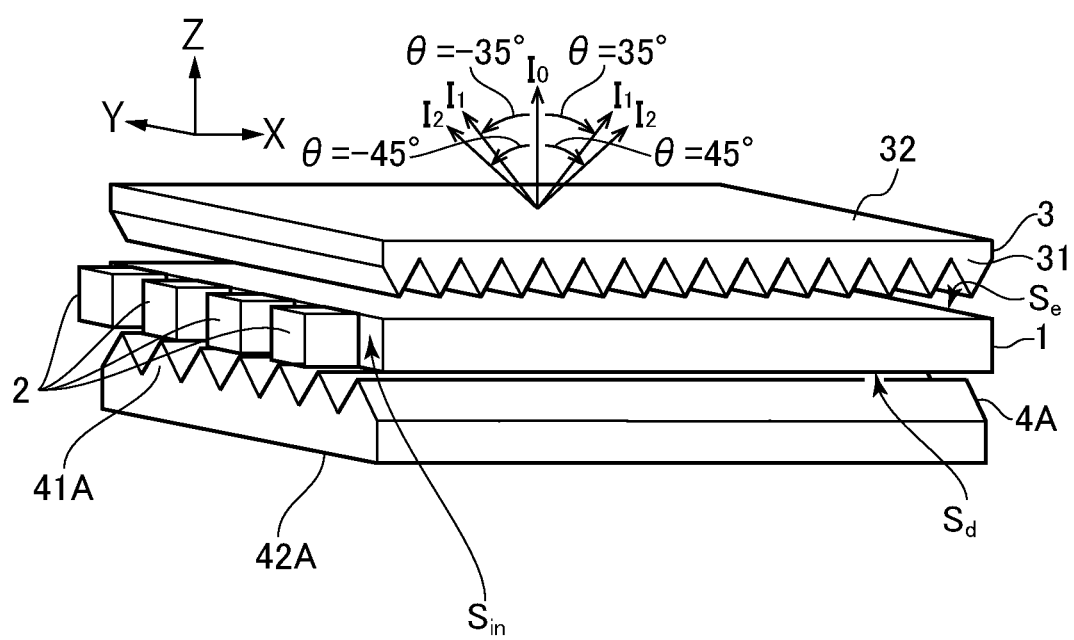
FIG. 1 is a perspective view illustrating a first embodiment of the side-edge type surface light emitting apparatus according to the presently disclosed subject matter.

FIG. 1 is a perspective view illustrating a first embodiment of the side-edge type surface light emitting apparatus according to the presently disclosed subject matter.

Figure 48:
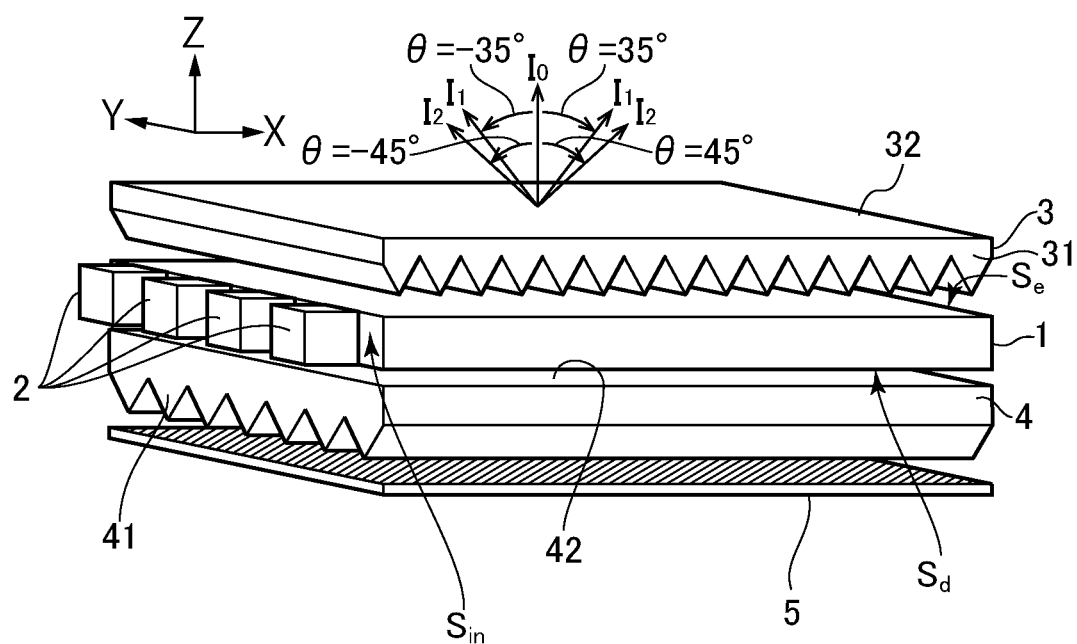
FIG. 48 is a perspective view illustrating a prior art side-edge type surface light emitting apparatus.
Figure 49:
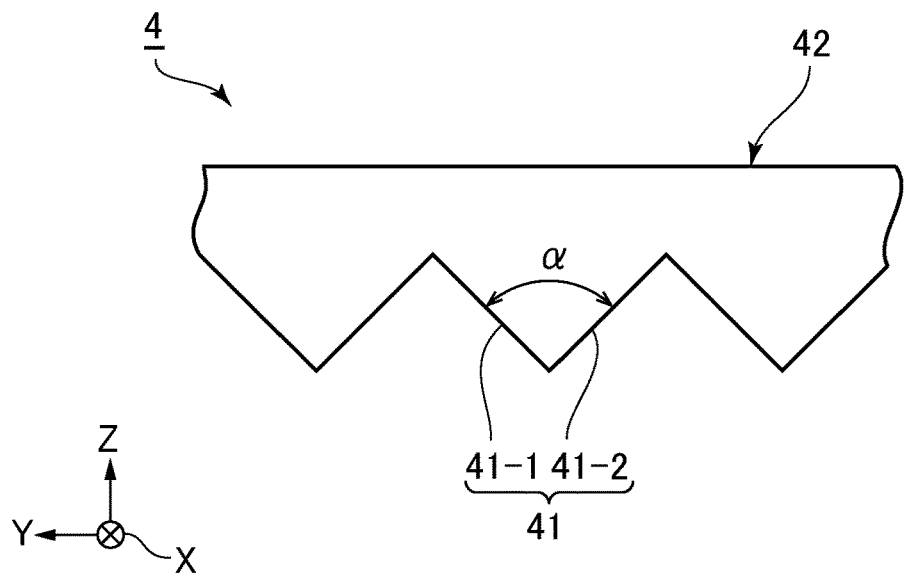
FIG. 49 is a traverse (Y-direction) cross-sectional view of the lower prism sheet of FIG. 48.
Figure 50:
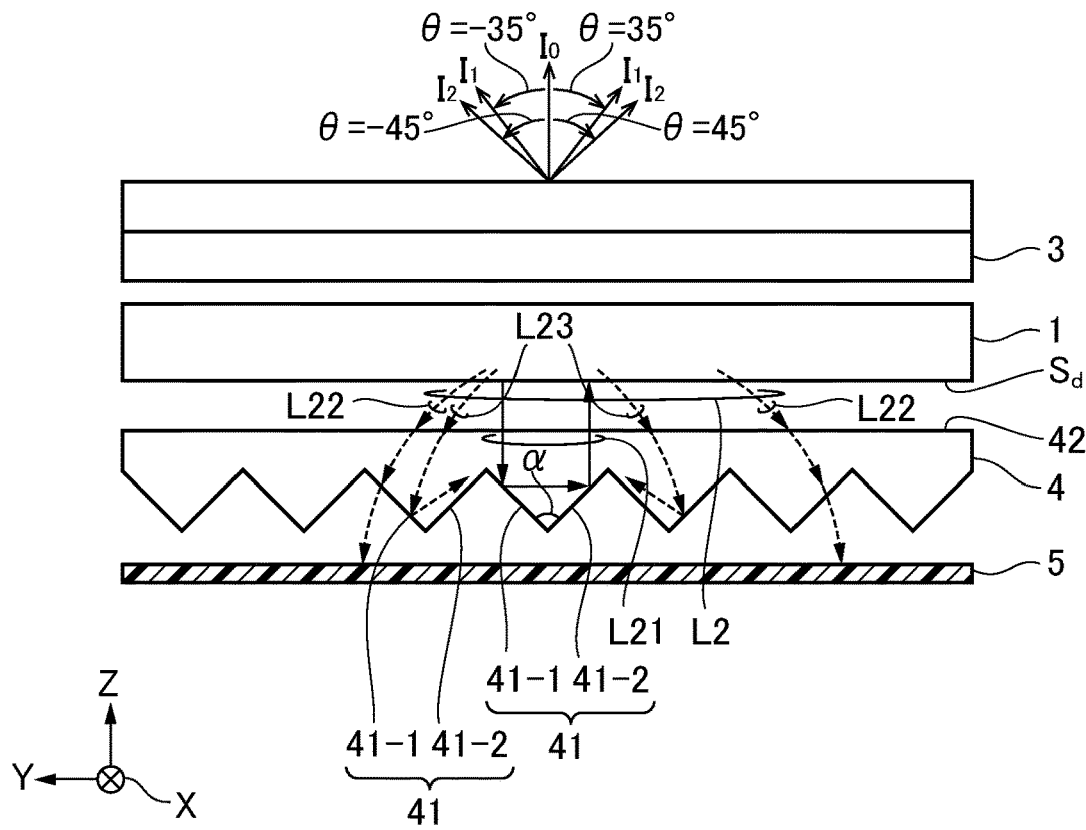
FIG. 50 is a traverse (Y-direction) cross-sectional view for explaining the operation of the lower prism sheet of FIG. 49.
Figure 51A:
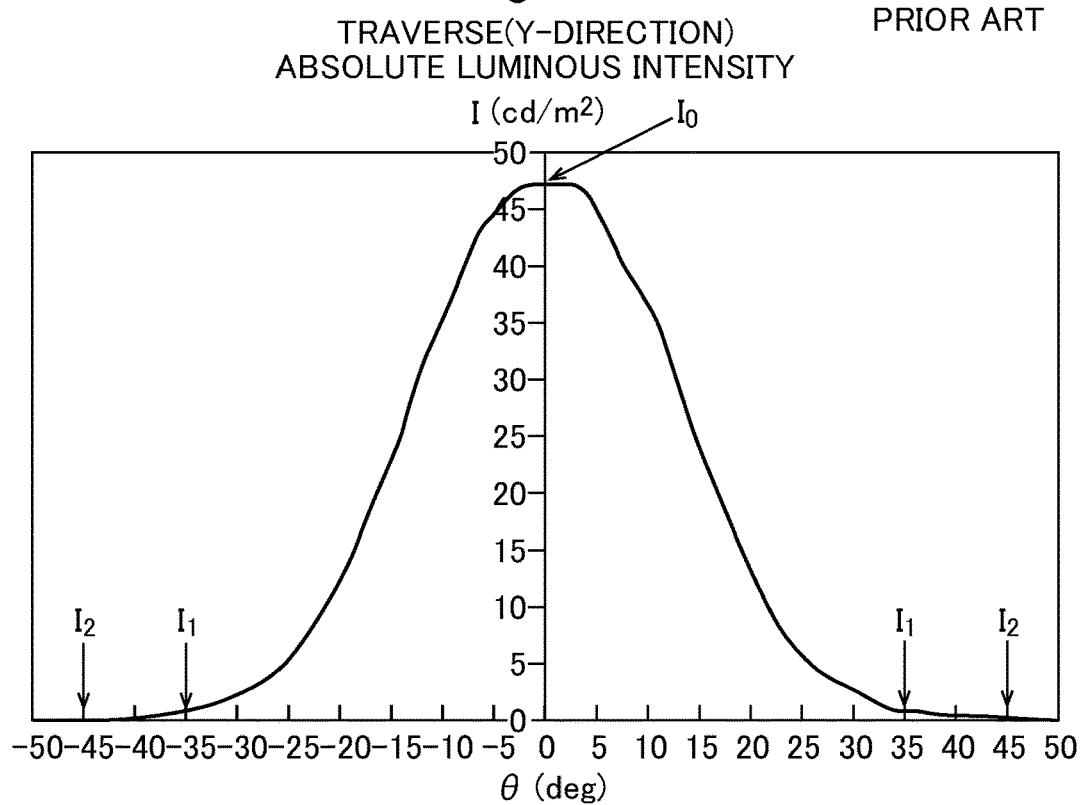
FIG. 51A is a graph showing a traverse (Y-direction) absolute luminous intensity light distribution of the side-edge type surface light emitting apparatus of FIG. 48.
Figure 51B:
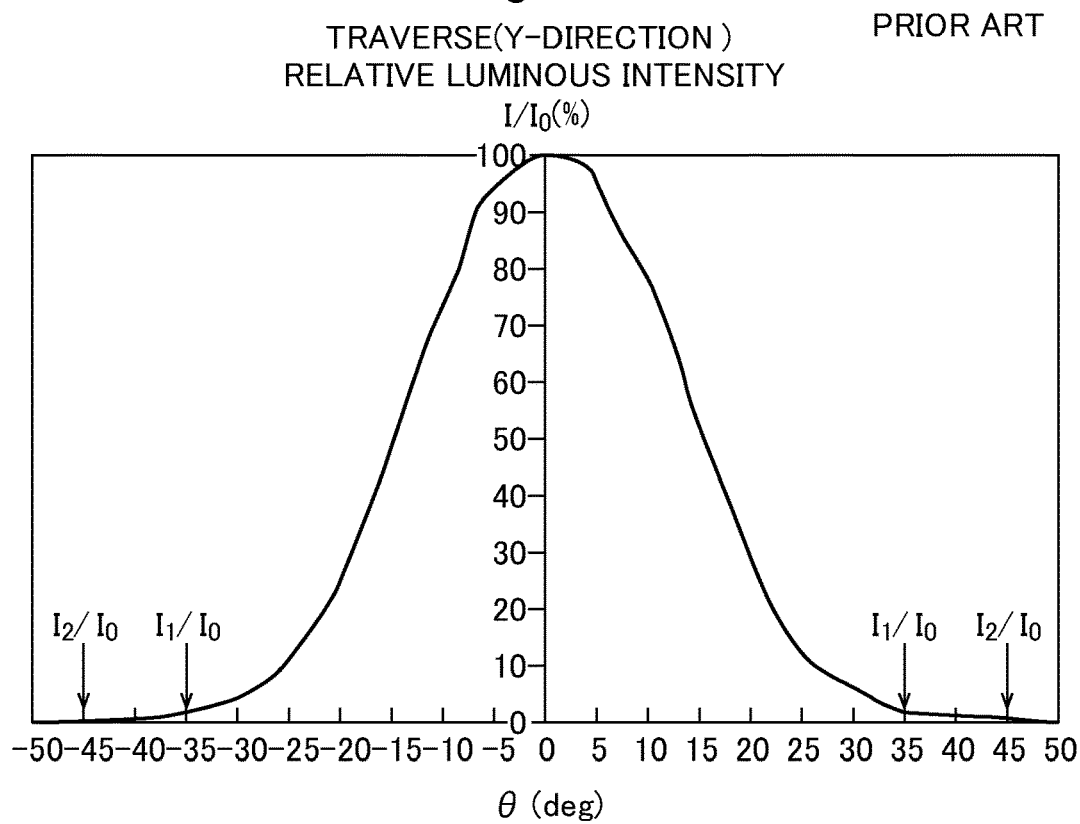
FIG. 51B is a graph showing a traverse (Y-direction) relative luminous intensity light distribution of the side-edge type surface light emitting apparatus of FIG. 48.

In FIG. 1, a single-face prism lower prism sheet 4A is provided instead of the single-face lower prism sheet 4 of FIG. 48. The light absorbing sheet 5 of FIG. 48 is not provided.

The single-face prism lower prism sheet 4A includes multiple upper triangular prisms 41A along the X-direction perpendicular to the light incident surface $S_{in}$ of the light guide plate 1 opposing the light distribution controlling surface $S_d$ thereof and a flat lower surface 42A. The flat surface 32 of the upper prism sheet 3 and the flat surface 42A of the lower prism sheet 4A would make the apparatus of FIG. 1 easily handle, to increase the manufacturing yield, i.e., decrease the manufacturing cost.

The side-edge type surface light emitting apparatus of FIG. 1 will be explained next with reference to FIGS. 2, 3, 4A, 4B and 5 in detail.

Figure 2:
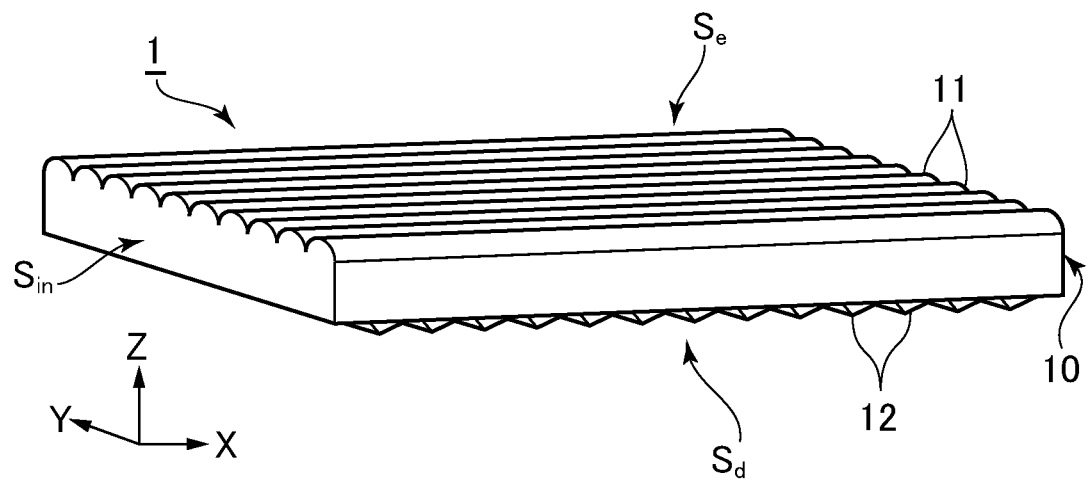
FIG. 2 is a perspective view of the light guide plate of FIG. 1.

In FIG. 2, which is a perspective view of the light waveguide plate 1 of FIG. 1, the light waveguide plate 1 is made of a transparent material such as acryl resin or polycarbonate resin. The light guide plate 1 is of a double prism type which has multiple upper-side prisms 11 along the X-direction (light propagation direction) perpendicular to the light incident surface $S_{in}$ on the light emitting surface $S_e$ and multiple lower-side prisms 12 along the Y-direction in parallel with the light incident surface $S_{in}$ on the light distribution controlling surface $S_d$. When light from the LED elements 2 (see: FIG. 1) is incident to the light incident surface $S_{in}$, the light propagates through the interior of the light guide plate 1, so that the light is reflected by the prisms 12 toward the prisms 11 to emit the light from the light emitting surface $S_e$.

Figure 3:
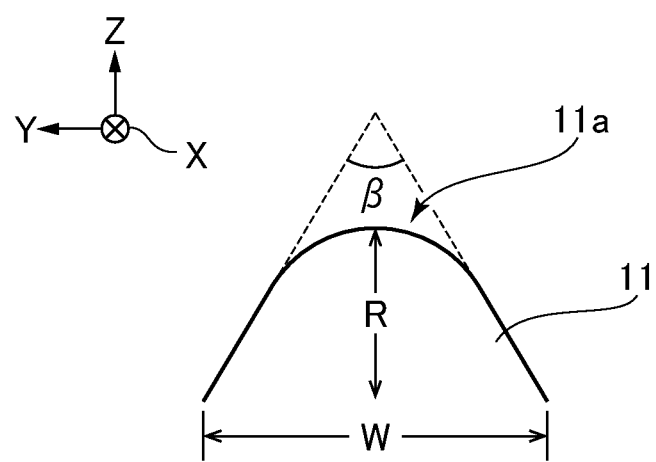
FIG. 3 is a cross-sectional view of one of the upper-side prisms of FIG. 2.

As illustrated in FIG. 3, which is a cross-sectional view of one of the prisms 11 of FIG. 2, the prisms 11 protrude along the positive side of the Z-direction, i.e., they are convex. In more detail, each of the prisms 11 has a cross section of an isosceles triangle having an apical angle β of 80° to 110° with a rounded tip 11a having a curvature radius R of 0 to 25 μm. Also, the width W of each of the prisms 11 is about 50 m. The width W, the curvature radius R and the apical angle β are adjusted in accordance with a required distribution characteristic of the side-edge type surface light emitting apparatus of FIG. 1, which will be explained later.

Note that the cross section of each of the prisms 11 can be other shapes such as a semi-circular shape or a trapezoidal shape. Also, the prisms 11 can be formed by semi-spherical convexities alternating with semi-spherical concavities two-dimensionally arranged in an XY-plane. Further, the prisms 11 can be formed by polygonal pyramids two-dimensionally arranged in an XY-plane.

Figure 4A:
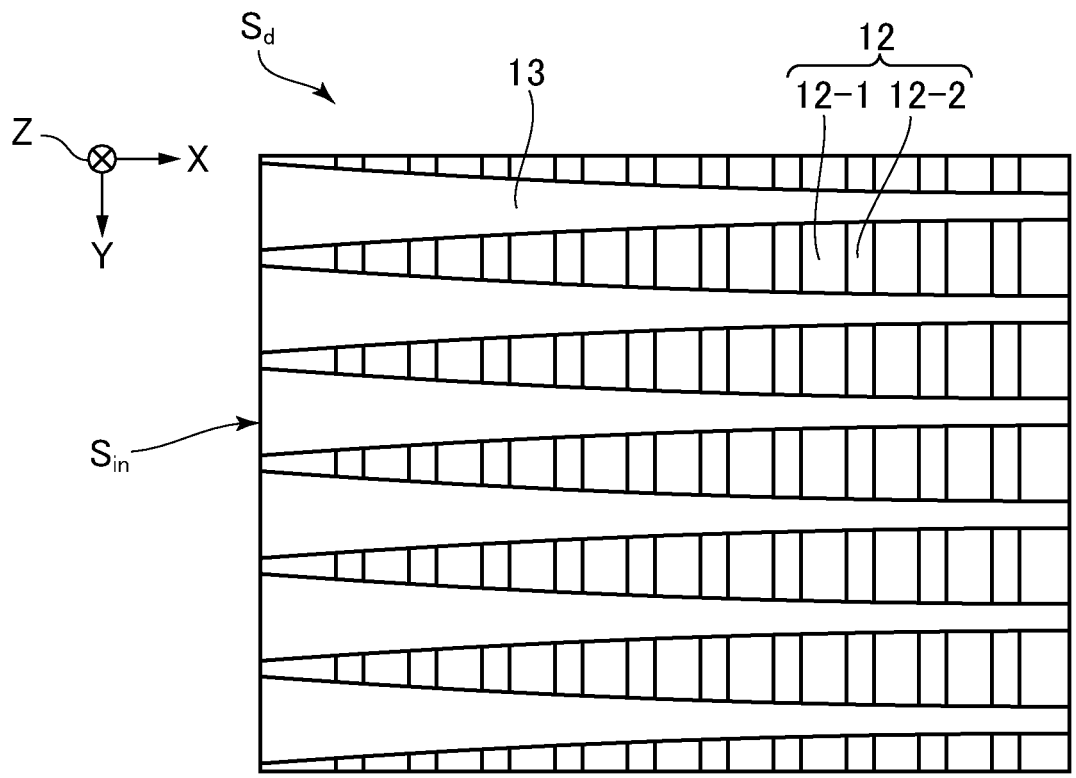
FIG. 4A is a bottom view of the lower-side prisms of FIG. 2.
Figure 4B:
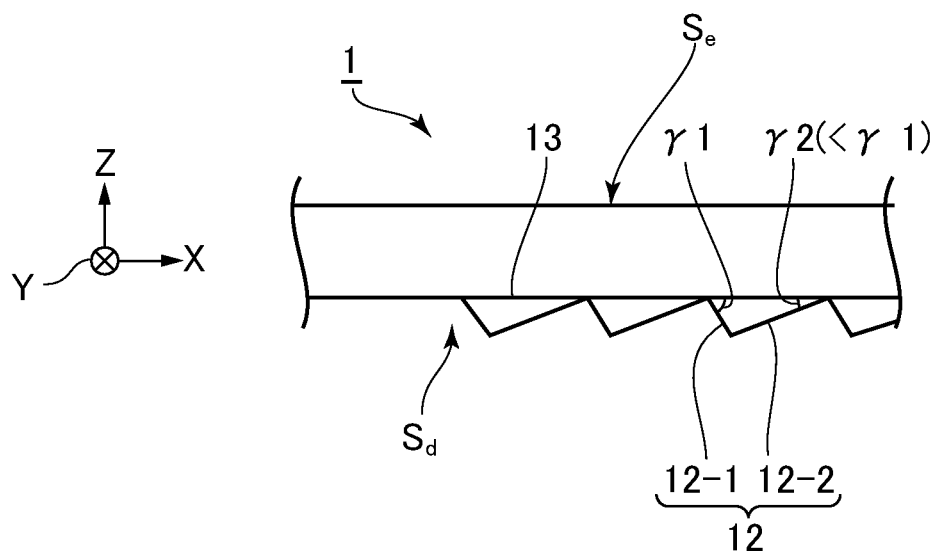
FIG. 4B is a partial cross-sectional view of FIG. 4A.

In FIG. 4A, which is a bottom view of the lower-side prisms 12 of FIG. 2, and in FIG. 4B, which is a partial cross-sectional view of FIG. 4A, multiple flat mirror finishing surfaces 13 are provided on the light distribution controlling surface $S_d$ along the X-direction, in order to spread light to the inner part of the light guide plate 1. The farther from the light incident surface $S_{in}$ the flat mirror finishing surfaces 13 are located, the smaller the width of the flat mirror finishing surfaces 13 along the Y-direction at that location. On the other hand, the sequences of the prisms 12, each including an up-sloped surface 12-1 with a large angle γ1 and a down-sloped surface 12-2 with a small angle γ2 (<γ1) as illustrated in FIG. 4B, are provided between the flat mirror finishing surfaces 13. The farther from the light incident surface $S_{in}$ the prisms 12 are located, the larger the width of sequences of the prisms 12 along the Y-direction at that location. In this case, the control of light distribution is carried out mainly by the down-sloped surface 12-2, as will be explained with reference to FIG. 5.

Figure 5:
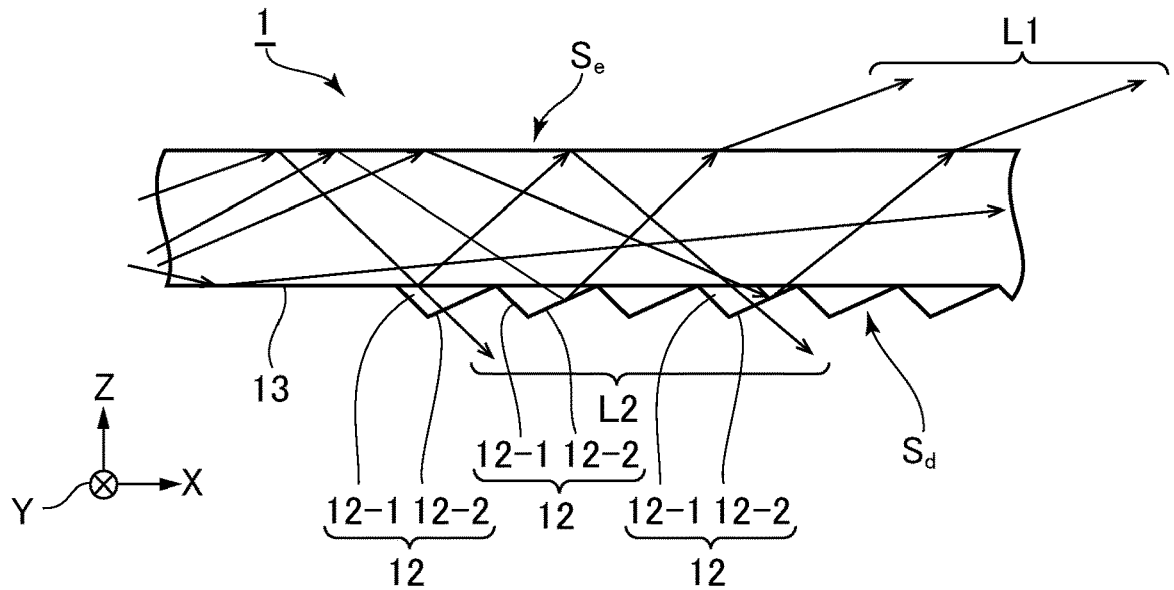
FIG. 5 is a cross-sectional view for explaining the operation of the light guide plate of FIG. 1.

In FIG. 5, which is a cross-sectional view for explaining the operation of the light guide plate 1 of FIG. 2, some light is totally reflected between the light emitting surface $S_e$ and the light distribution controlling surface $S_d$, and then is refracted at the first light emitting surface $S_e$ or the down-sloped surface 12-2 of one of the prisms 12. In this case, since the width of the flat mirror finishing surfaces 13 and the width of the prisms 12 along the Y-direction are changed along the X-direction, the surface luminous intensity within the light emitting surface $S_e$ of the light waveguide plate 1 can be uniform. Thus, some light L1 emitted from the light emitting surface $S_e$ is neither disturbed nor diffused, but is refracted at a definite angle with respect to the normal line of the light emitting surface $S_e$. On the other hand, some light L2 is leaked from the light distribution controlling surface $S_d$ of the light waveguide plate 1 to the light absorbing sheet 4.

Figure 6:
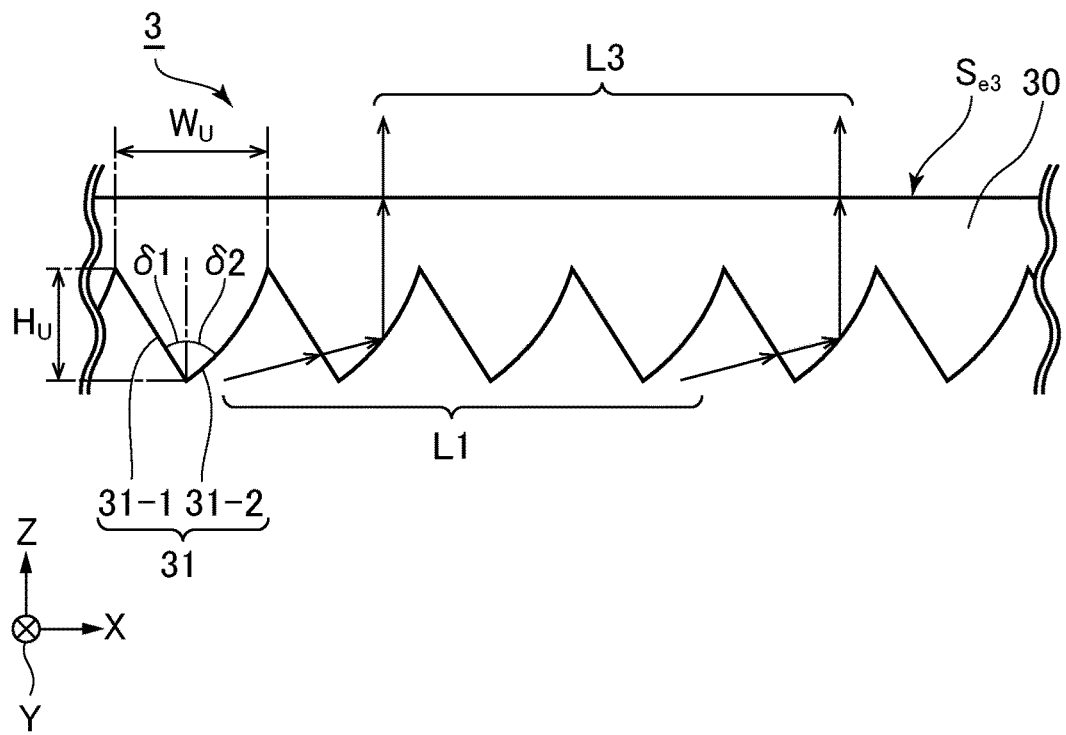
FIG. 6 is a cross-sectional view of the upper prism sheet of FIG. 2.

In FIG. 6, which is a cross-sectional view of the upper prism sheet 3 of FIG. 1, the upper prism sheet 3 is constructed by an upper base section 30 with a light emitting flat surface $S_{e3}$ and a series of equidistantly-disposed, deformed-triangular lower prisms 31 in parallel with the light incident surface $S_{in}$ (see: FIG. 1). Each of the prisms 31 has a straight-sloped surface 31-1 on the side of the light incident surface $S_{in}$ and a curved-sloped surface 31-2 on the opposite side of the light incident surface $S_{in}$. The base section 30 is made of polyethylene terephthalate (PET), polycarbonate or polymethyl methacrylate. The lower prisms 31 are made of ultraviolet curing hardening resin such as polymer acrylate. The prisms 31 oppose the light emitting surface $S_e$ of the light guide plate 1 (see FIG. 1). The width $W_U$ of the lower prisms 31 is about 18~25 μm, for example, and the height $H_U$ is about 15 to 18 μm, for example. The width $W_U$ and the height $H_U$ can be changed as occasion demands, to remove the moire fringes caused by the backlight and liquid combination. In this case, the width $W_U$ and the height $H_U$ are determined by the angle δ1 of the straight-sloped surface 31-1, the angle δ2 of the curved-sloped surface 31-2 and the curvature of the curved-sloped surface 31-2. Note that the curved-sloped surface 31-2 can be straight-sloped, splined-sloped or parabolic-sloped. When the light L1 with an inclined direction from the light emitting surface $S_e$ of the light guide plate 1 is incident to the prisms 31 of the upper prism sheet 3, the light L1 is refracted at the straight-sloped surface 31-1 and then, is totally reflected by the curved-sloped surface 31-2, so that light L3 normal to the flat light emitting surface $S_{e3}$ of the upper prism sheet 3 is emitted therefrom.

Figure 7:
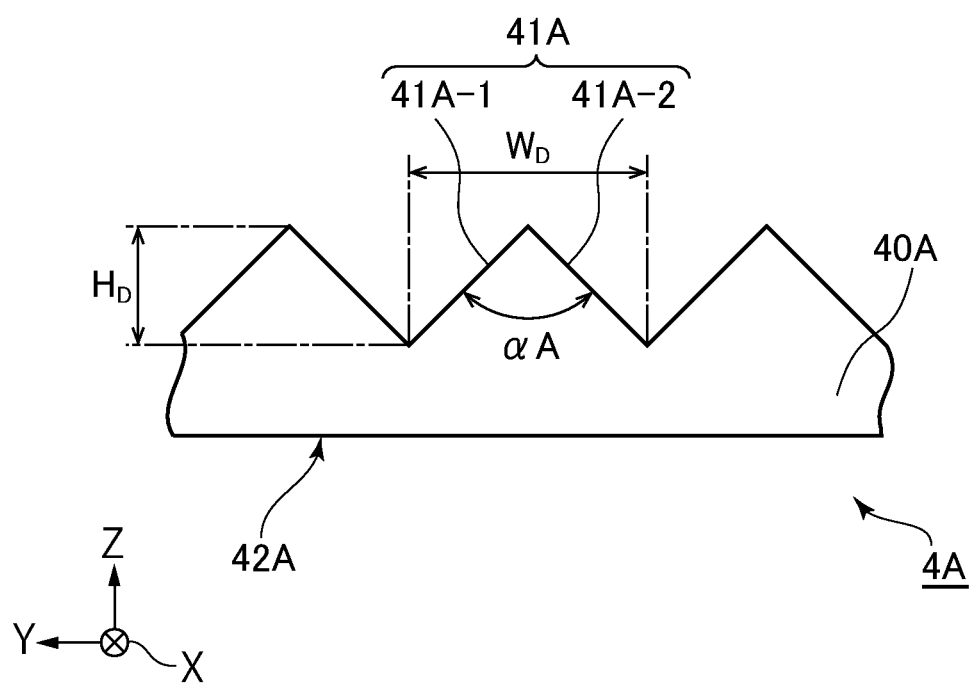
FIG. 7 is a cross-sectional view of the lower prism sheet of FIG. 2.

In FIG. 7, which is a cross-sectional view of the lower prism sheet 4A of FIG. 1, the lower prism sheet 4 is constructed by a lower base section 40A with a flat surface 42A and equidistantly-disposed, triangular upper prisms 41A perpendicular to the light incident surface $S_{in}$ (see: FIG. 1). The base section 40A is made of polyethylene terephthalate (PET), polycarbonate or polymethyl methacrylate. The upper prisms 41A is made of ultraviolet curing hardening resin such as polymer acrylate. The prisms 41A oppose the light distribution controlling surface $S_d$ of the light guide plate 1 (see: FIG. 1), and have straight-sloped surfaces 41A-1 and 41A-2 symmetrically along the X-direction. In this case, the apical α A is about 85° to 95° such as 90°. The width $W_D$ of the upper prisms 41A is about 25 to 30 μm, for example, and the height $H_D$ of the upper prisms 41A is about 10 to 16 μm, for example, which is smaller than the height $H_D$ of the prisms 31. The width $W_D$ and the height $H_D$ can be changed as occasion demands, to remove the moire fringes caused by the backlight and liquid combination.

Figure 8A:
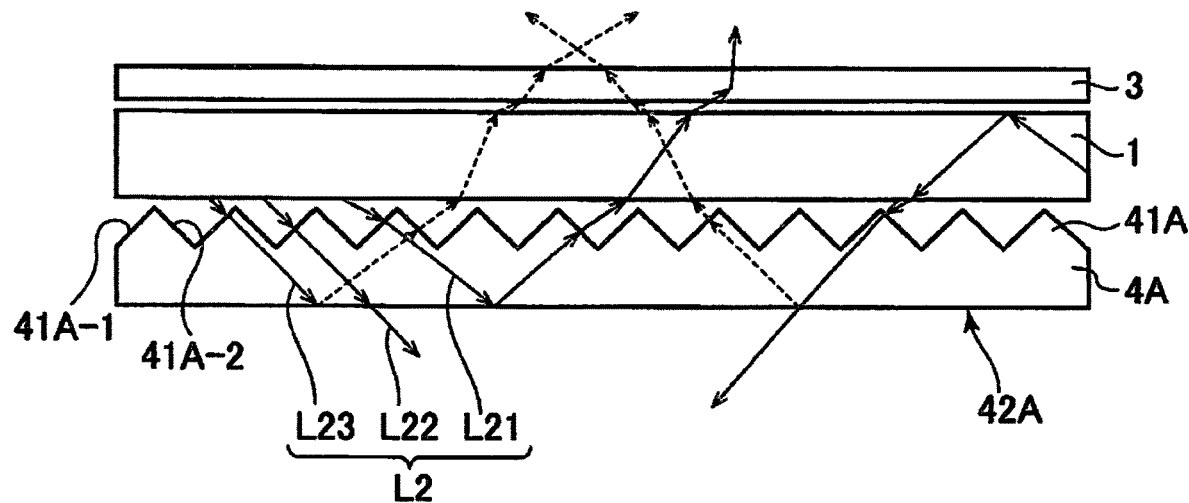
FIG. 8A is a traverse (Y-direction) cross-sectional view for explaining the operation of the side-edge type surface light emitting apparatus of FIG. 1.
Figure 8B:
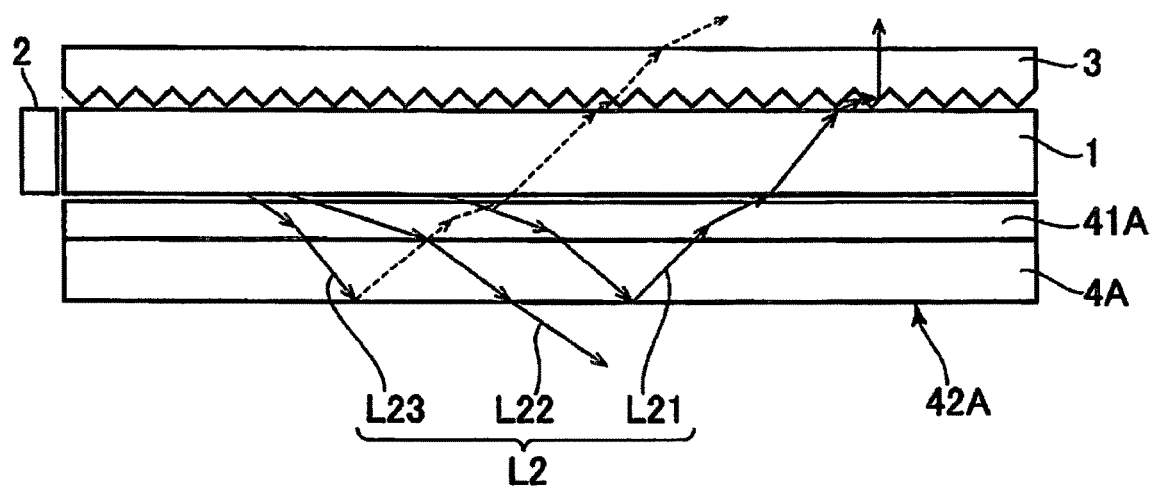
FIG. 8B is a longitudinal (X-direction) cross-sectional view for explaining the operation of the side-edge type surface light emitting apparatus of FIG. 1.

FIG. 8A is a traverse (Y-direction) cross-sectional view for explaining the operation of the side-edge type surface light emitting apparatus of FIG. 1, and FIG. 8B is a longitudinal (X-direction) cross-sectional view for explaining the operation of the side-edge type surface light emitting apparatus of FIG. 1.

As illustrated in FIGS. 8A and 8B, the light L21 of the light L2, which has a relatively large incident angle to the straight-sloped surfaces 41A-1 and 41A-2 of the triangular prisms 41A of the lower prism sheet 4A, is totally reflected by the flat surface 42A and returns to the light guide plate 1. In this case, the incident angle of the light L21 to the flat surface 42A is larger than the critical angle of the lower prism sheet 4A, so that the light L21 is totally reflected by the flat surface 42A to return to the light guide plate 1. As a result, the light L21 can be emitted from the flat surface $S_e$ of the upper prism sheet 3 at the azimuth θ between −35° and 35°, which would particularly enhance the absolute luminous intensity $I_0$ at the azimuth θ=0°.

On the other hand, as illustrated in FIGS. 8A and 8B, the light L22 of the light L2, which has a relatively small incident angle to the straight-sloped surface 41A-1 or 41A-2 of the triangular prism 41A of the lower prism sheet 4A, is refracted at the flat surface 42A. As a result, the light L22 does not return to the upper prism sheet 3. In this case, the incident angle of the light L22 to the flat surface 42A is smaller than the critical angle of the lower prism sheet 4. This would decrease the absolute luminous intensity $I_1$ at the azimuth θ=35° and θ=−35° and the absolute luminous intensity $I_2$ at the azimuth θ=45° and −45°. The relative luminous intensity $I_1/I_0$ at the azimuth θ=35° and θ=−35° and the relative luminous intensity $I_2/I_0$ at the azimuth θ=45° and θ=−45° would decrease, i.e., enhance the privacy effect. Note that a part of the light L22 leaked from the flat surface 42A is reflected by the housing (reflector) of the apparatus constitutes return light to the lower prism sheet 4A. This return light would increase the total luminous flux, but degrade the privacy effect.

Further, as illustrated in FIGS. 8A and 8B, the light L23 of the light L2, which has a medium incident angle to the straight-sloped surface 41A-1 or 41A-2 has an incident angle at the flat surface 42A of the lower prism sheet 4, which is slightly larger than the critical angle thereof. In this case, the light L23 is totally reflected by the flat surface 42A to generate light with a direction declined from the normal angle at the light emitting surface $S_e$ of the upper prism sheet 3. This would generate a broad light distribution whose luminous intensity is large outside the azimuth θ=−35° and θ=35°, which would increase the relative luminous intensities $I_1/I_0$ and $I_2/I_0$, to degrade the privacy effect.

Figure 9A:
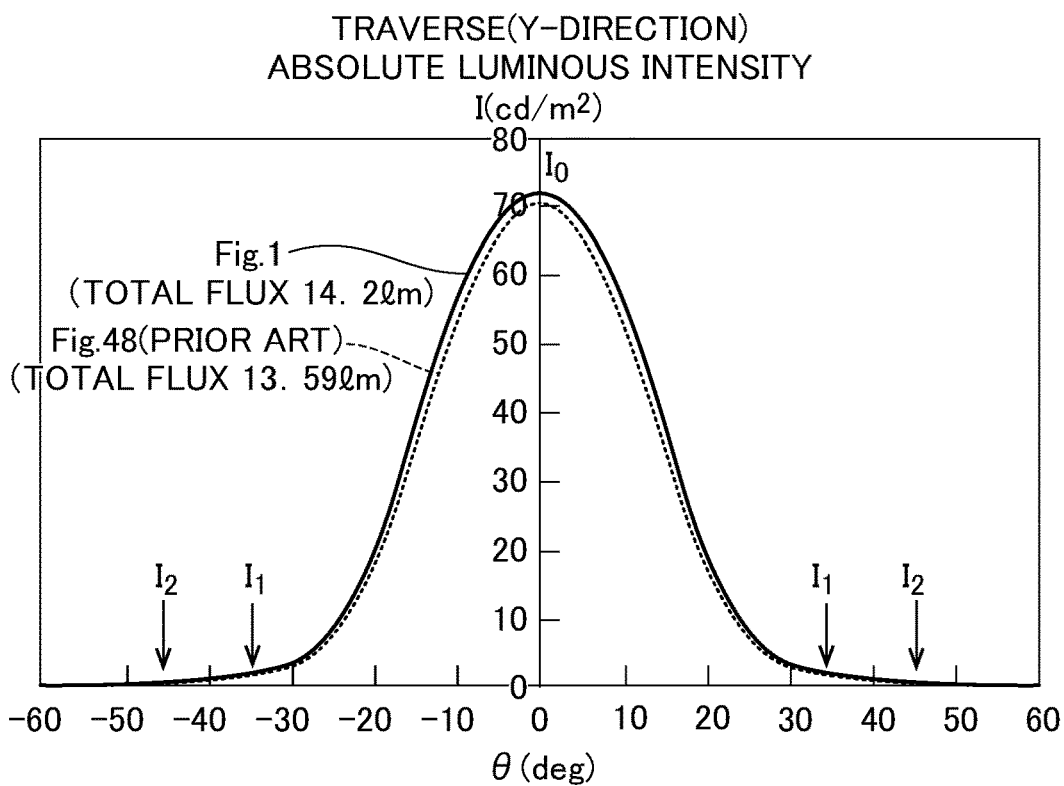
FIG. 9A is a graph showing a traverse (Y-direction) absolute luminous intensity light distribution of the result of the simulated traverse (Y-direction) operation of FIG. 8A.
Figure 9B:
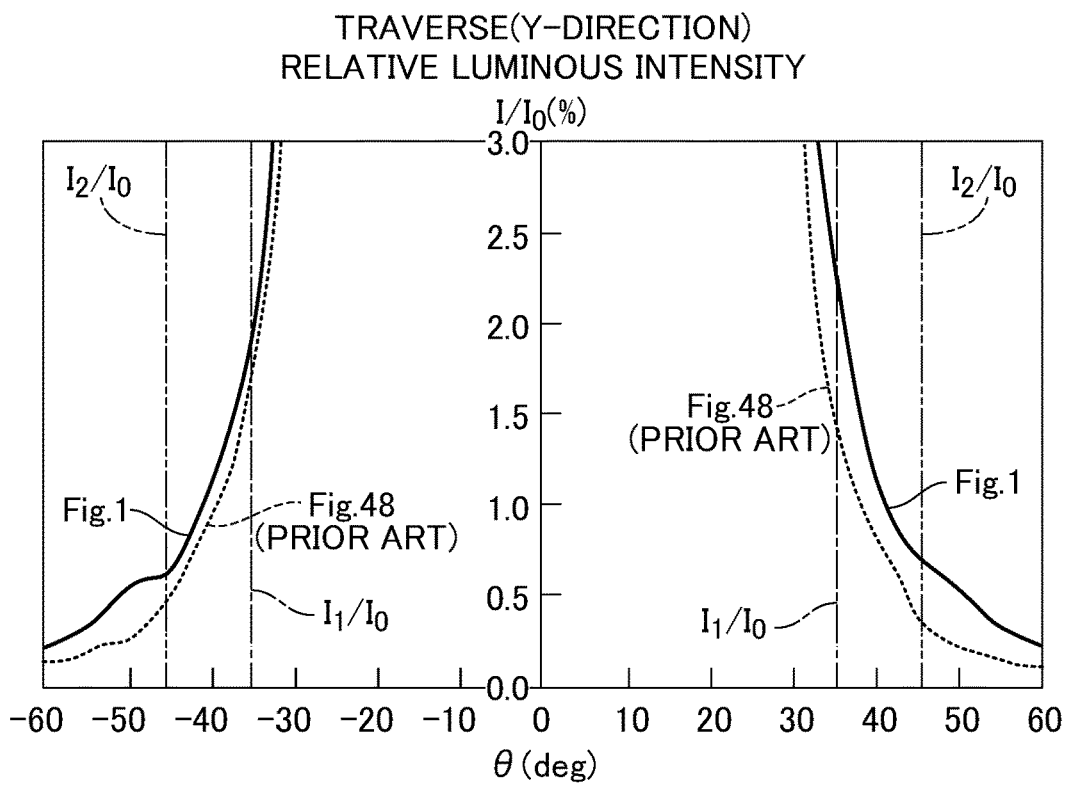
FIG. 9B is a graph showing an enlarged traverse (Y-direction) relative luminous intensity light distribution of FIG. 9A.

FIG. 9A is a graph showing a traverse (Y-direction) absolute luminous intensity light distribution of the result of the simulated traverse (Y-direction) operation of FIG. 8A, FIG. 9B is a graph showing an enlarged traverse (Y-direction) relative luminous intensity light distribution of FIG. 9A, and FIG. 9C is a table showing the privacy effect of the traverse (Y-direction) operation of FIG. 8A. Hereinafter, Solid Work Light Simulation SREOS by OPTISWORKS (now, ANSYS) is used as simulation software, where the width $W_U$ and the height $H_U$ of the deformed triangular prisms 31 of the upper prism sheet 3 are assumed to be 21 μm and 17 μm, respectively, the width $W_D$ and the height $H_D$ of the deformed triangular prisms 31 of the upper prism sheet 3 are assumed to be 27 μm and 14 μm, respectively, and the light guide plate 1 is assumed to have a structure as illustrated in FIGS. 2, 3, 4A, 4B and 5.

FIGS. 9A, 9B and 9C show the result of the simulated traverse (Y-direction) operation of FIG. 8A where the side-edge type surface light emitting apparatus of FIG. 1 is compared with the side-edge type surface light emitting apparatus of FIG. 48. Note that the light guide plate 1 and the upper prism sheet 3 are the same in the apparatuses of FIGS. 1 and 48, while the triangular prisms 41A of the lower prism sheet 4A of FIG. 1 are upward and the triangular prisms 41 of the lower prism sheet 4 of FIG. 48 are downward. Also, the light absorbing sheet 5 is provided only in the apparatus of FIG. 48.

Referring to FIG. 9A, the absolute luminous intensity light distribution of the side-edge type surface light emitting apparatus of FIG. 1 is about the same as that of the side-edge type surface light emitting apparatus of FIG. 48; however, the traverse and longitudinal total luminous flux of the side-edge type surface light emitting apparatus of FIG. 1 is slightly larger than that of the side-edge type surface light emitting apparatus of FIG. 48. This is caused by the light leaked from the flat surface 42A to return thereto due to the reflection of light at the housing (reflector) of the apparatus of FIG. 1.

Also, referring to FIGS. 9B and 9C, outside the azimuth θ=−35° and θ=35°, the relative luminous intensity $I_1/I_0$ at θ=±35° and the relative luminous intensity $I_2/I_0$ at θ=±45° are slightly larger in the apparatus of FIG. 1 than in the apparatus of FIG. 48, and therefore, the privacy effect is slightly worse in the apparatus of FIG. 1 than in the apparatus of FIG. 48; however, this is acceptable.

Figure 10A:
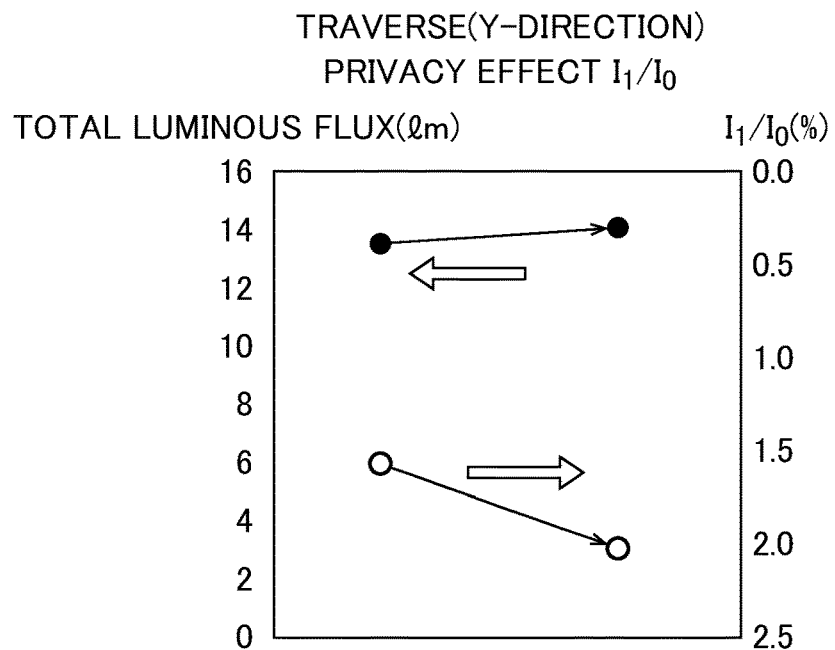
FIG. 10A is a graph showing the total luminous flux and the privacy effect $I_1/I_0$ of the simulated traverse (Y-direction) operation of FIG. 8A.
Figure 10B:
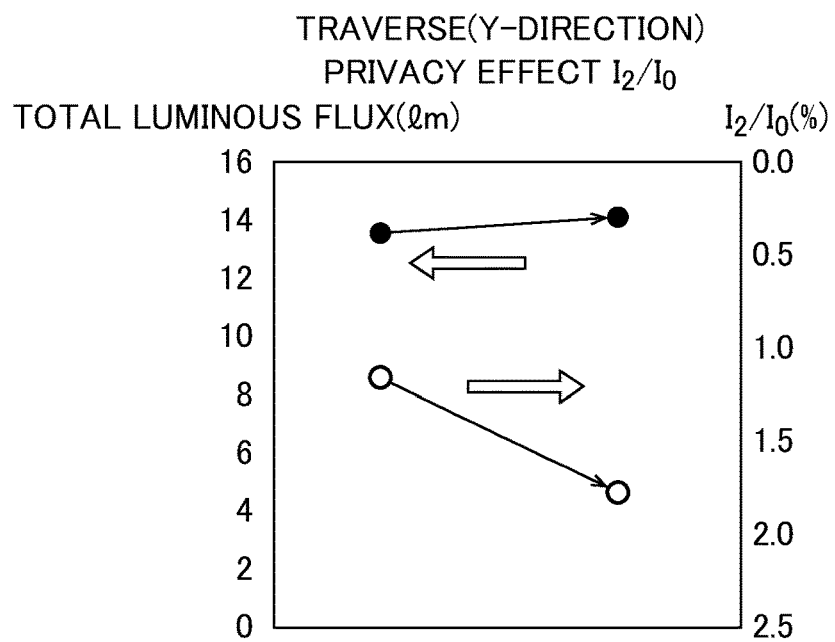
FIG. 10B is a graph showing the total luminous flux and the privacy effect $I_2/I_0$ of the simulated traverse (Y-direction) operation of FIG. 8A.

FIG. 10A is a graph showing the total luminous flux and the privacy effect $I_1/I_0$ of the simulated traverse (Y-direction) operation of FIG. 8A, and FIG. 10B is a graph showing the total luminous flux and the privacy effect $I_2/I_0$ of the simulated traverse (Y-direction) operation of FIG. 8A.

In FIGS. 10A and 10B, the traverse and longitudinal total luminous flux is denoted by black circles, and the privacy effect is denoted by white circles. In FIGS. 10A and 10B, the larger the total luminous flux (lm), the larger the luminance of the apparatus. Also, the smaller the relative luminous intensity $I_1/I_0$ and $I_2/I_0$, the better the privacy effect. In other words, the upper the plotted circles, the larger the total luminous flux and the better the privacy effect.

As illustrated in FIGS. 10A and 10B, the traverse and longitudinal total luminous flux is slightly larger by the return light due to the housing (reflector) of the apparatus; however, the privacy effects $I_1/I_0$ and $I_2/I_0$ are slightly degraded, which is acceptable.

Figure 11A:
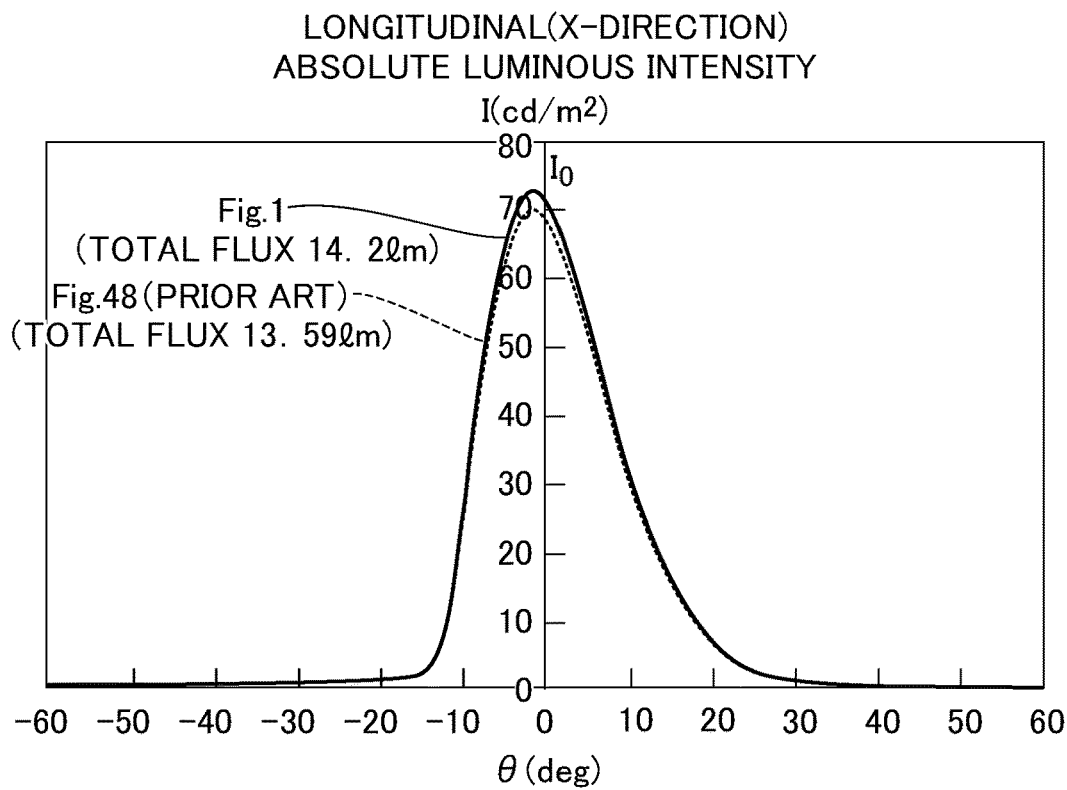
FIG. 11A is a graph showing a longitudinal (X-direction) absolute luminous intensity light distribution of the result of the simulated longitudinal (X-direction) operation of FIG. 8B.
Figure 11B:
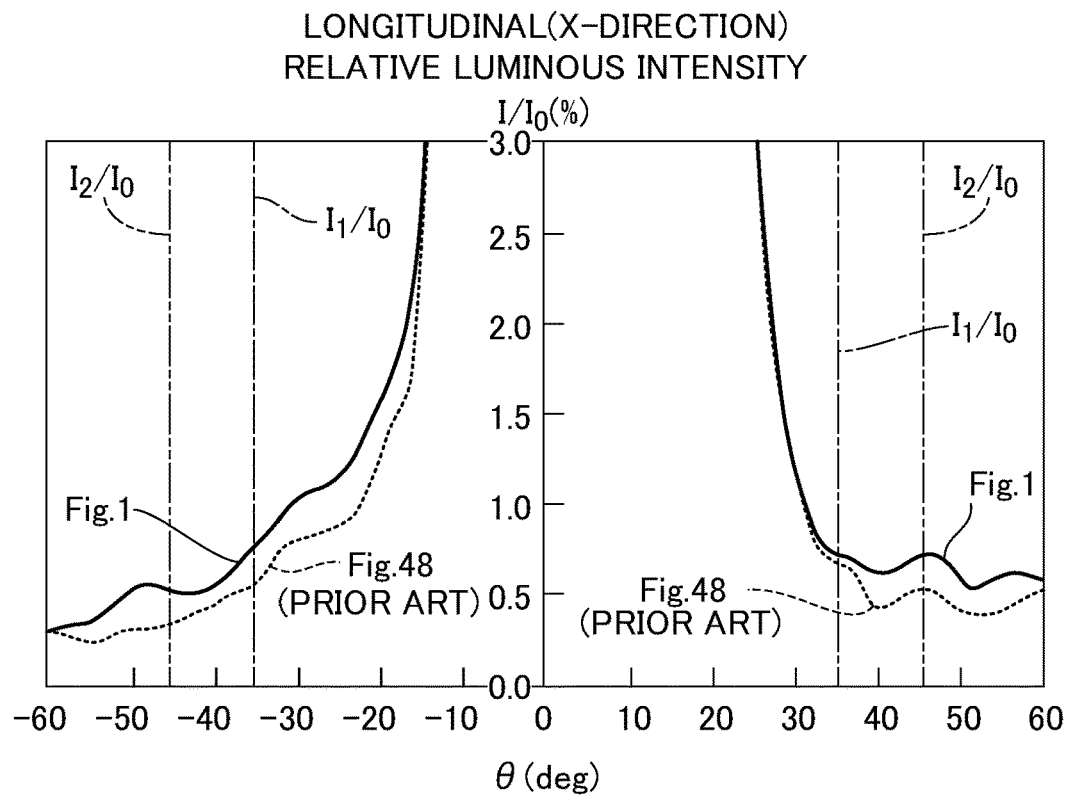
FIG. 11B is a graph showing an enlarged longitudinal (X-direction) relative luminous intensity light distribution of FIG. 11A.

FIG. 11A is a graph showing a longitudinal (X-direction) absolute luminous intensity light distribution of the result of the simulated longitudinal (X-direction) operation of FIG. 8B, FIG. 11B is a graph showing an enlarged longitudinal (X-direction) relative luminous intensity light distribution of FIG. 11A, and FIG. 11C is a table showing the privacy effect of the longitudinal (X-direction) operation of FIG. 8B.

Referring to FIG. 11A, the absolute luminous intensity light distribution of the side-edge type surface light emitting apparatus of FIG. 1 is about the same as that of the side-edge type surface light emitting apparatus of FIG. 48; however, the traverse and longitudinal total luminous flux of the side-edge type surface light emitting apparatus of FIG. 1 is slightly larger than that of the side-edge type surface light emitting apparatus of FIG. 48. This is caused by the light leaked from the flat surface 42A to return thereto due to the reflection of light at the housing (reflector) of the apparatus of FIG. 1.

Also, referring to FIGS. 11B and 11C, outside the azimuth θ=−35° and θ=35°, the relative luminous intensity $I_1/I_0$ at θ=±35° and the relative luminous intensity $I_2/I_0$ at θ=±45° are slightly larger in the apparatus of FIG. 1 than in the apparatus of FIG. 48, and therefore, the privacy effect is slightly worse in the apparatus of FIG. 1 than in the apparatus of FIG. 48; however, this is acceptable.

Figure 12A:
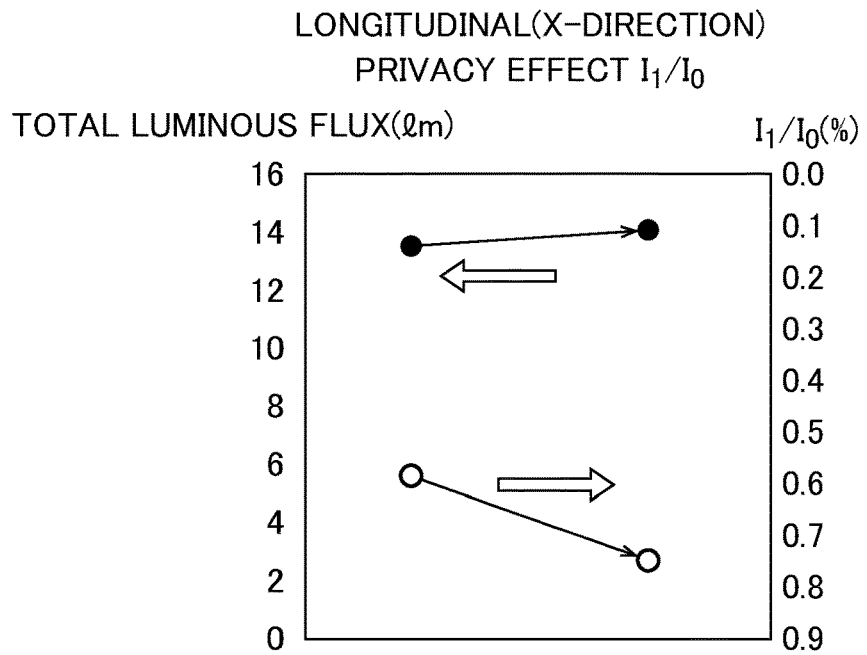
FIG. 12A is a graph showing the total luminous flux and the privacy effect $I_1/I_0$ of the simulated longitudinal (X-direction) operation of FIG. 8B.
Figure 12B:
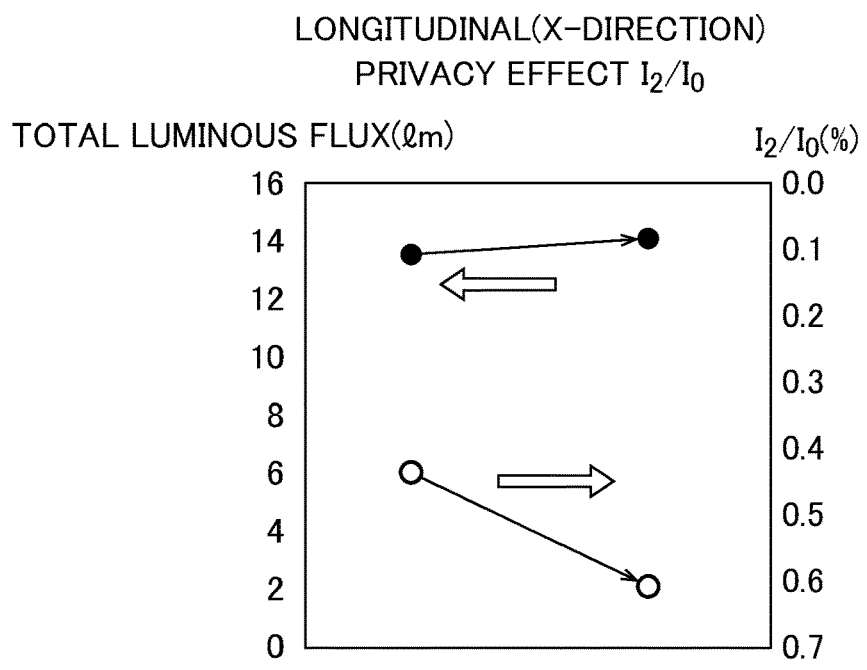
FIG. 12B is a graph showing the total luminous flux and the privacy effect $I_2/I_0$ of the simulated longitudinal (X-direction) operation of FIG. 8B.

FIG. 12A is a graph showing the total luminous flux and the privacy effect $I_1/I_0$ of the simulated longitudinal (X-direction) operation of FIG. 8B, and FIG. 12B is a graph showing the total luminous flux and the privacy effect $I_2/I_0$ of the simulated longitudinal (X-direction) operation of FIG. 8B.

As illustrated in FIGS. 12A and 12B, the traverse and longitudinal total luminous flux is slightly larger by the return light due to the housing (reflector) of the apparatus; however, the privacy effects $I_1/I_0$ and $I_2/I_0$ are slightly degraded, which is acceptable.

Thus, according to the first embodiment as illustrated in FIG. 1, since the outer surface of the lower prism sheet 4A is flat, the handling in the manufacturing steps would be easy, and also, contaminant matters would not be inserted thereinto. Further, in the component carrying operations, fine defects are hardly generated.

Figure 13:
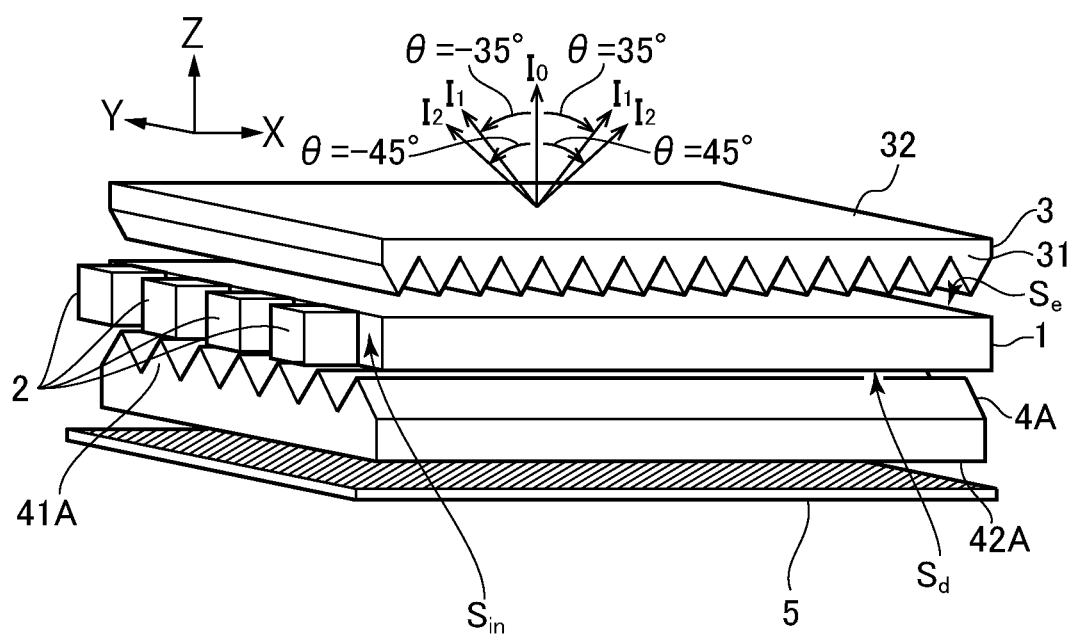
FIG. 13 is a perspective view illustrating a second embodiment of the side-edge type surface light emitting apparatus according to the presently disclosed subject matter.

FIG. 13 is a perspective view illustrating a second embodiment of the side-edge type surface light emitting apparatus according to the presently disclosed subject matter.

In FIG. 13, a light absorbing sheet 5 is added to oppose the flat surface 42A of the lower prism sheet 4A of FIG. 1. In this case, an air gap layer is inserted between the lower prism sheet 4A and the light absorbing sheet 5, that is, the light absorbing sheet 5 is distant from the lower prism sheet 4A. The light absorbing sheet 5 is made of polyethylene terephthalate (PET) painted with black ink.

Figure 14A:
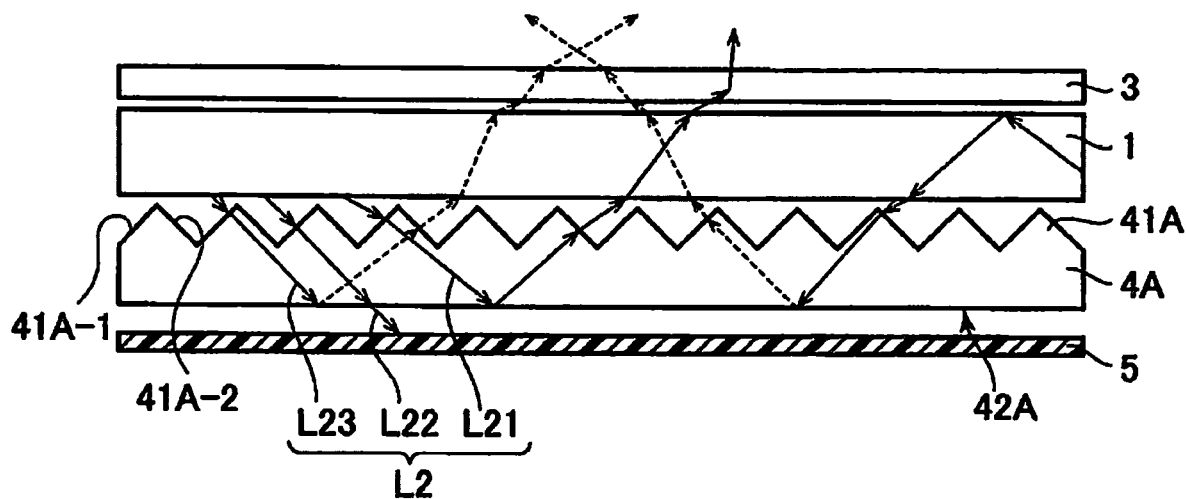
FIG. 14A is a traverse (Y-direction) cross-sectional view for explaining the operation of the side-edge type surface light emitting apparatus of FIG. 13.
Figure 14B:
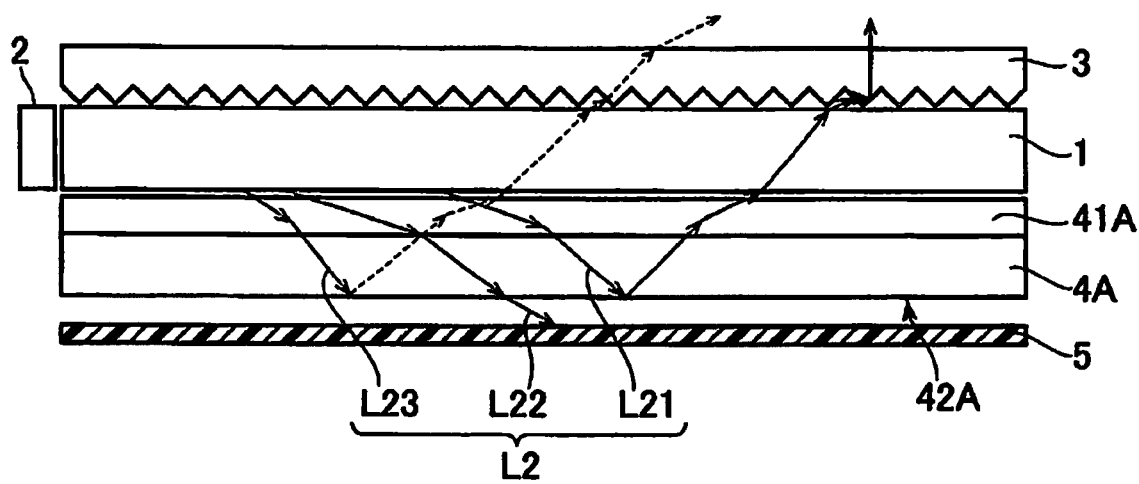
FIG. 14B is a longitudinal (X-direction) cross-sectional view for explaining the operation of the side-edge type surface light emitting apparatus of FIG. 13.

FIG. 14A is a traverse (Y-direction) cross-sectional view for explaining the operation of the side-edge type surface light emitting apparatus of FIG. 13, and FIG. 14B is a longitudinal (X-direction) cross-sectional view for explaining the operation of the side-edge type surface light emitting apparatus of FIG. 13.

As illustrated in FIGS. 14A and 14B, in the same way as in FIGS. 8A and 8B, the light L21 of the light L2, which has a relatively large incident angle to the straight-sloped surfaces 41A-1 and 41A-2 of the triangular prisms 41A of the lower prism sheet 4A, is totally reflected by the flat surface 42A and returns to the light guide plate 1. In this case, the incident angle of the light L21 to the flat surface 42A is larger than the critical angle of the lower prism sheet 4A, so that the light L21 is totally reflected by the flat surface 42A to return to the light guide plate 1. As a result, the light L21 can be emitted from the flat surface $S_e$ of the upper prism sheet 3 at the azimuth θ between −35° and 35°, which would particularly enhance the absolute luminous intensity $I_0$ at the azimuth θ=0°.

On the other hand, as illustrated in FIGS. 14A and 14B, the light L22 of the light L2, which has a relatively small incident angle to the straight-sloped surface 41A-1 or 41A-2 of the triangular prism 41A of the lower prism sheet 4A, is refracted at the flat surface 42A and propagates to the light absorbing sheet 5. In this case, the incident angle of the light L22 to the flat surface 42A is smaller than the critical angle of the lower prism sheet 4. Therefore, the light L22 never returns to the upper prism sheet 3. This would decrease the absolute luminous intensity $I_1$ at the azimuth θ=35° and θ=−35° and the absolute luminous intensity $I_2$ at the azimuth θ=45° and −45°. The relative luminous intensity $I_1/I_0$ at the azimuth θ=35° and θ=−35° and the relative luminous intensity $I_2/I_0$ at the azimuth θ=45° and θ=−45° would decrease, i.e., enhance the privacy effect. However, the total traverse and longitudinal luminous flux would decrease.

Further, as illustrated in FIGS. 14A and 14B, in the same way as in FIGS. 8A and 8B, the light L23 of the light L2, which has a medium incident angle to the straight-sloped surface 41A-1 or 41A-2 has an incident angle at the flat surface 42A of the lower prism sheet 4, which is slightly larger than the critical angle thereof. In this case, the light L23 is totally reflected by the flat surface 42A to generate light with a direction declined from the normal angle at the light emitting surface $S_e$ of the upper prism sheet 3. This would generate a broad light distribution whose luminous intensity is large outside the azimuth θ=−35° and θ=35°, which would increase the relative luminous intensities $I_1/I_0$ and $I_2/I_0$, to degrade the privacy effect.

Figure 15A:
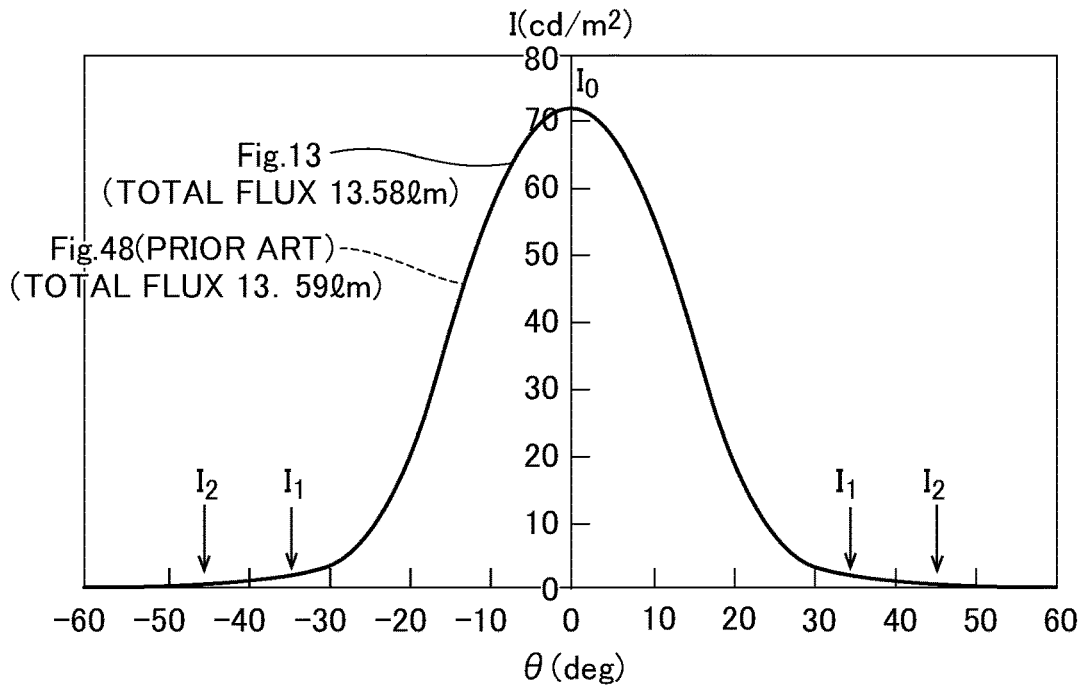
FIG. 15A is a graph showing a traverse (Y-direction) absolute luminous intensity light distribution of the result of the simulated traverse (Y-direction) operation of FIG. 14A.
Figure 15B:
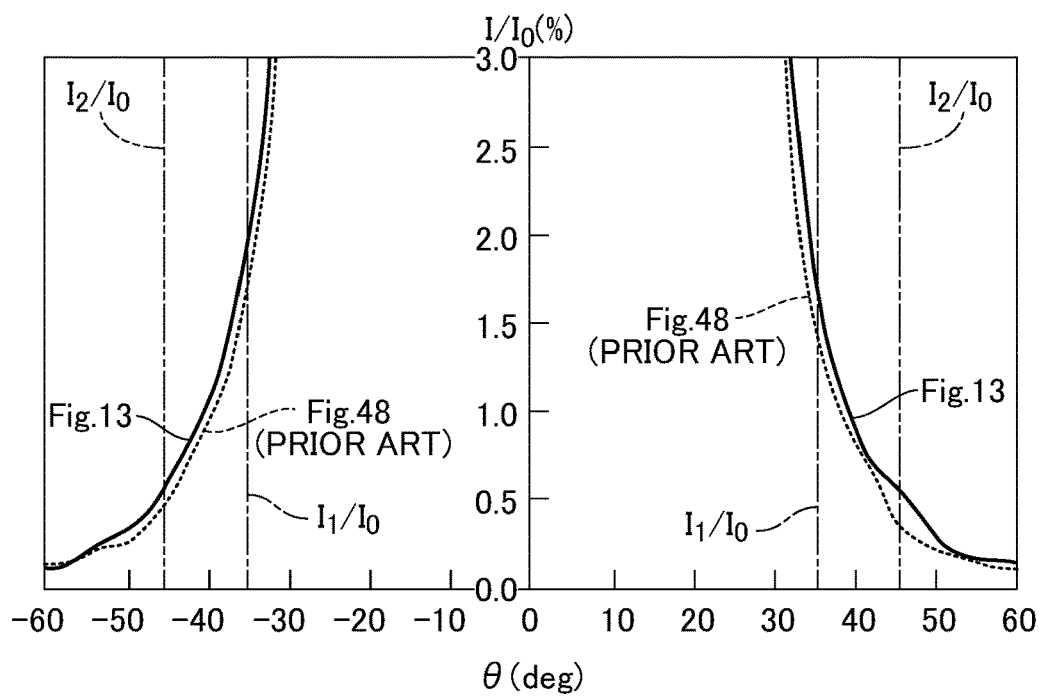
FIG. 15B is a graph showing an enlarged traverse (Y-direction) relative luminous intensity light distribution of FIG. 15A.

FIG. 15A is a graph showing a traverse (Y-direction) absolute luminous intensity light distribution of the result of the simulated traverse (Y-direction) operation of FIG. 14A, FIG. 15B is a graph showing an enlarged traverse (Y-direction) relative luminous intensity light distribution of FIG. 15A, and FIG. 15C is a table showing the privacy effect of the traverse (Y-direction) operation of FIG. 14A.

FIGS. 15A, 15B and 15C show the result of the simulated traverse (Y-direction) operation of FIG. 14A where the side-edge type surface light emitting apparatus of FIG. 13 is compared with the side-edge type surface light emitting apparatus of FIG. 48. Note that the light guide plate 1 and the upper prism sheet 3 are the same in the apparatuses of FIGS. 13 and 48, while the triangular prisms 41A of the lower prism sheet 4A of FIG. 13 are upward and the triangular prisms 41 of the lower prism sheet 4 of FIG. 48 are downward.

Referring to FIG. 15A, the absolute luminous intensity light distribution of the side-edge type surface light emitting apparatus of FIG. 13 is about the same as that of the side-edge type surface light emitting apparatus of FIG. 48; however, the traverse and longitudinal total luminous flux of the side-edge type surface light emitting apparatus of FIG. 13 is slightly smaller than that of the side-edge type surface light emitting apparatus of FIG. 48. This is caused by the light leaked from the flat surface 42A which is absorbed by the light absorbing sheet 5.

Also, referring to FIGS. 15B and 15C, outside the azimuth θ=−35° and θ=35°, the relative luminous intensity $I_1/I_0$ at θ=±35° and the relative luminous intensity $I_2/I_0$ at θ=±45° are slightly larger in the apparatus of FIG. 15 than in the apparatus of FIG. 48, and therefore, the privacy effect is slightly worse in the apparatus of FIG. 13 than in the apparatus of FIG. 48; however, the privacy effect is slightly better in the apparatus of FIG. 13 than in the apparatus of FIG. 1 due to the absorption of the leaked light from the flat surface 42A.

Figure 16A:
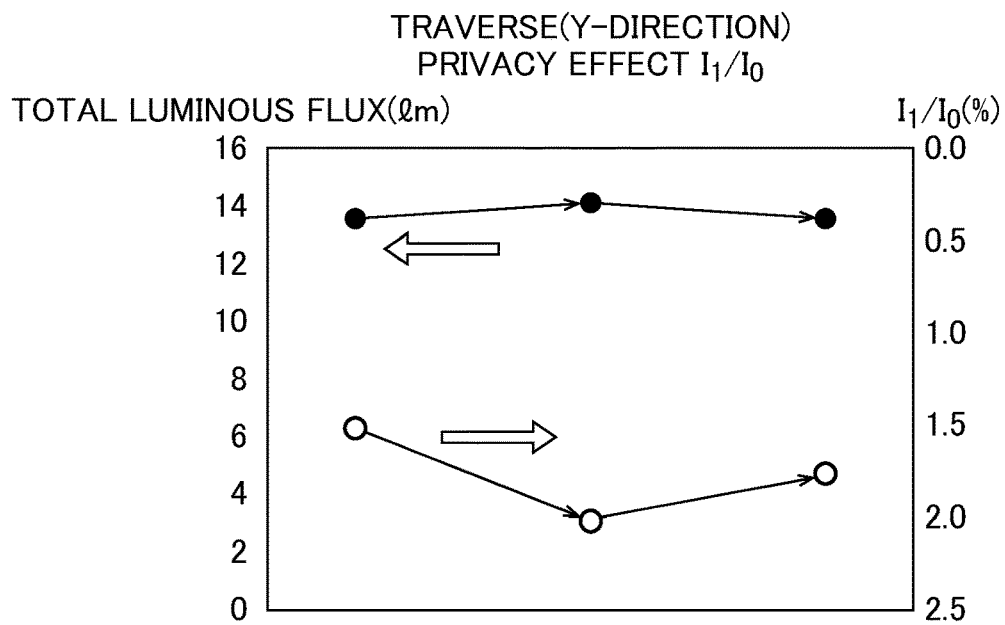
FIG. 16A is a graph showing the total luminous flux and the privacy effect $I_1/I_0$ of the simulated traverse (Y-direction) operation of FIG. 14A.
Figure 16B:
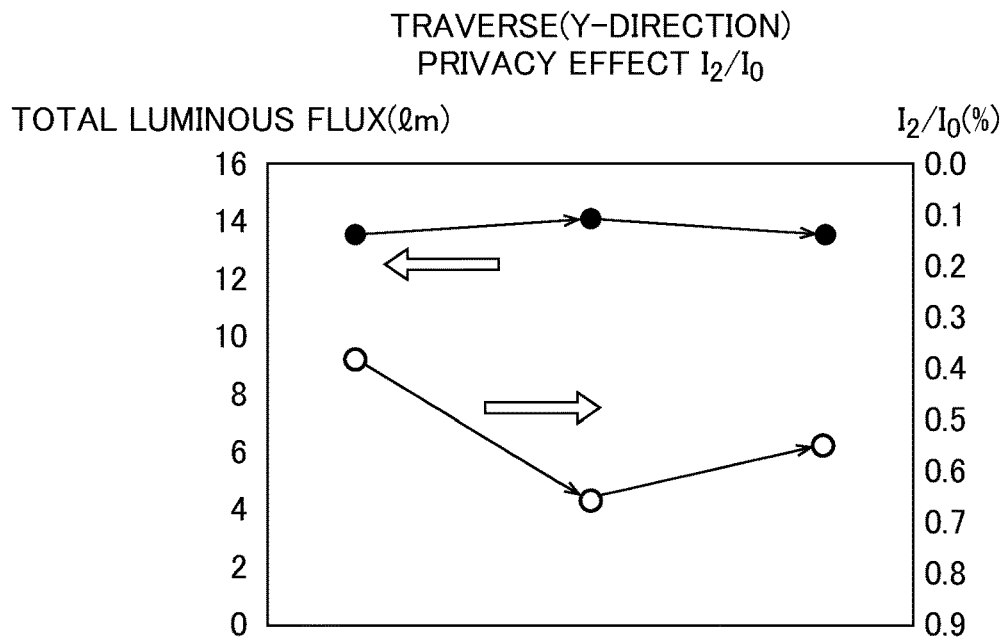
FIG. 16B is a graph showing the total luminous flux and the privacy effect $I_2/I_0$ of the simulated traverse (Y-direction) operation of FIG. 14A.

FIG. 16A is a graph showing the total luminous flux and the privacy effect $I_1/I_0$ of the simulated traverse (Y-direction) operation of FIG. 14A, and FIG. 16B is a graph showing the total luminous flux and the privacy effect $I_2/I_0$ of the simulated traverse (Y-direction) operation of FIG. 14A.

As illustrated in FIGS. 16A and 16B, the traverse and longitudinal total luminous flux is slightly smaller as compared with the side-edge type surface light emitting apparatus of FIG. 1 by the absorption of the leaked light from the flat surface 42A of the lower prism sheet 4A by the light absorbing sheet 5; however, the privacy effects $I_1/I_0$ and $I_2/I_0$ are slightly enhanced.

Figure 17A:
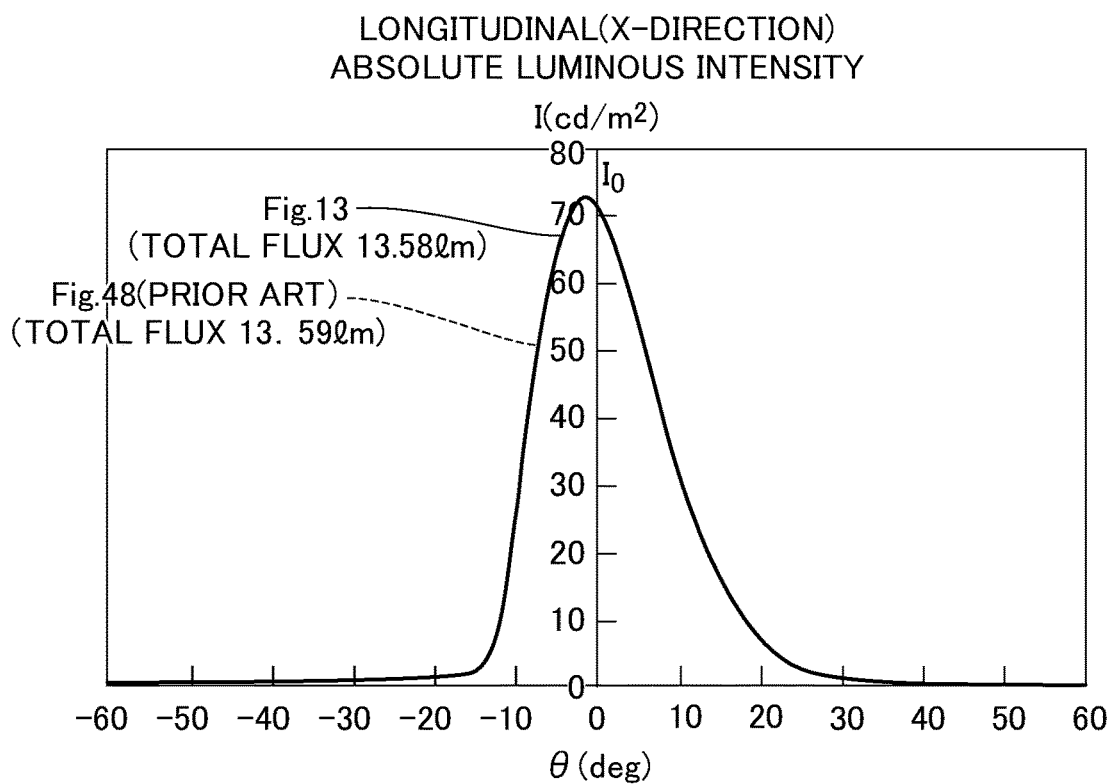
FIG. 17A is a graph showing a longitudinal (X-direction) absolute luminous intensity light distribution of the result of the simulated longitudinal (X-direction) operation of FIG. 14B.
Figure 17B:
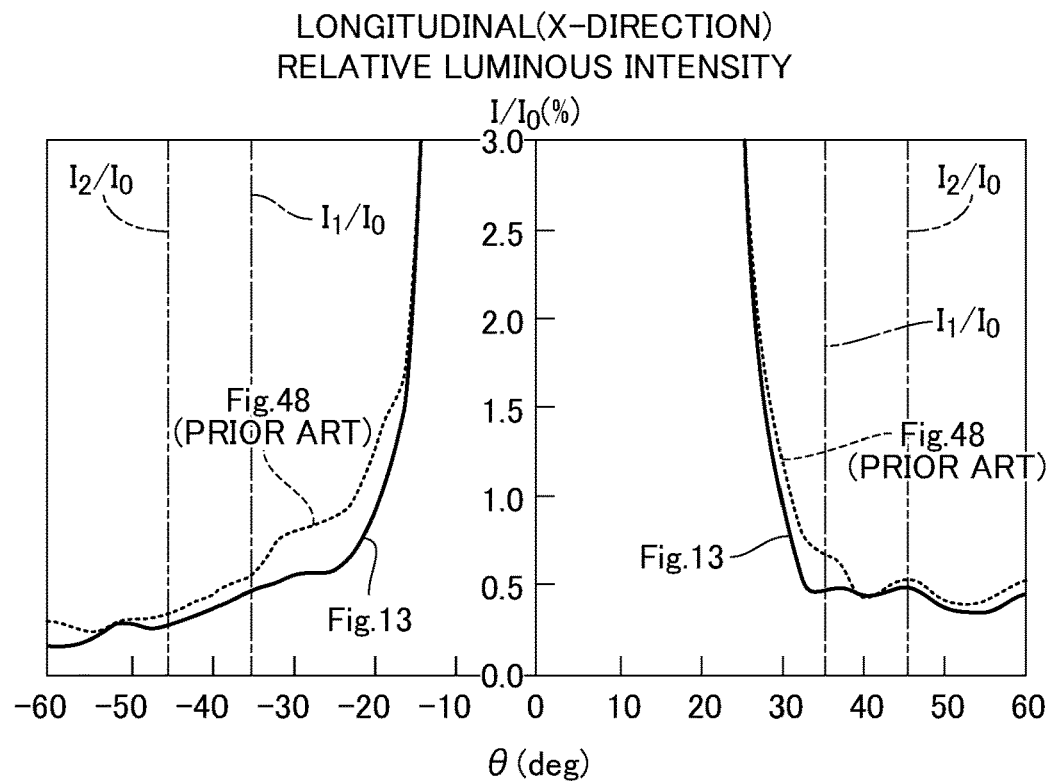
FIG. 17B is a graph showing an enlarged longitudinal (X-direction) relative luminous intensity light distribution of FIG. 17A.

FIG. 17A is a graph showing a longitudinal (X-direction) absolute luminous intensity light distribution of the result of the simulated longitudinal (X-direction) operation of FIG. 14B, FIG. 17B is a graph showing an enlarged longitudinal (X-direction) relative luminous intensity light distribution of FIG. 17A, and FIG. 17C is a table showing the privacy effect of the longitudinal (X-direction) operation of FIG. 14B.

Referring to FIG. 17A, the absolute luminous intensity light distribution of the side-edge type surface light emitting apparatus of FIG. 13 is about the same as that of the side-edge type surface light emitting apparatus of FIG. 48; however, the traverse and longitudinal total luminous flux of the side-edge type surface light emitting apparatus of FIG. 13 is slightly larger than that of the side-edge type surface light emitting apparatus of FIG. 48.

Also, referring to FIGS. 17B and 17C, outside the azimuth $\theta=-35°$ and $\theta=35°$, the relative luminous intensity $I_1/I_0$ at $\theta=\pm 35°$ and the relative luminous intensity $I_2/I_0$ at $\theta=\pm 45°$ are slightly larger in the apparatus of FIG. 13 than in the apparatus of FIG. 48, and therefore, the privacy effects are slightly better in the apparatus of FIG. 13 than in the apparatus of FIG. 48.

Figure 18A:
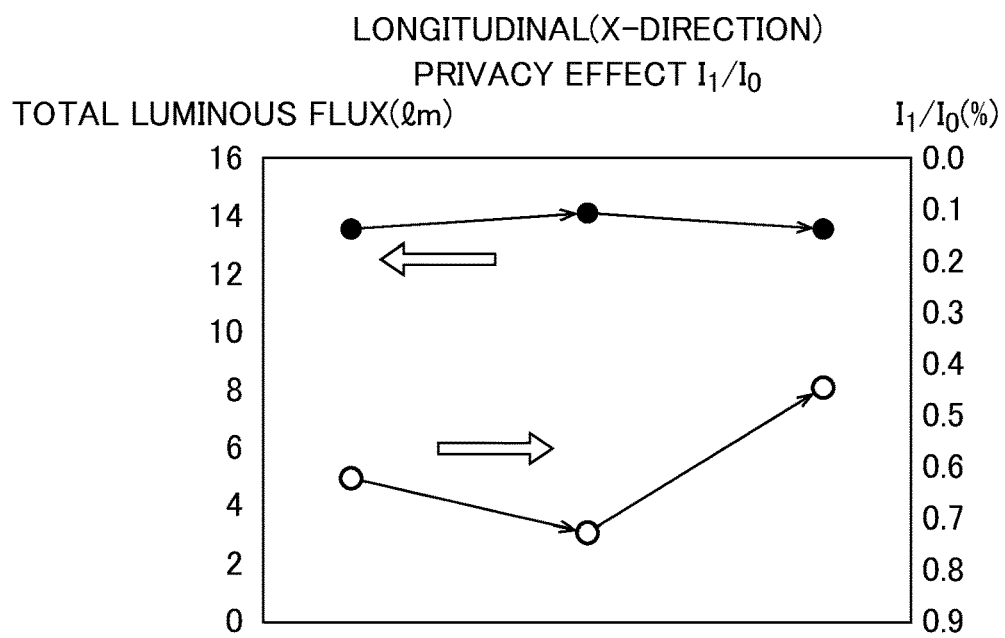
FIG. 18A is a graph showing the total luminous flux and the privacy effect $I_1/I_0$ of the simulated longitudinal (X-direction) operation of FIG. 14B.
Figure 18B:
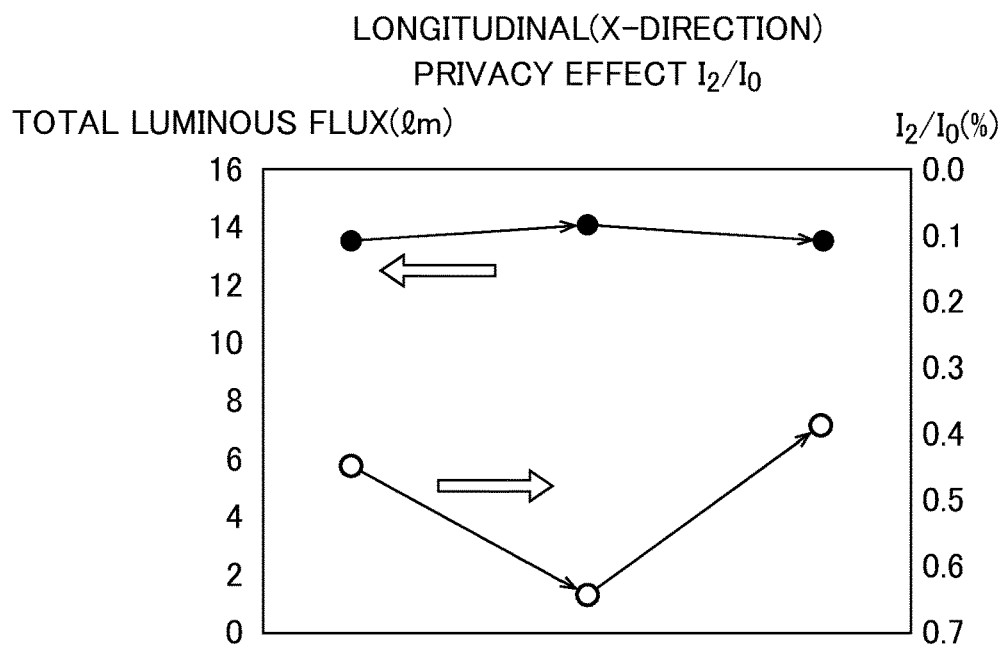
FIG. 18B is a graph showing the total luminous flux and the privacy effect $I_2/I_0$ of the simulated longitudinal (X-direction) operation of FIG. 14B.

FIG. 18A is a graph showing the total luminous flux and the privacy effect $I_1/I_0$ of the simulated longitudinal (X-direction) operation of FIG. 13B, and FIG. 18B is a graph showing the total luminous flux and the privacy effect $I_2/I_0$ of the simulated longitudinal (X-direction) operation of FIG. 13B.

As illustrated in FIGS. 18A and 18B, the traverse and longitudinal total luminous flux is slightly smaller in the side-edge type surface light emitting apparatus of FIG. 13 than the side-edge type surface light emitting apparatus of FIG. 48; however, the privacy effects $I_1/I_0$ and $I_2/I_0$ are slightly enhanced.

Thus, according to the second embodiment as illustrated in FIG. 13, since the outer surface of the lower prism sheet 4A opposing the light absorbing sheet 5 is flat, the handling in the manufacturing steps would be easy, and also, contaminant matters would not be inserted thereinto. Further, in the component carrying operations, fine defects are hardly generated.

Figure 19:
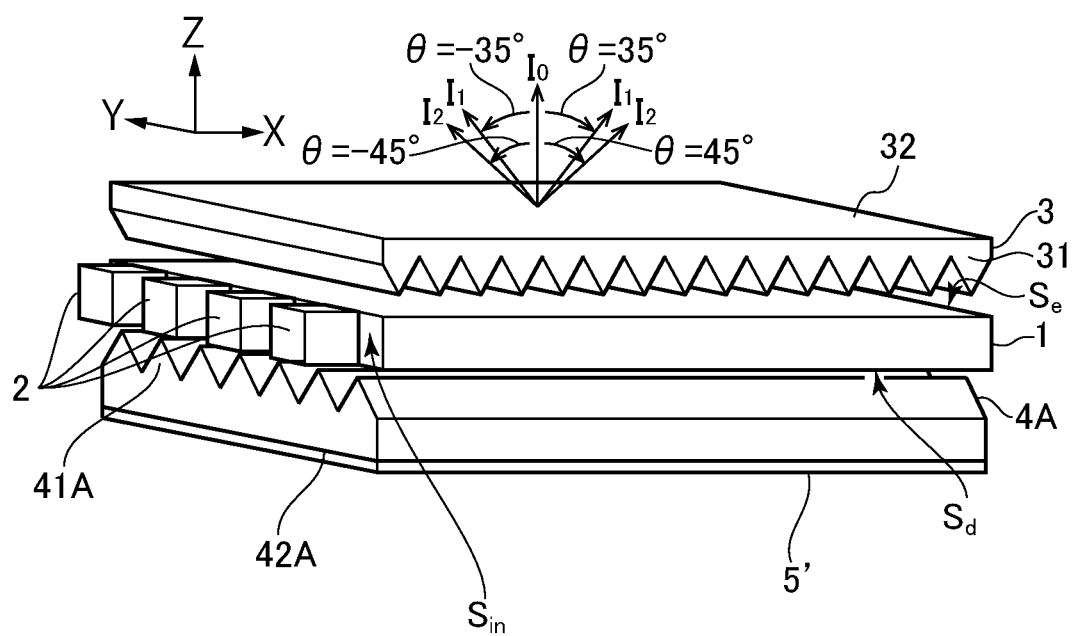
FIG. 19 is a perspective view illustrating a comparative example as compared with the side-edge type surface light emitting apparatus of FIG. 13.

FIG. 19 is a perspective view illustrating a comparative example as compared with the side-edge type surface light emitting apparatus of FIG. 13.

In FIG. 19, a light absorbing layer 5' is provided instead of the light absorbing sheet 5 in the side-edge type surface light emitting apparatus of FIG. 13. In this case, the light absorbing layer 5' is in contact with the lower prism sheet 4A. The light absorbing sheet 5' is also made of polyethylene terephthalate (PET) painted with black ink.

Figure 20A:
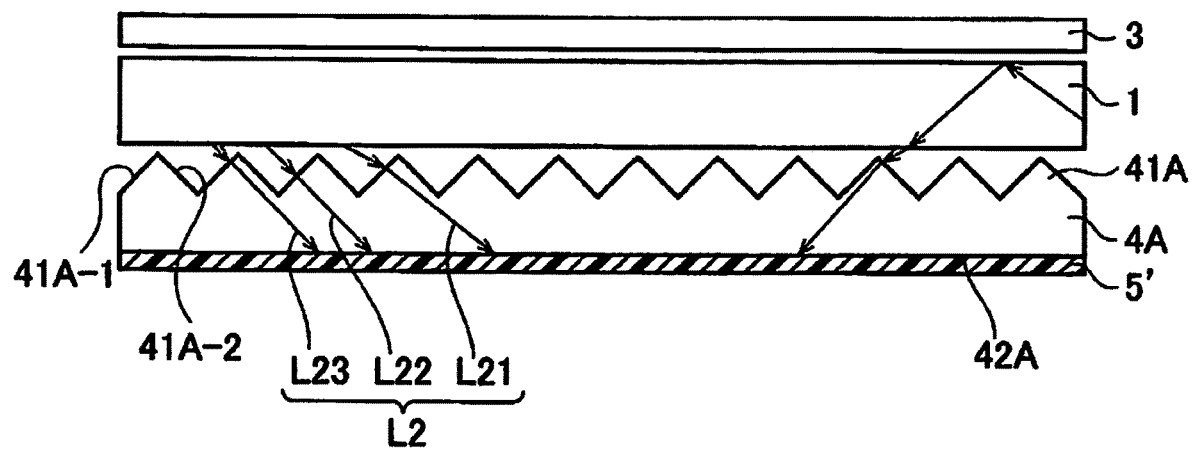
FIG. 20A is a traverse (Y-direction) cross-sectional view for explaining the operation of the side-edge type surface light emitting apparatus of FIG. 19.
Figure 20B:
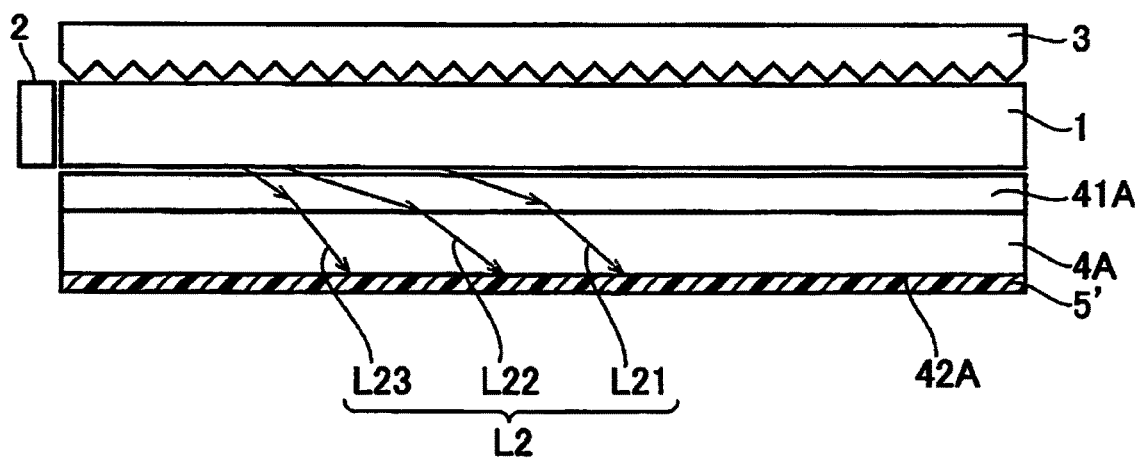
FIG. 20B is a longitudinal (X-direction) cross-sectional view for explaining the operation of the side-edge type surface light emitting apparatus of FIG. 19.

FIG. 20A is a traverse (Y-direction) cross-sectional view for explaining the operation of the side-edge type surface light emitting apparatus of FIG. 19, and FIG. 20B is a longitudinal (X-direction) cross-sectional view for explaining the operation of the side-edge type surface light emitting apparatus of FIG. 19.

As illustrated in FIGS. 20A and 20B, the light L21 of the light L2, which has a relatively large incident angle to the straight-sloped surfaces 41A-1 and 41A-2 of the triangular prisms 41A of the lower prism sheet 4A, is not reflected by the flat surface 42A. That is, the light L21 is absorbed by the light absorbing sheet 5'. As a result, the light L21 decreases the absolute luminous intensity at the azimuth $\theta$ between $-35°$ and $35°$, which would particularly decrease the absolute luminous intensity $I_0$ at the azimuth $\theta=0°$.

On the other hand, as illustrated in FIGS. 20A and 20B, the light L22 of the light L2, which has a relatively small incident angle to the straight-sloped surface 41A-1 or 41A-2 of the triangular prism 41A of the lower prism sheet 4A, is refracted at the flat surface 42A and propagates to the light absorbing sheet 5'. In this case, the incident angle of the light L22 to the flat surface 42A is smaller than the critical angle of the lower prism sheet 4. Therefore, the light L22 never returns to the upper prism sheet 3. This would decrease the absolute luminous intensity $I_1$ at the azimuth $\theta=35°$ and $\theta=-35°$ and the absolute luminous intensity $I_2$ at the azimuth $\theta=45°$ and $-45°$. The relative luminous intensity $I_1/I_0$ at the azimuth $\theta=35°$ and $\theta=-35°$ and the relative luminous intensity $I_2/I_0$ at the azimuth $\theta=45°$ and $\theta=-45°$ would decrease, i.e., enhance the privacy effect. However, the total traverse and longitudinal luminous flux would decrease.

Further, as illustrated in FIGS. 20A and 20B, in the same way as in FIGS. 14A and 14B, the light L23 of the light L2, which has a medium incident angle to the straight-sloped surface 41A-1 or 41A-2 has an incident angle at the flat surface 42A of the lower prism sheet 4, which is slightly larger than the critical angle thereof. Also, in this case, the light L23 absorbed by the light absorbing sheet 5' which would decrease the relative luminous intensities $I_1/I_0$ and $I_2/I_0$, to enhance the privacy effect.

Figure 21A:
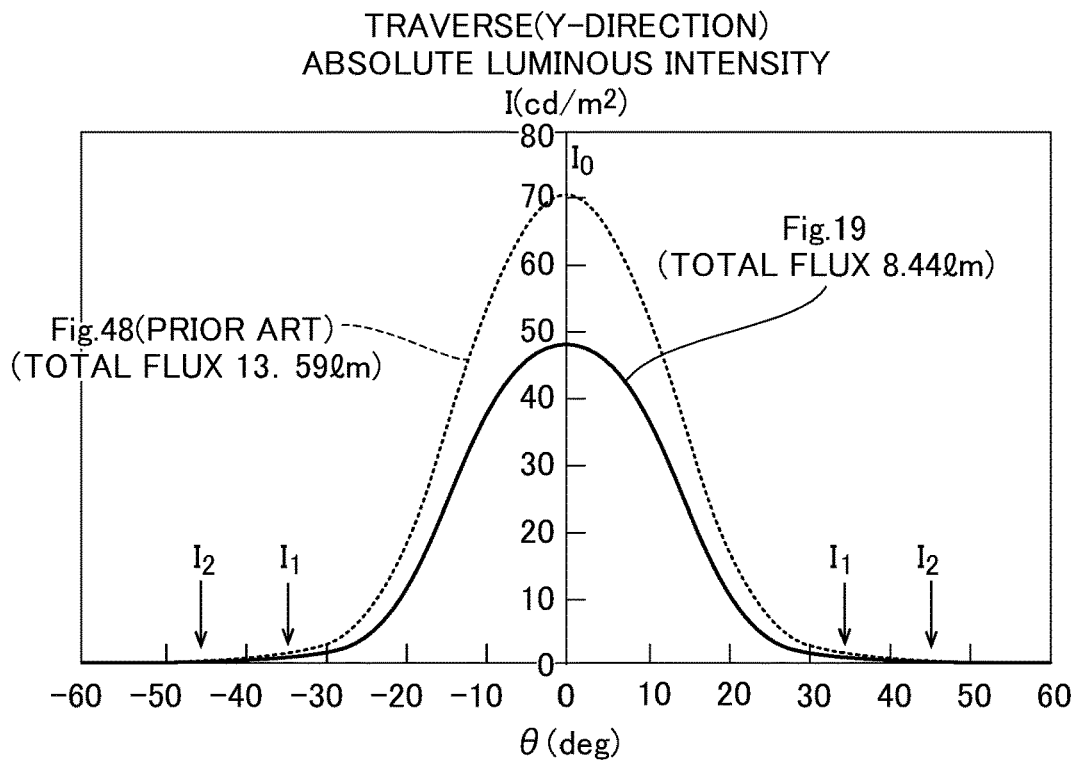
FIG. 21A is a graph showing a traverse (Y-direction) absolute luminous intensity light distribution of the result of the simulated traverse (Y-direction) operation of FIG. 20A.
Figure 21B:
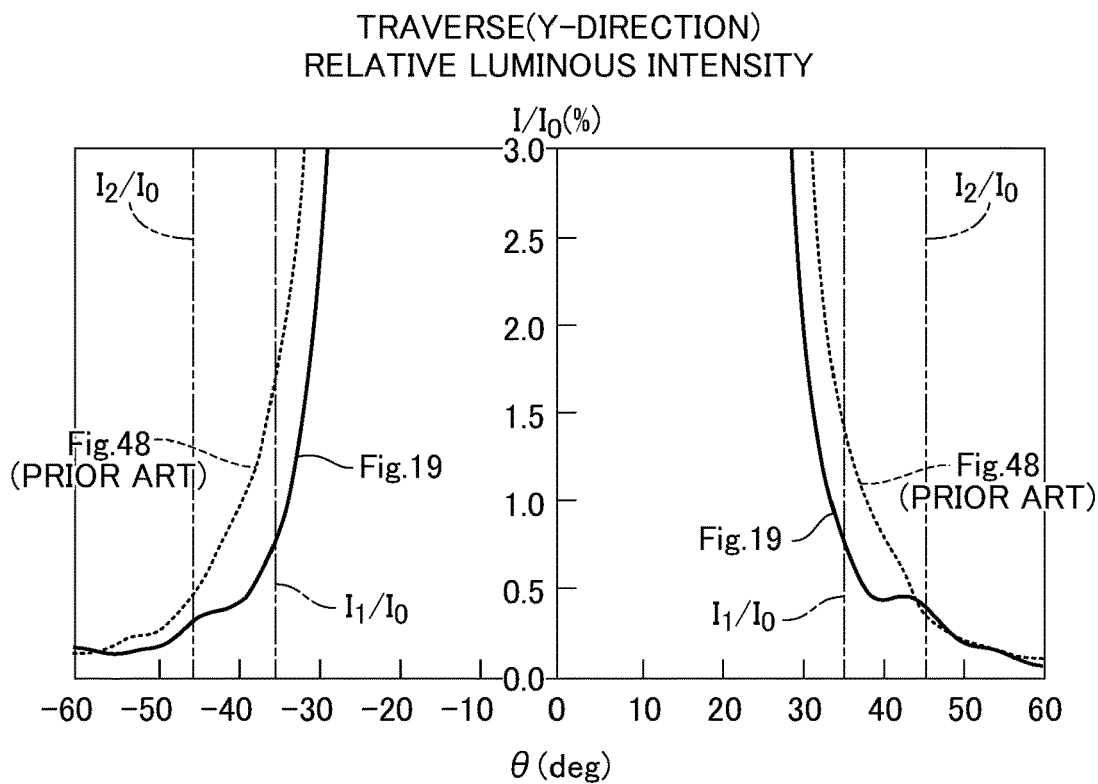
FIG. 21B is a graph showing an enlarged traverse (Y-direction) relative luminous intensity light distribution of FIG. 21A.

FIG. 21A is a graph showing a traverse (Y-direction) absolute luminous intensity light distribution of the result of the simulated traverse (Y-direction) operation of FIG. 20A, FIG. 21B is a graph showing an enlarged traverse (Y-direction) relative luminous intensity light distribution of FIG. 21A, and FIG. 21C is a table showing the privacy effect of the traverse (Y-direction) operation of FIG. 20A.

FIGS. 21A, 21B and 21C show the result of the simulated traverse (Y-direction) operation of FIG. 20A where the side-edge type surface light emitting apparatus of FIG. 19 is compared with the side-edge type surface light emitting apparatus of FIG. 48. Note that the light guide plate 1 and the upper prism sheet 3 are the same in the apparatuses of FIGS. 19 and 48, while the triangular prisms 41A of the lower prism sheet 4A of FIG. 19 are upward and the triangular prisms 41 of the lower prism sheet 4 of FIG. 48 are downward.

Referring to FIG. 21A, the traverse and longitudinal total luminous flux of the side-edge type surface light emitting apparatus of FIG. 19 is much smaller than that of the side-edge type surface light emitting apparatus of FIG. 48. This is caused by the light leaked from the flat surface 42A which is absorbed by the light absorbing sheet 5'.

Also, referring to FIGS. 21B and 21C, outside the azimuth $\theta=-35°$ and $\theta=35°$, the relative luminous intensity $I_1/I_0$ at $\theta=\pm 35°$ and the relative luminous intensity $I_2/I_0$ at $\theta=\pm 45°$ are slightly larger in the apparatus of FIG. 19 than in the apparatus of FIG. 48, and therefore, the privacy effect is slightly better in the apparatus of FIG. 19 than in the apparatus of FIG. 48; however, the privacy effect is slightly better in the apparatus of FIG. 19 than in the apparatus of FIG. 13 due to the absorption of the leaked light from the flat surface 42A by the light absorbing sheet 5'.

FIG. 22A is a graph showing the total luminous flux and the privacy effect $I_1/I_0$ of the simulated traverse (Y-direction) operation of FIG. 19A, and FIG. 22B is a graph showing the total luminous flux and the privacy effect $I_2/I_0$ of the simulated traverse (Y-direction) operation of FIG. 19A.

As illustrated in FIGS. 22A and 22B, the traverse and longitudinal total luminous flux is much smaller as compared with the side-edge type surface light emitting apparatus of FIG. 13 by the absorption of the leaked light from the flat surface 42A of the lower prism sheet 4A by the light absorbing sheet 5'; however, the privacy effects $I_1/I_0$ and $I_2/I_0$ are slightly enhanced.

Figure 23A:
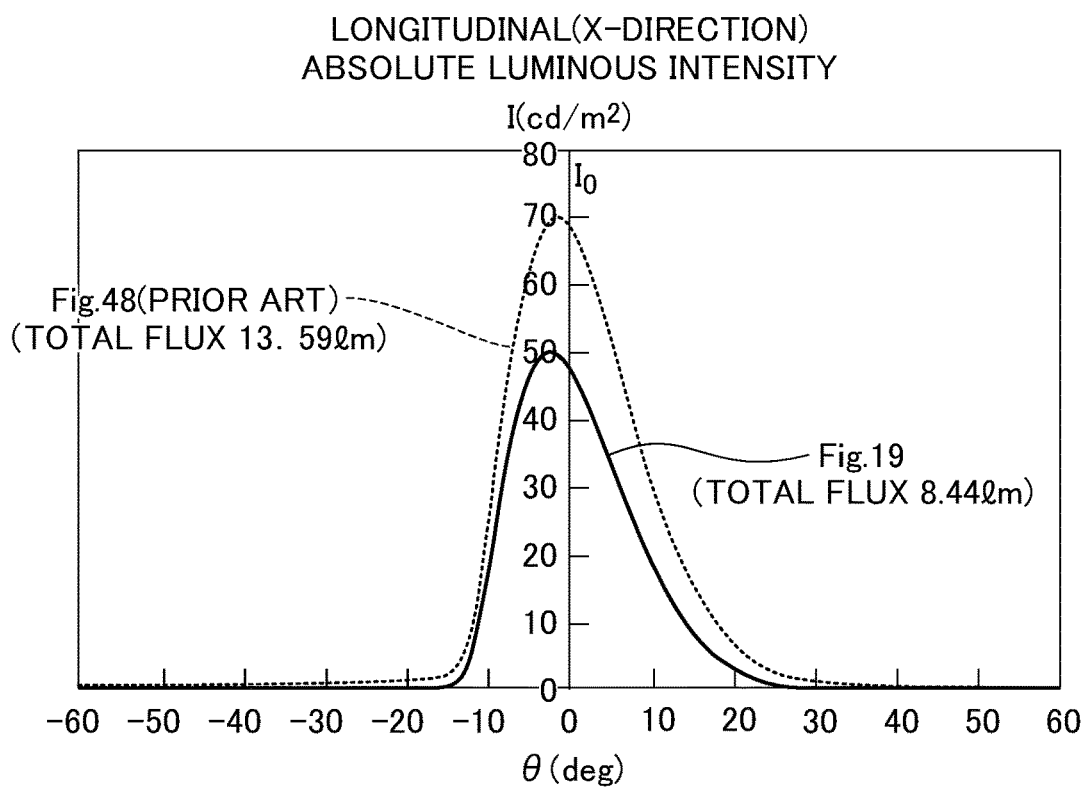
FIG. 23A is a graph showing a longitudinal (X-direction) absolute luminous intensity light distribution of the result of the simulated longitudinal (X-direction) operation of FIG. 20B.
Figure 23B:
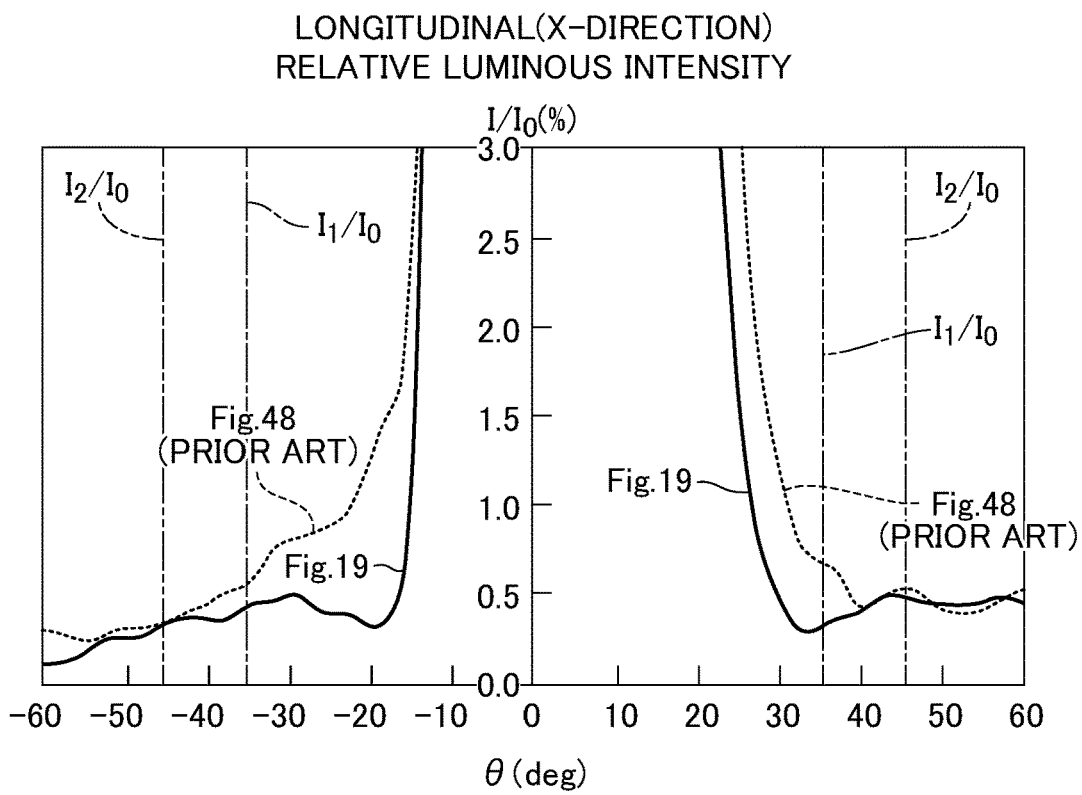
FIG. 23B is a graph showing an enlarged longitudinal (X-direction) relative luminous intensity light distribution of FIG. 23A.

FIG. 23A is a graph showing a longitudinal (X-direction) absolute luminous intensity light distribution of the result of the simulated longitudinal (X-direction) operation of FIG. 22B, FIG. 23B is a graph showing an enlarged longitudinal (X-direction) relative luminous intensity light distribution of FIG. 23A, and FIG. 23C is a table showing the privacy effect of the longitudinal (X-direction) operation of FIG. 22B.

Referring to FIG. 23A, the traverse and longitudinal total luminous flux of the side-edge type surface light emitting apparatus of FIG. 19 is slightly larger than that of the side-edge type surface light emitting apparatus of FIG. 48.

Also, referring to FIGS. 23B and 23C, outside the azimuth $\theta=-35°$ and $\theta=35°$, the relative luminous intensity $I_1/I_0$ at $\theta=\pm35°$ and the relative luminous intensity $I_2/I_0$ at $\theta=\pm45°$ are slightly smaller in the apparatus of FIG. 19 than in the apparatus of FIG. 48, and therefore, the privacy effect is slightly better in the apparatus of FIG. 19 than in the apparatus of FIG. 48.

Figure 24A:
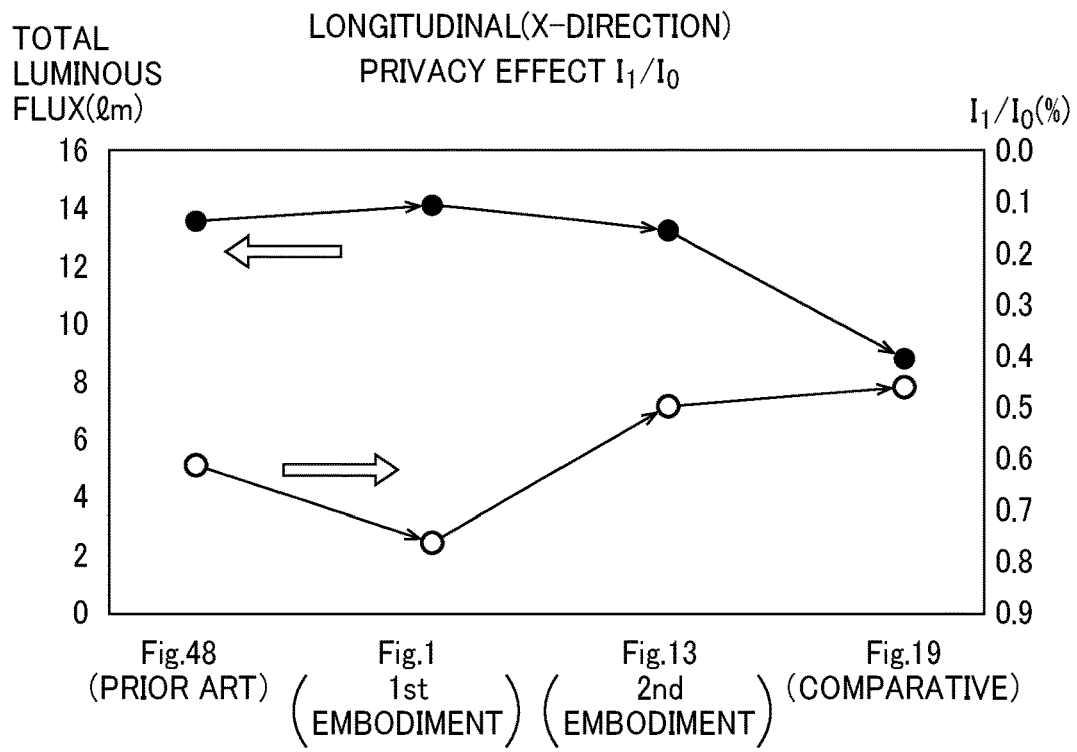
FIG. 24A is a graph showing the total luminous flux and the privacy effect $I_1/I_0$ of the simulated longitudinal (X-direction) operation of FIG. 20B.
Figure 24B:
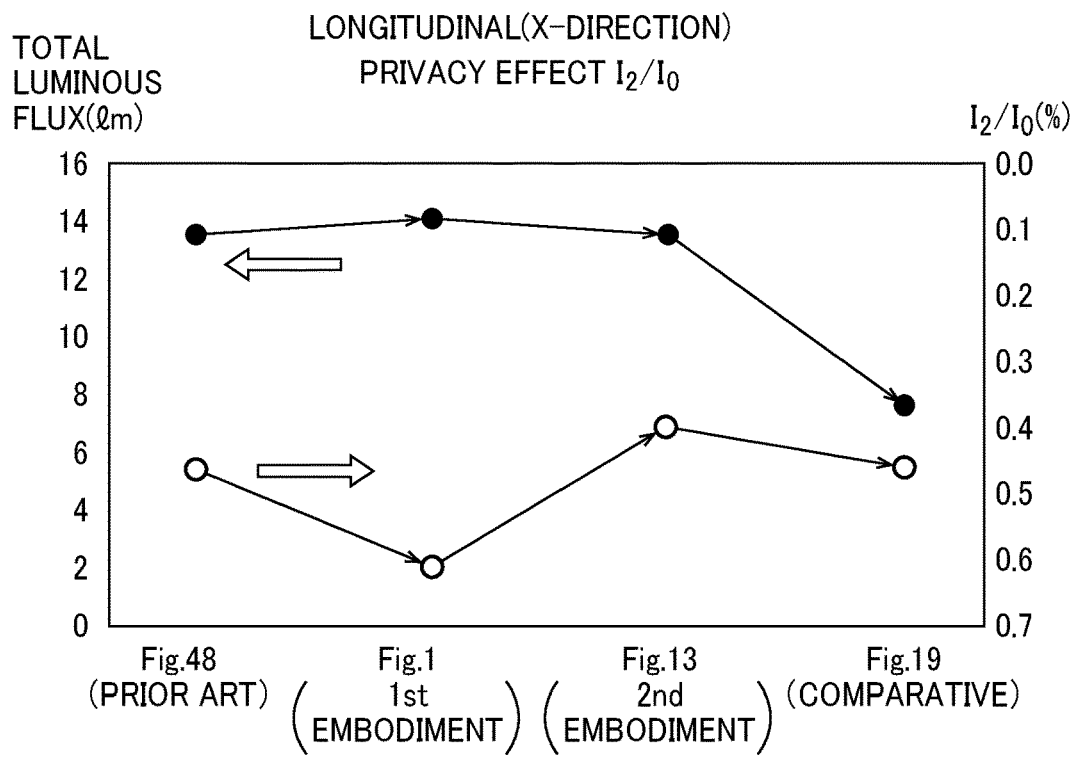
FIG. 24B is a graph showing the total luminous flux and the privacy effect $I_2/I_0$ of the simulated longitudinal (X-direction) operation of FIG. 20B.

FIG. 24A is a graph showing the total luminous flux and the privacy effect $I_1/I_0$ of the simulated longitudinal (X-direction) operation of FIG. 20B, and FIG. 24B is a graph showing the total luminous flux and the privacy effect $I_2/I_0$ of the simulated longitudinal (X-direction) operation of FIG. 20B.

As illustrated in FIGS. 24A and 24B, the traverse and longitudinal total luminous flux is much smaller in the side-edge type surface light emitting apparatus of FIG. 19 than the side-edge type surface light emitting apparatus of FIG. 48; however, the privacy effects $I_1/I_0$ and $I_2/I_0$ are slightly enhanced.

Thus, according to the comparative example as illustrated in FIG. 19, although the privacy effect is slightly enhanced and acceptable, since the total traverse and longitudinal luminous flux is remarkably decreased, the comparative example of FIG. 19 is not preferable as a side-edge type surface light emitting apparatus.

Figure 25:
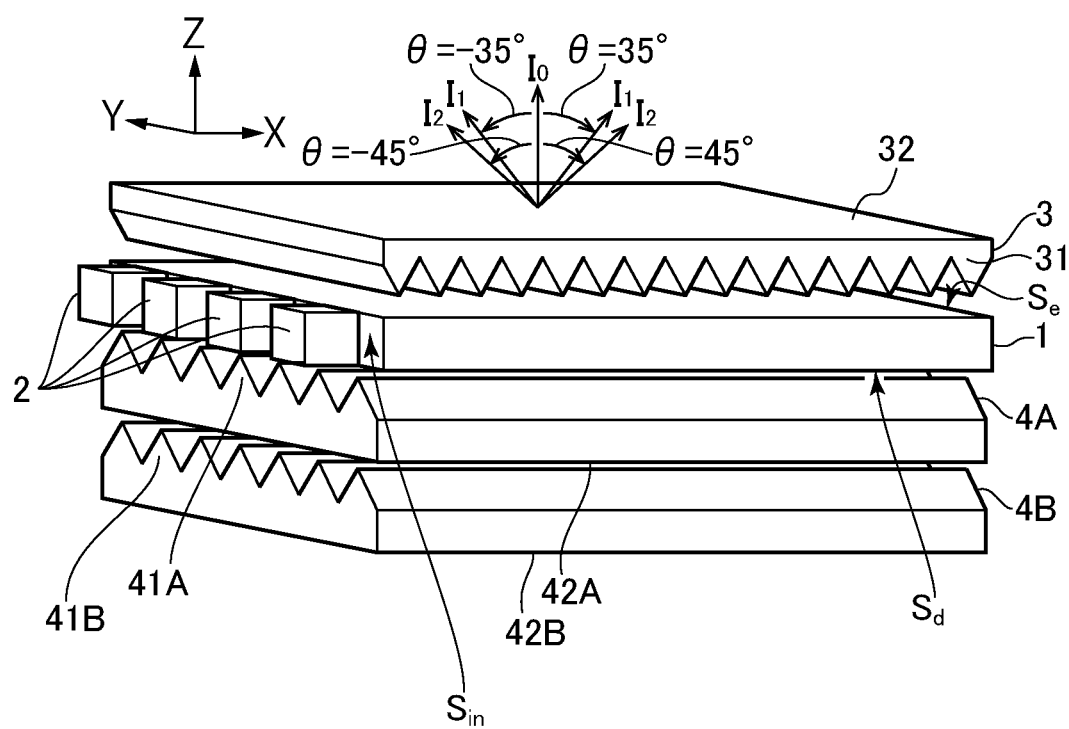
FIG. 25 is a perspective view illustrating a third embodiment of the side-edge type surface light emitting apparatus according to the presently disclosed subject matter.

FIG. 25 is a perspective view illustrating a third embodiment of the side-edge type surface light emitting apparatus according to the presently disclosed subject matter.

In FIG. 25, a lower prism sheet 4B having the same structure as the lower prism sheet 4A of FIG. 1 is added to the lower side thereof.

Figure 26A:
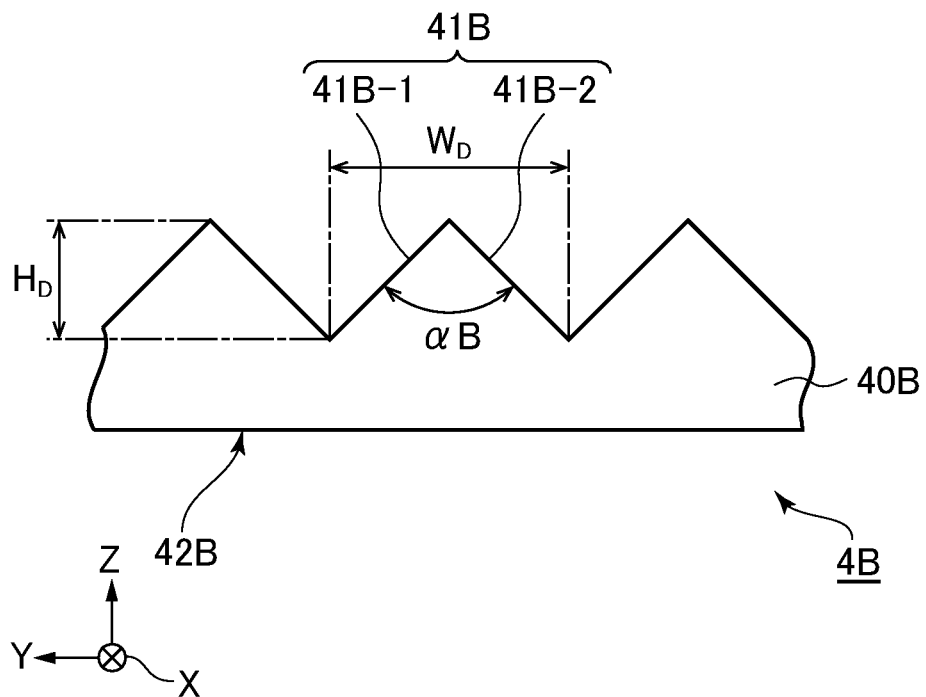
FIG. 26A is a cross-sectional view of the additional lower prism sheet of FIG. 25.

That is, as illustrated in FIG. 26A, the lower prism sheet 4B is constructed by a lower base section 40B with a flat surface 42B and equidistantly-disposed, triangular upper prisms 41B perpendicular to the light incident surface $S_{in}$ (see: FIG. 1). The base section 40B is made of polyethylene terephthalate (PET), polycarbonate or polymethyl methacrylate. The upper prisms 41B are made of ultraviolet curing hardening resin such as polymer acrylate. The prisms 41B oppose the flat surface 42A of the lower prism sheet 4A, and have straight-sloped surfaces 41B-1 and 41B-2 symmetrically along the X-direction. In this case, the apical α B is about 85° to 95° such as 90°. The width $W_D$ of the upper prisms 41B is about 25 to 30 μm, for example, and the height $H_D$ of the upper prisms 41B is about 10 to 16 μm, for example, which is smaller than the height $H_D$ of the prisms 31. The width $W_D$ and the height $H_D$ can be changed as occasion demands, to remove the moire fringes caused by the backlight and liquid combination.

Figure 26B:
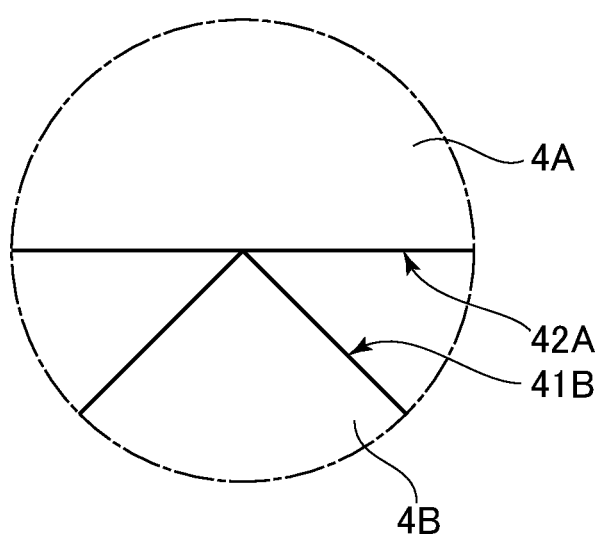
FIG. 26B is a cross-sectional view showing the contact portions of the lower prism sheets of FIG. 25.

Also, as illustrated in FIG. 26B, since the lower prism sheets 4A and 4B are made of medium hard transparent resin, the flat surface 42A of the lower prism sheet 4A and the triangular prisms 41B of the lower prism sheet 4B are in contact with each other by the weight force therebetween. In this case, each tip portion of the triangular prisms 41B is slightly rounded. As a result, the light, which should have been totally reflected at the flat surface 42A of the lower prism sheet 4A to decrease the privacy effect, is refracted into the rounded tip portion to enhance the privacy effect.

Figure 27A:
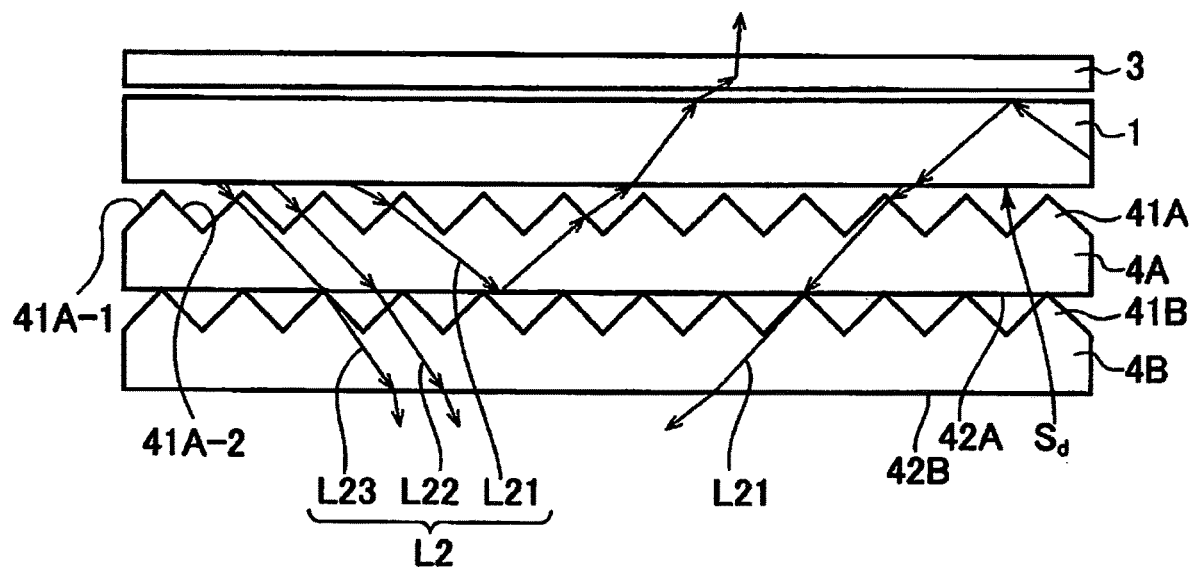
FIG. 27A is a traverse (Y-direction) cross-sectional view for explaining the operation of the side-edge type surface light emitting apparatus of FIG. 25.
Figure 27B:
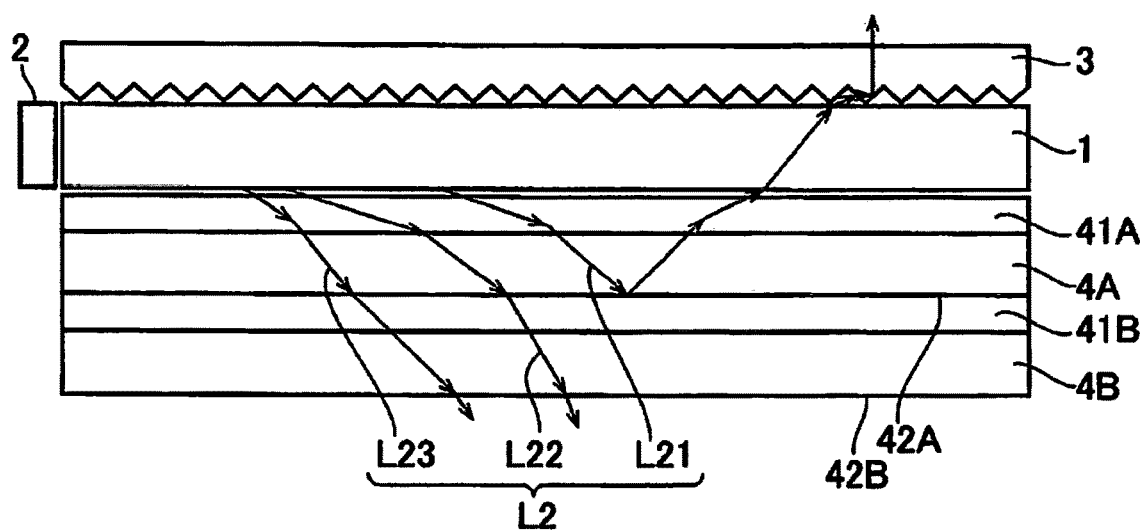
FIG. 27B is a longitudinal (X-direction) cross-sectional view for explaining the operation of the side-edge type surface light emitting apparatus of FIG. 25.

FIG. 27A is a traverse (Y-direction) cross-sectional view for explaining the operation of the side-edge type surface light emitting apparatus of FIG. 25, and FIG. 27B is a longitudinal (X-direction) cross-sectional view for explaining the operation of the side-edge type surface light emitting apparatus of FIG. 25.

As illustrated in FIGS. 27A and 27B, in the same way as in FIGS. 8A and 8B, the light L21 of the light L2, which has a relatively large incident angle to the straight-sloped surfaces 41A-1 and 41A-2 of the triangular prisms 41A of the lower prism sheet 4A, is totally reflected by the flat surface 42A and returns to the light guide plate 1. In this case, the incident angle of the light L21 to the flat surface 42A is larger than the critical angle of the lower prism sheet 4A, so that the light L21 is totally reflected by the flat surface 42A to return to the light guide plate 1. As a result, the light L21 can be emitted from the flat surface $S_e$ of the upper prism sheet 3 at the azimuth θ between −35° and 35°, which would particularly enhance the absolute luminous intensity $I_0$ at the azimuth θ=0°.

On the other hand, as illustrated in FIGS. 27A and 27B, the light L22 of the light L2, which has a relatively small incident angle to the straight-sloped surface 41A-1 or 41A-2 of the triangular prism 41A of the lower prism sheet 4A, is refracted at the flat surface 42A, so that the light L22 is incident to the lower prism sheet 4B. As a result, the light L22 does not return to the upper prism sheet 3. In this case, the incident angle of the light L22 to the flat surface 42A is smaller than the critical angle of the lower prism sheet 4. This would decrease the absolute luminous intensity $I_1$ at the azimuth θ=35° and θ=−35° and the absolute luminous intensity $I_2$ at the azimuth θ=45° and −45°. The relative luminous intensity $I_1/I_0$ at the azimuth θ=35° and θ=−35° and the relative luminous intensity $I_2/I_0$ at the azimuth θ=45° and θ=−45° would decrease, i.e., enhance the privacy effect. Note that a part of the light L22 leaked from the flat surface 42B of the lower prism sheet 4B is reflected by the housing (reflector) of the apparatus constitutes return light to the lower prism sheets 4B and 4A. This return light would increase the total luminous flux, but degrade the privacy effect.

Further, as illustrated in FIGS. 27A and 27B, the light L23 of the light L2, which has a medium incident angle to the straight-sloped surface 41A-1 or 41A-2 has an incident angle at the flat surface 42A of the lower prism sheet 4, which is slightly larger than the critical angle thereof. In this case, a part of the light L23 is incident to the tip portions of the triangular prisms 41B of the lower prism sheet 4B and does not return to the upper prism sheet 3, which would enhance the privacy effect. Even in this case, a part of the light L23 leaked from the flat surface 42B of the lower prism sheet 4B is reflected by the housing (reflector) of the apparatus and constitutes return light to the lower prism sheets 4B and 4A and further to the upper prism sheet 3, which would generate light with a direction declined from the normal angle at the light emitting surface $S_e$ of the upper prism sheet 3. This would generate a broad light distribution whose luminous intensity is large outside the azimuth θ=−35° and θ=35°, which would increase the relative luminous intensities $I_1/I_0$ and $I_2/I_0$, to degrade the privacy effect.

Figure 28A:
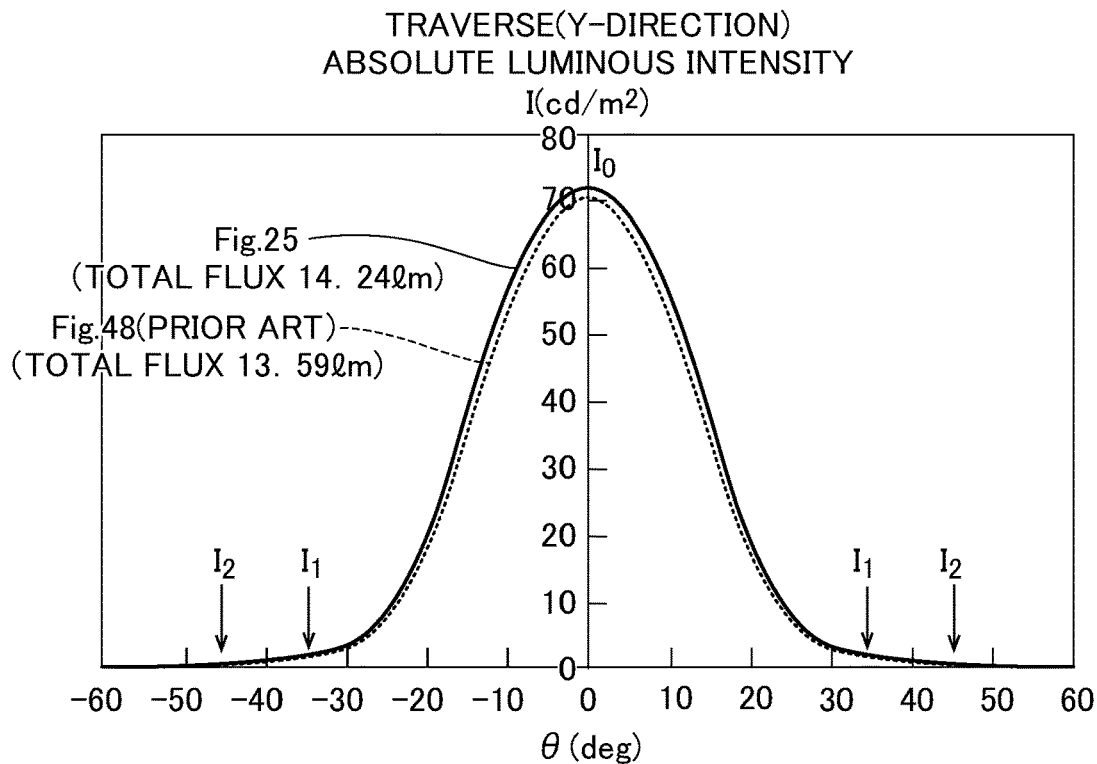
FIG. 28A is a graph showing a traverse (Y-direction) absolute luminous intensity light distribution of the result of the simulated traverse (Y-direction) operation of FIG. 27A.
Figure 28B:
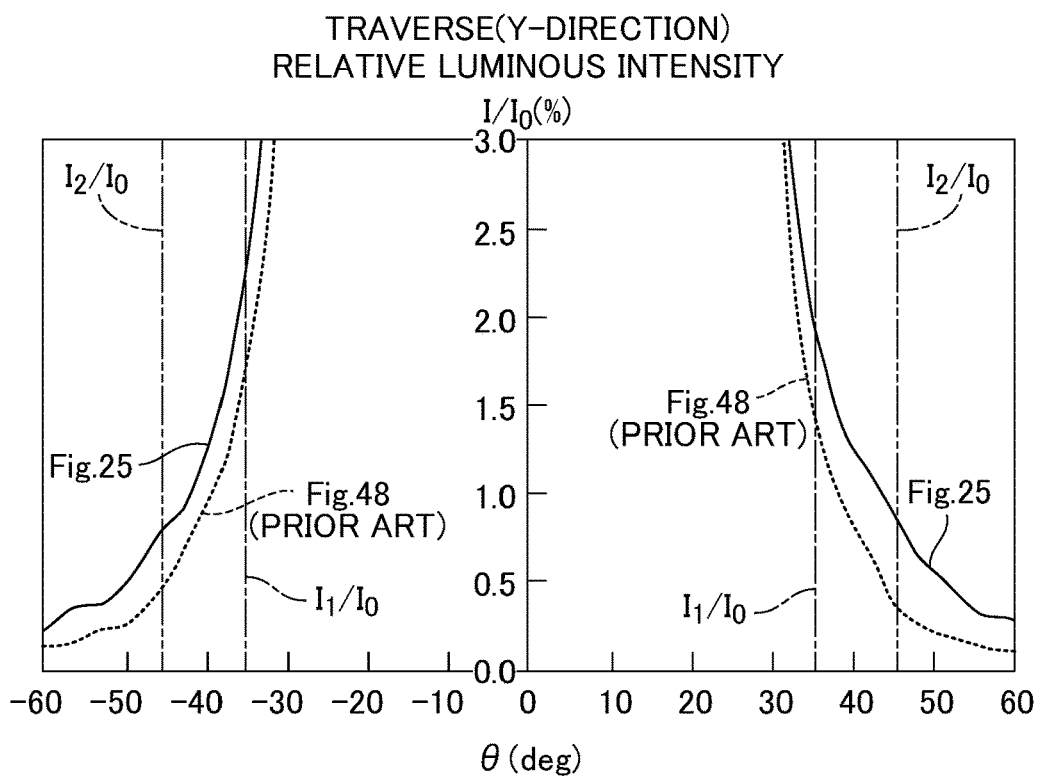
FIG. 28B is a graph showing an enlarged traverse (Y-direction) relative luminous intensity light distribution of FIG. 27A.

FIG. 28A is a graph showing a traverse (Y-direction) absolute luminous intensity light distribution of the result of the simulated traverse (Y-direction) operation of FIG. 27A, FIG. 28B is a graph showing an enlarged traverse (Y-direction) relative luminous intensity light distribution of FIG. 28A, and FIG. 28C is a table showing the privacy effect of the traverse (Y-direction) operation of FIG. 27A.

FIGS. 28A, 28B and 28C show the result of the simulated traverse (Y-direction) operation of FIG. 27A where the side-edge type surface light emitting apparatus of FIG. 25 is compared with the side-edge type surface light emitting apparatus of FIG. 48. Note that the light guide plate 1 and the upper prism sheet 3 are the same in the apparatuses of FIGS. 25 and 48, while the triangular prisms 41A and 41B of the lower prism sheets 4A and 4B of FIG. 25 are upward and the triangular prisms 41 of the lower prism sheet 4 of FIG. 48 are downward. Also, the light absorbing sheet 5 is provided only in the apparatus of FIG. 48.

Referring to FIG. 28A, the absolute luminous intensity light distribution of the side-edge type surface light emitting apparatus of FIG. 25 is about the same as that of the side-edge type surface light emitting apparatus of FIG. 48; however, the traverse and longitudinal total luminous flux of the side-edge type surface light emitting apparatus of FIG. 25 is slightly larger than that of the side-edge type surface light emitting apparatus of FIG. 48. This is caused by the light leaked from the flat surface 42B returning thereto due to the reflection of light at the housing (reflector) of the apparatus of FIG. 25.

Also, referring to FIGS. 28B and 28C, outside the azimuth θ=−35° and θ=35°, the relative luminous intensity $I_1/I_0$ at θ=±35° and the relative luminous intensity $I_2/I_0$ at θ=±45° are slightly larger in the apparatus of FIG. 1 than in the apparatus of FIG. 48, and therefore, the privacy effects are slightly worse in the apparatus of FIG. 25 than in the apparatus of FIG. 48; however, this is acceptable.

Figure 29A:
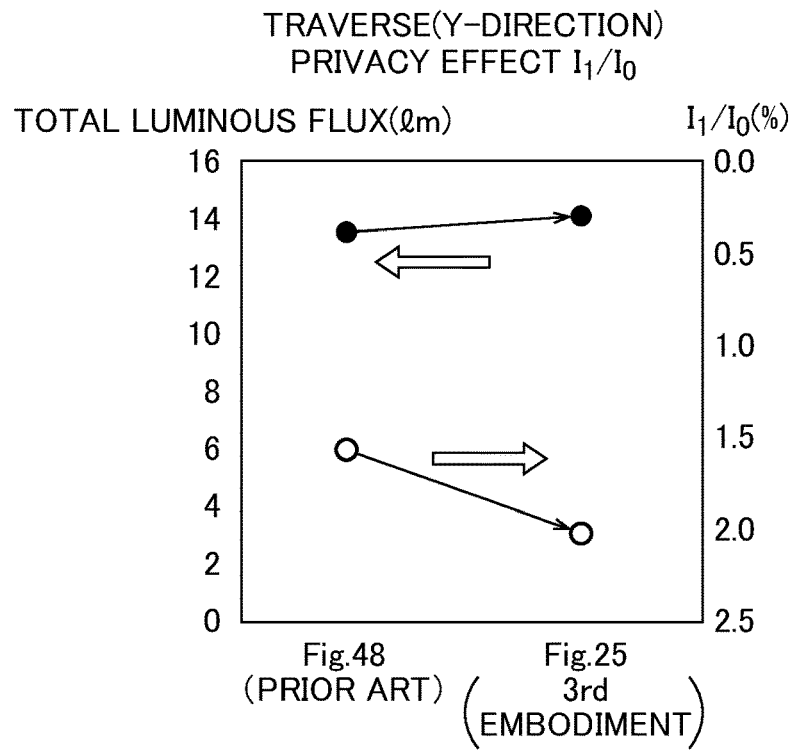
FIG. 29A is a graph showing the total luminous flux and the privacy effect $I_1/I_0$ of the simulated traverse (Y-direction) operation of FIG. 27A.
Figure 29B:
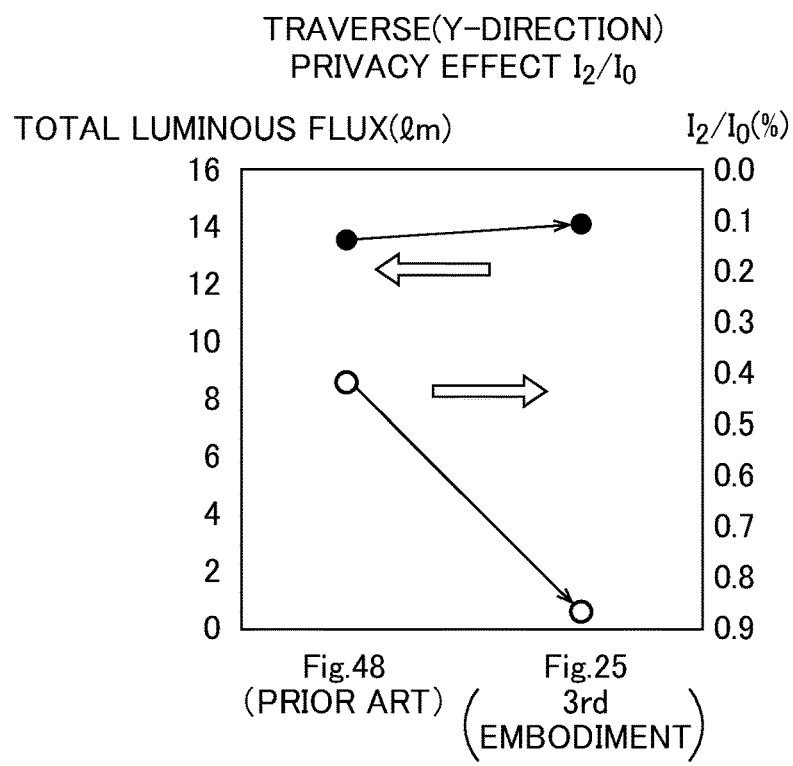
FIG. 29B is a graph showing the total luminous flux and the privacy effect $I_2/I_0$ of the simulated traverse (Y-direction) operation of FIG. 27A.

FIG. 29A is a graph showing the total luminous flux and the privacy effect $I_1/I_0$ of the simulated traverse (Y-direction) operation of FIG. 27A, and FIG. 29B is a graph showing the total luminous flux and the privacy effect $I_2/I_0$ of the simulated traverse (Y-direction) operation of FIG. 27A.

As illustrated in FIGS. 29A and 29B, the traverse and longitudinal total luminous flux is slightly larger as compared with the side-edge type surface light emitting apparatus of FIG. 48 by the return light due to the housing (reflector) of the apparatus; however, the privacy effects $I_1/I_0$ and $I_2/I_0$ are slightly degraded, which is acceptable.

Figure 30A:
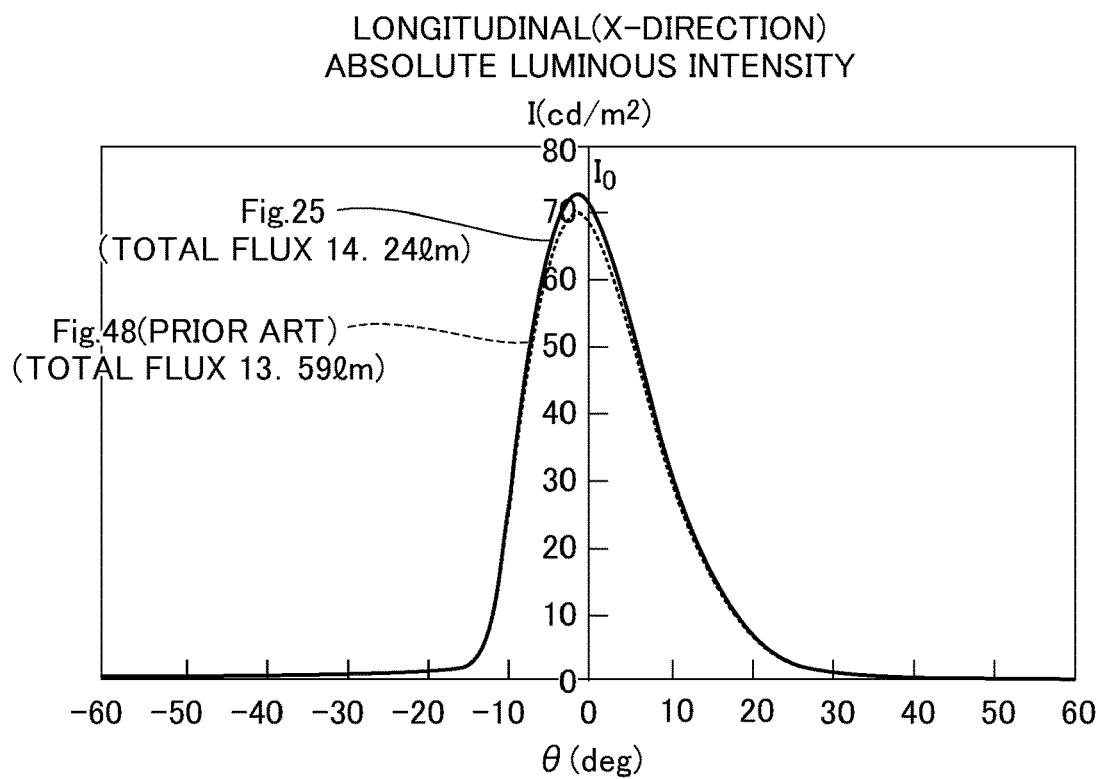
FIG. 30A is a graph showing a longitudinal (X-direction) absolute luminous intensity light distribution of the result of the simulated longitudinal (X-direction) operation of FIG. 29B.
Figure 30B:
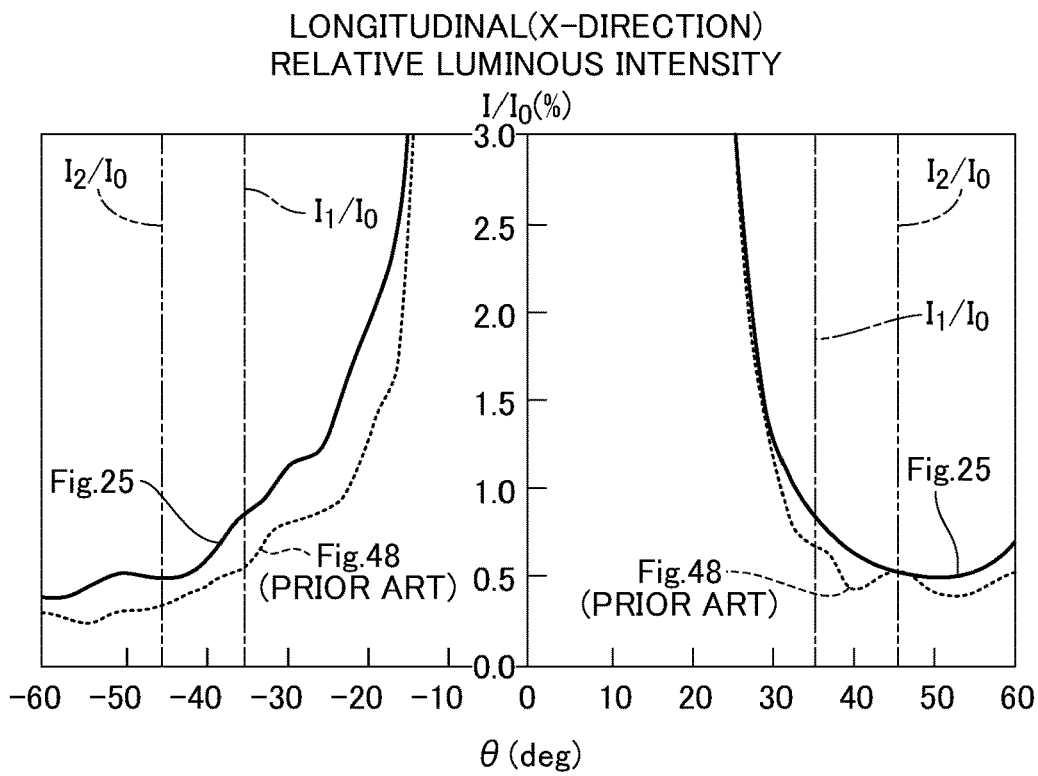
FIG. 30B is a graph showing an enlarged longitudinal (X-direction) relative luminous intensity light distribution of FIG. 30A.

FIG. 30A is a graph showing a longitudinal (X-direction) absolute luminous intensity light distribution of the result of the simulated longitudinal (X-direction) operation of FIG. 27B, FIG. 30B is a graph showing an enlarged longitudinal (X-direction) relative luminous intensity light distribution of FIG. 30A, and FIG. 30C is a table showing the privacy effect of the longitudinal (X-direction) operation of FIG. 27B.

Referring to FIG. 30A, the absolute luminous intensity light distribution of the side-edge type surface light emitting apparatus of FIG. 25 is about the same as that of the side-edge type surface light emitting apparatus of FIG. 48; however, the traverse and longitudinal total luminous flux of the side-edge type surface light emitting apparatus of FIG. 25 is slightly larger than that of the side-edge type surface light emitting apparatus of FIG. 48. This is caused by the light leaked from the flat surface 42B of the lower prism sheet 4B returning to the lower prism sheets 4B and 4A due to the reflection of light at the housing (reflector) of the apparatus of FIG. 25.

Also, referring to FIGS. 30B and 30C, outside the azimuth θ=−35° and θ=35°, the relative luminous intensity $I_1/I_0$ at θ=±35° and the relative luminous intensity $I_2/I_0$ at θ=±45° are slightly larger in the apparatus of FIG. 25 than in the apparatus of FIG. 48, and therefore, the privacy effect is slightly worse in the apparatus of FIG. 25 than in the apparatus of FIG. 48; however, this is acceptable.

Figure 31A:
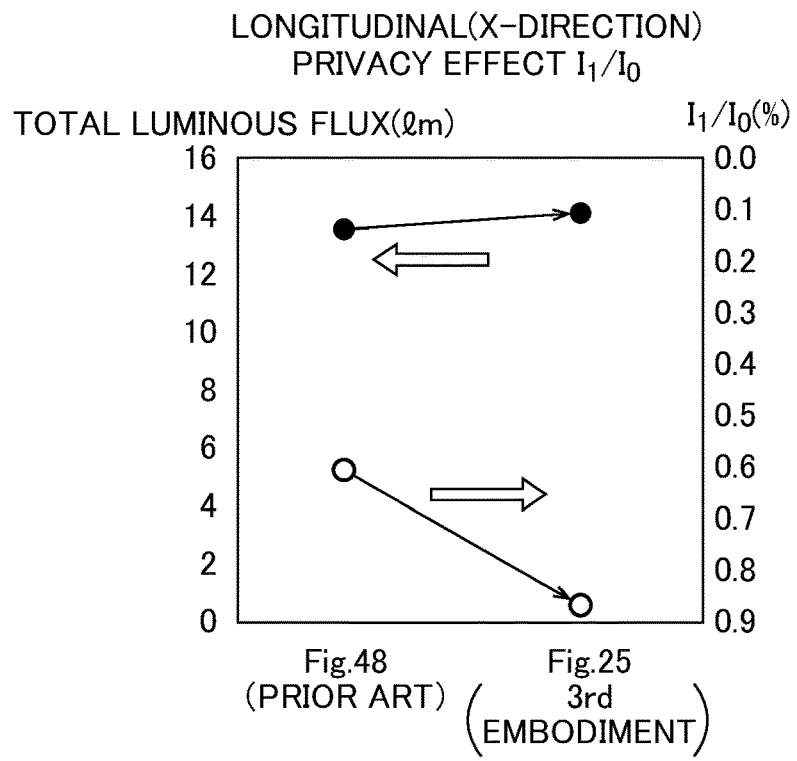
FIG. 31A is a graph showing the total luminous flux and the privacy effect $I_1/I_0$ of the simulated longitudinal (X-direction) operation of FIG. 29B.
Figure 31B:
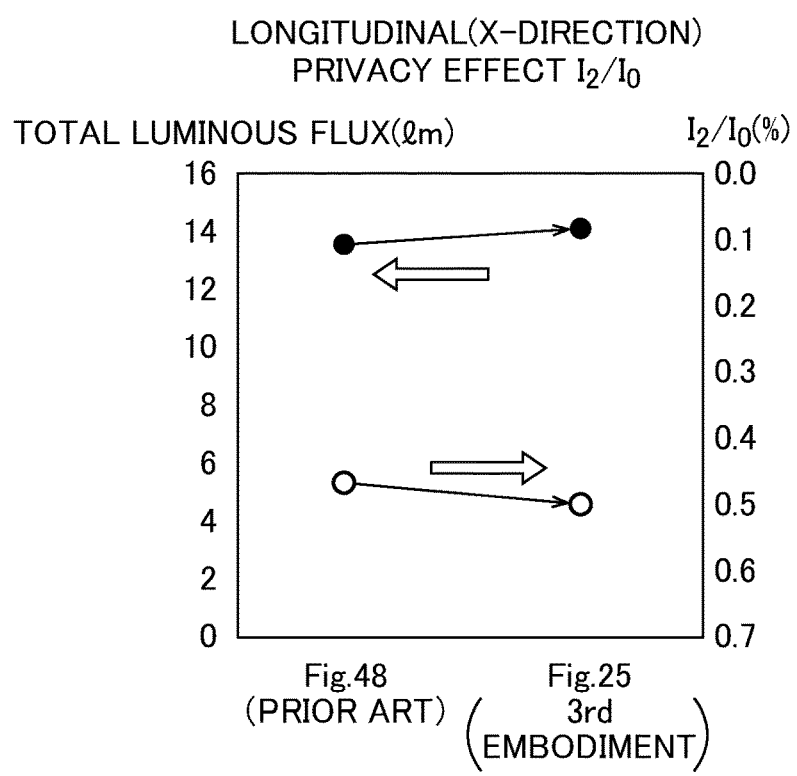
FIG. 31B is a graph showing the total luminous flux and the privacy effect $I_2/I_0$ of the simulated longitudinal (X-direction) operation of FIG. 29B.

FIG. 31A is a graph showing the total luminous flux and the privacy effect $I_1/I_0$ of the simulated longitudinal (X-direction) operation of FIG. 27B, and FIG. 31B is a graph showing the total luminous flux and the privacy effect $I_2/I_0$ of the simulated longitudinal (X-direction) operation of FIG. 27B.

As illustrated in FIGS. 31A and 31B, the traverse and longitudinal total luminous flux is slightly larger as compared with the side-edge type surface light emitting apparatus of FIG. 48 by the return light due to the housing (reflector) of the apparatus; however, the privacy effects $I_1/I_0$ and $I_2/I_0$ are slightly degraded, which is acceptable.

Thus, according to the third embodiment as illustrated in FIG. 25, since the outer surface of the lower prism sheet 4B is flat, the handling in the manufacturing steps would be easy, and also, contaminant matters would not be inserted thereinto. Further, in the component carrying operations, fine defects are hardly generated.

Figure 32:
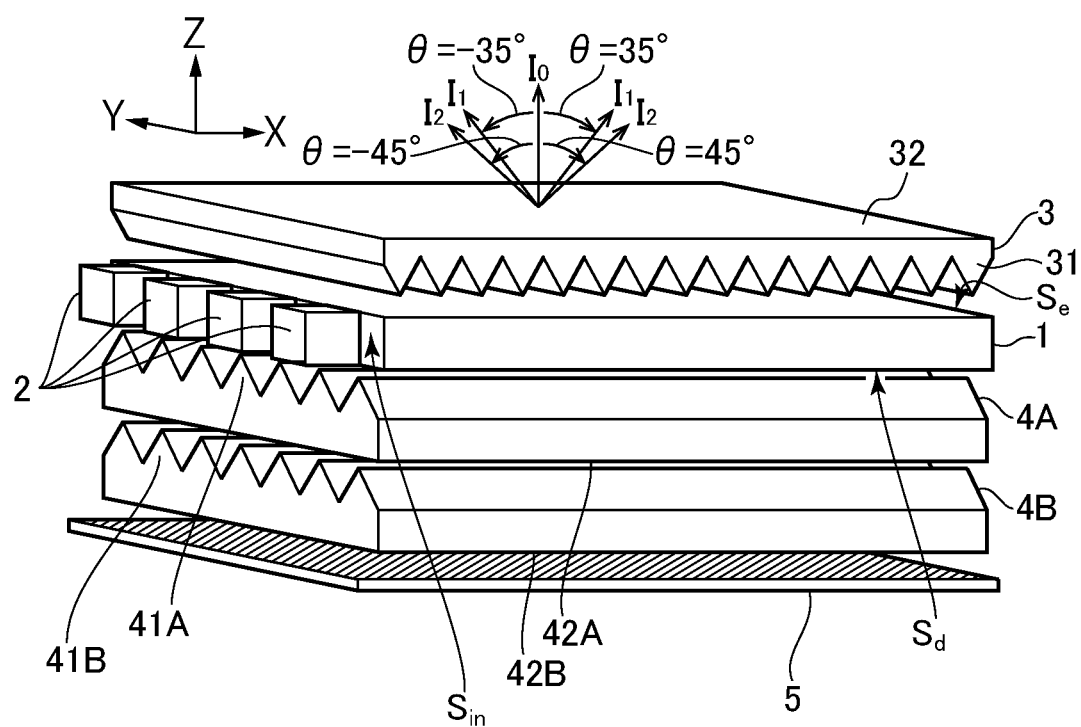
FIG. 32 is a perspective view illustrating a fourth embodiment of the side-edge type surface light emitting apparatus according to the presently disclosed subject matter.

FIG. 32 is a perspective view illustrating a fourth embodiment of the side-edge type surface light emitting apparatus according to the presently disclosed subject matter.

In FIG. 32, a light absorbing sheet 5 is added to oppose the flat surface 42B of the lower prism sheet 4B of FIG. 25. In this case, an air gap layer is inserted between the lower prism sheet 4B and the light absorbing sheet 5, that is, the light absorbing sheet 5 is distant from the lower prism sheet 4B. The light absorbing sheet 5 is made of polyethylene terephthalate (PET) painted with black ink.

Figure 33A:
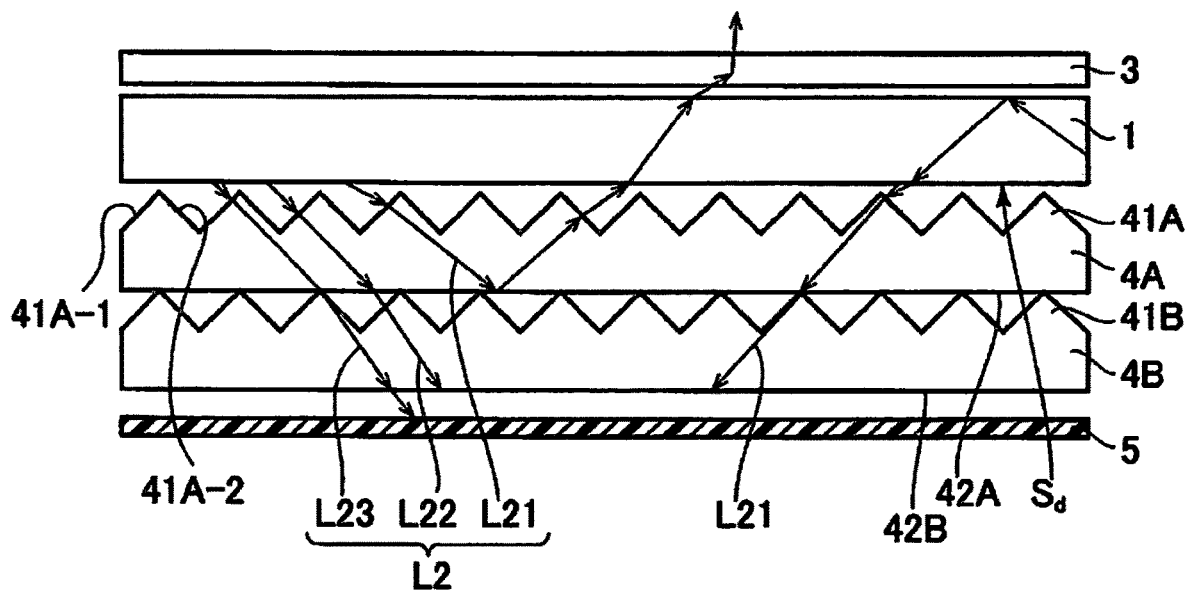
FIG. 33A is a traverse (Y-direction) cross-sectional view for explaining the operation of the side-edge type surface light emitting apparatus of FIG. 32.
Figure 33B:
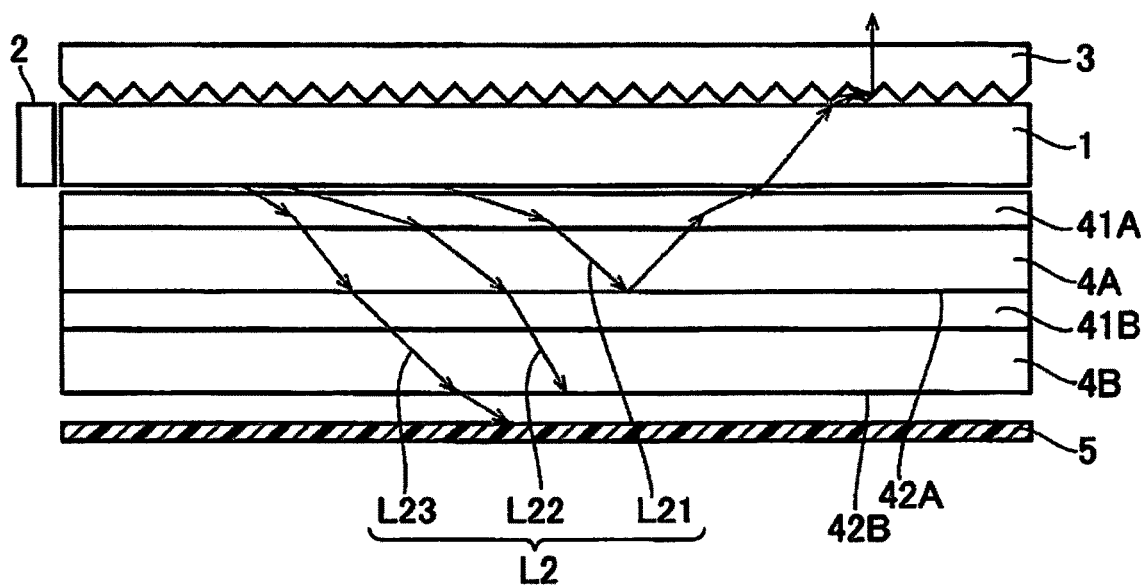
FIG. 33B is a longitudinal (X-direction) cross-sectional view for explaining the operation of the side-edge type surface light emitting apparatus of FIG. 32.

FIG. 33A is a traverse (Y-direction) cross-sectional view for explaining the operation of the side-edge type surface light emitting apparatus of FIG. 32, and FIG. 33B is a longitudinal (X-direction) cross-sectional view for explaining the operation of the side-edge type surface light emitting apparatus of FIG. 32.

As illustrated in FIGS. 33A and 33B, in the same way as in FIGS. 27A and 27B, the light L21 of the light L2, which has a relatively large incident angle to the straight-sloped surfaces 41A-1 and 41A-2 of the triangular prisms 41A of the lower prism sheet 4A, is totally reflected by the flat surface 42A and returns to the light guide plate 1. In this case, the incident angle of the light L21 to the flat surface 42A is larger than the critical angle of the lower prism sheet 4A, so that the light L21 is totally reflected by the flat surface 42A to return to the light guide plate 1. As a result, the light L21 can be emitted from the flat surface $S_e$ of the upper prism sheet 3 at the azimuth θ between −35° and 35°, which would particularly enhance the absolute luminous intensity $I_0$ at the azimuth θ=0°.

On the other hand, as illustrated in FIGS. 33A and 33B, the light L22 of the light L2, which has a relatively small incident angle to the straight-sloped surface 41A-1 or 41A-2 of the triangular prism 41A of the lower prism sheet 4A, is refracted at the flat surface 42A and propagates to the lower prism sheet 4B. Then, the light L22 is refracted at the flat surface 42B and propagates to the light absorbing sheet 5. In this case, the incident angle of the light L22 to the flat surface 42A is smaller than the critical angle of the lower prism sheet 4. Therefore, the light L22 never returns to the upper prism sheet 3. This would decrease the absolute luminous intensity $I_1$ at the azimuth θ=35° and θ=−35° and the absolute luminous intensity $I_2$ at the azimuth θ=45° and −45°. The relative luminous intensity $I_1/I_0$ at the azimuth θ=35° and θ=−35° and the relative luminous intensity $I_2/I_0$ at the azimuth θ=45° and θ=−45° would decrease, i.e., enhance the privacy effect. However, the total traverse and longitudinal luminous flux would decrease.

Further, as illustrated in FIGS. 33A and 33B, in the same way as in FIGS. 27A and 27B, the light L23 of the light L2, which has a medium incident angle to the straight-sloped surface 41A-1 or 41A-2 has an incident angle at the flat surface 42A of the lower prism sheet 4, which is slightly larger than the critical angle thereof. In this case, a part of the light L23 is incident to the tip portions of the triangular prisms 41B of the lower prism sheet 4B and does not return to the upper prism sheet 3, which would enhance the privacy effect. Even in this case, a part of the light L23 leaked from the flat surface 42B of the lower prism sheet 4B is absorbed by the light absorbing sheet 5. This would suppress a broad light distribution outside the azimuth θ=−35° and θ=35°, which would decrease the relative luminous intensities $I_1/I_0$ and $I_2/I_0$, to enhance the privacy effect.

Figure 34A:
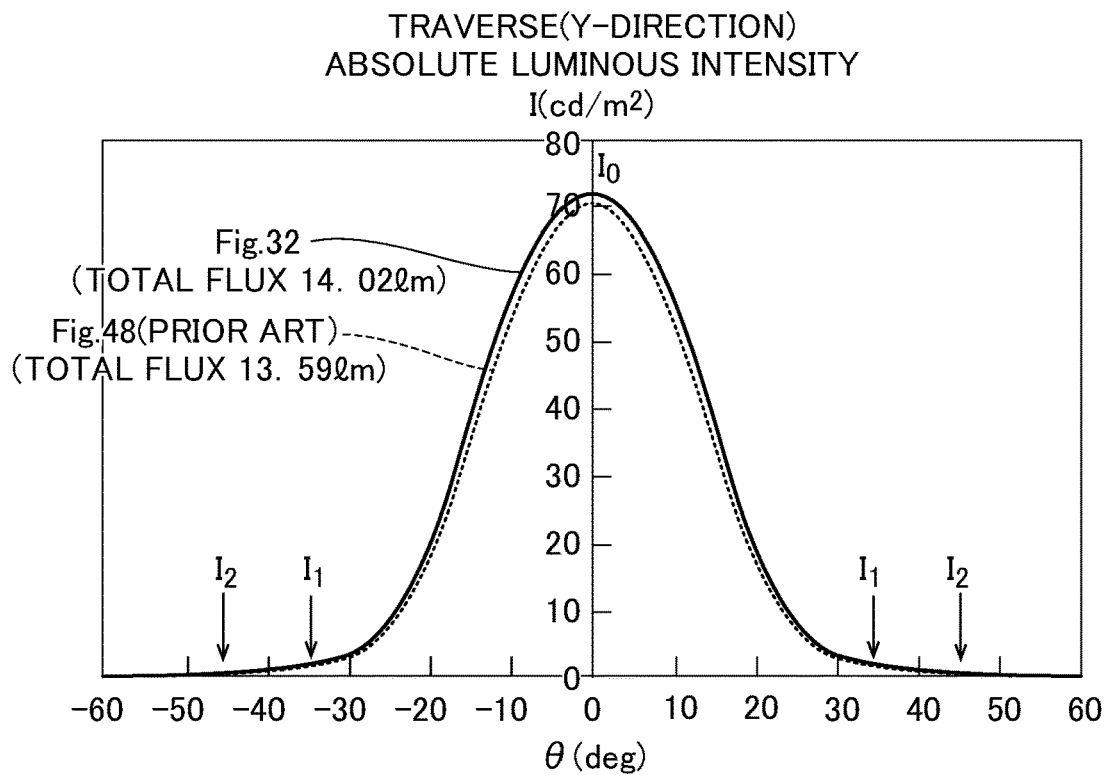
FIG. 34A is a graph showing a traverse (Y-direction) absolute luminous intensity light distribution of the result of the simulated traverse (Y-direction) operation of FIG. 33A.
Figure 34B:
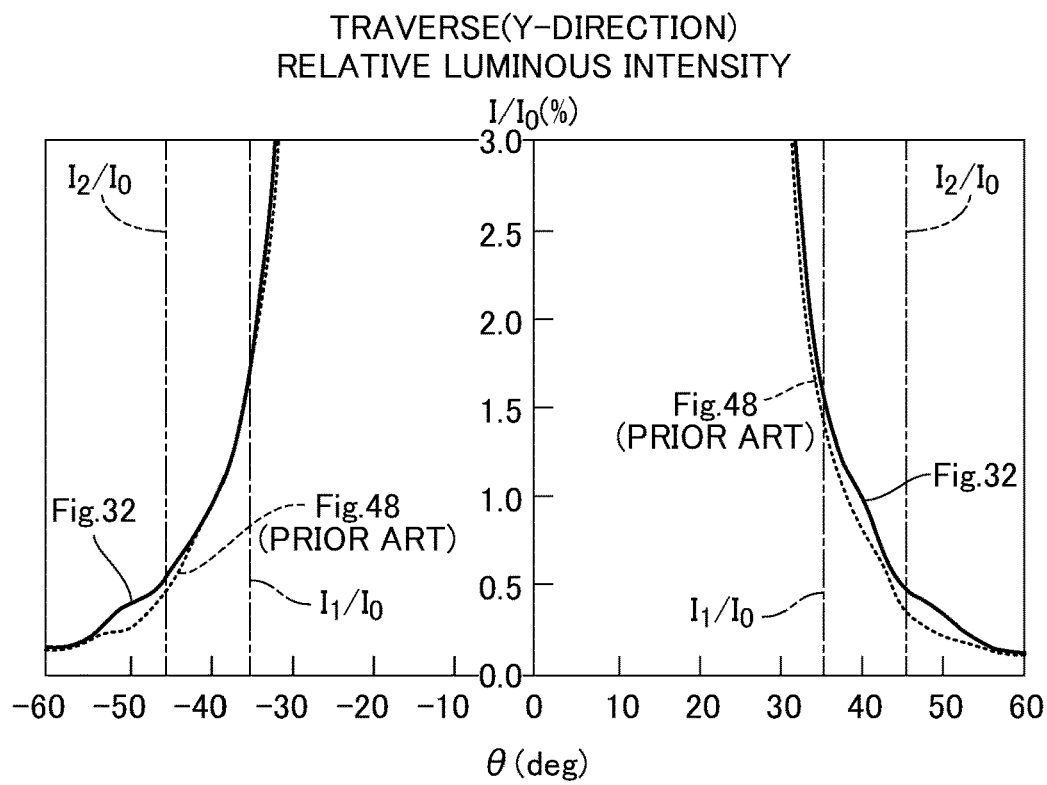
FIG. 34B is a graph showing an enlarged traverse (Y-direction) relative luminous intensity light distribution of FIG. 34A.

FIG. 34A is a graph showing a traverse (Y-direction) absolute luminous intensity light distribution of the result of the simulated traverse (Y-direction) operation of FIG. 33A, FIG. 34B is a graph showing an enlarged traverse (Y-direction) relative luminous intensity light distribution of FIG. 34A, and FIG. 34C is a table showing the privacy effect of the traverse (Y-direction) operation of FIG. 33A.

FIGS. 34A, 34B and 34C show the result of the simulated traverse (Y-direction) operation of FIG. 33A where the side-edge type surface light emitting apparatus of FIG. 32 is compared with the side-edge type surface light emitting apparatus of FIG. 48. Note that the light guide plate 1 and the upper prism sheet 3 are the same in the apparatuses of FIGS. 32 and 48, while the triangular prisms 41A and 41B of the lower prism sheets 4A and 41B of FIG. 32 is upward and the triangular prisms 41 of the lower prism sheet 4 of FIG. 48 is downward.

Referring to FIG. 34A, the absolute luminous intensity light distribution of the side-edge type surface light emitting apparatus of FIG. 32 is about the same as that of the side-edge type surface light emitting apparatus of FIG. 48, and also, the traverse and longitudinal total luminous flux of the side-edge type surface light emitting apparatus of FIG. 32 is about the same as that of the side-edge type surface light emitting apparatus of FIG. 48, because there is only a little light leaked from the flat surface 42B which is absorbed by the light absorbing sheet 5.

Also, referring to FIGS. 34B and 34C, outside the azimuth θ=−35° and θ=35°, the relative luminous intensity $I_1/I_0$ at θ=±−35° and the relative luminous intensity $I_2/I_0$ at θ=±45° are slightly larger in the apparatus of FIG. 32 than in the apparatus of FIG. 48, and therefore, the privacy effect is slightly worse in the apparatus of FIG. 32 than in the apparatus of FIG. 48; however, the privacy effect is slightly better in the apparatus of FIG. 32 than in the apparatus of FIG. 1 due to the absorption of the leaked light from the flat surface 42B by the light absorbing sheet 5.

Figure 35A:
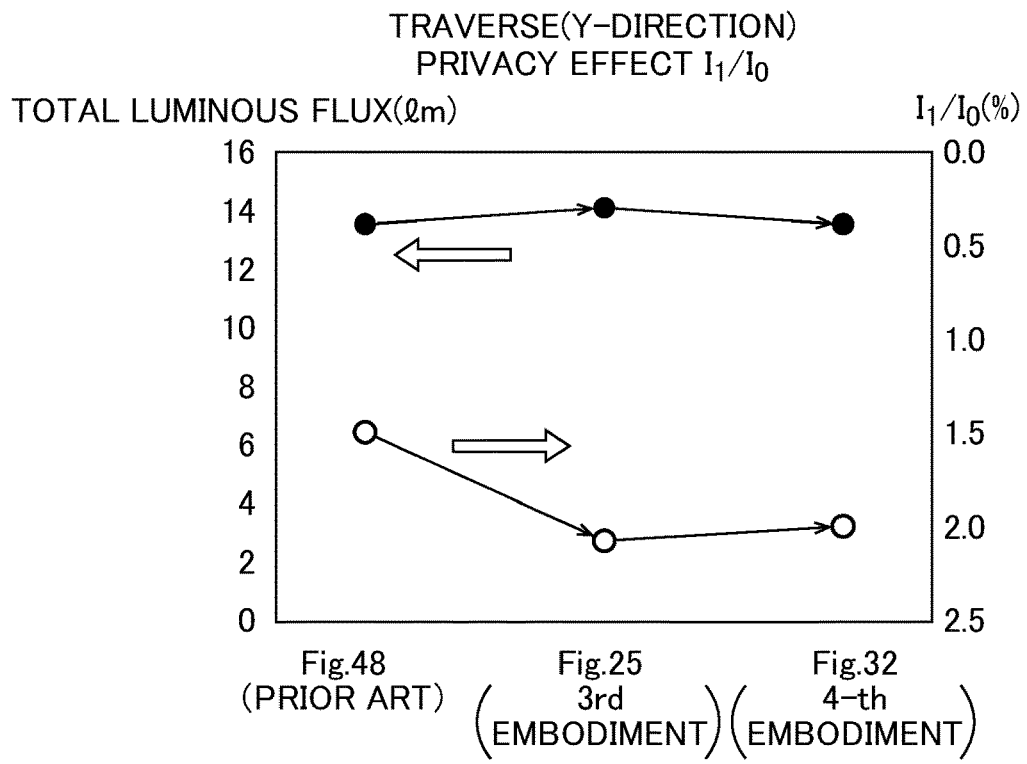
FIG. 35A is a graph showing the total luminous flux and the privacy effect $I_1/I_0$ of the simulated traverse (Y-direction) operation of FIG. 33A.
Figure 35B:
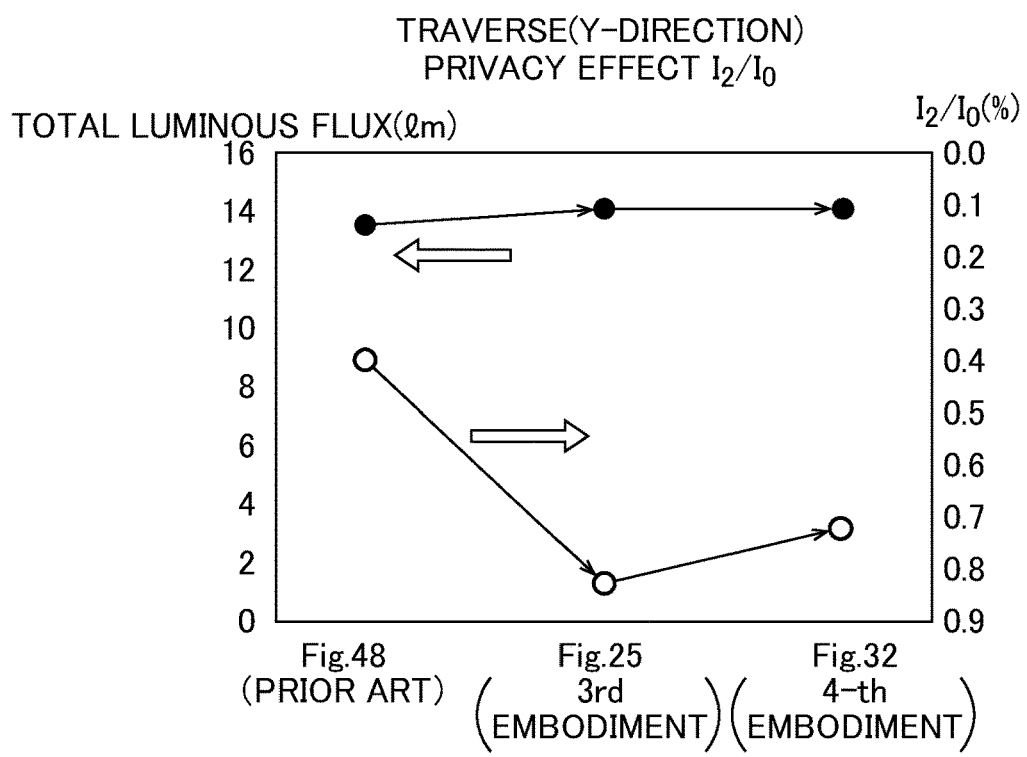
FIG. 35B is a graph showing the total luminous flux and the privacy effect $I_2/I_0$ of the simulated traverse (Y-direction) operation of FIG. 33A.

FIG. 35A is a graph showing the total luminous flux and the privacy effect $I_1/I_0$ of the simulated traverse (Y-direction) operation of FIG. 33A, and FIG. 35B is a graph showing the total luminous flux and the privacy effect $I_2/I_0$ of the simulated traverse (Y-direction) operation of FIG. 33A.

As illustrated in FIGS. 35A and 35B, the traverse and longitudinal total luminous flux is slightly smaller as compared with the side-edge type surface light emitting apparatus of FIG. 25 by the absorption of the leaked light from the flat surface 42B of the lower prism sheet 4B by the light absorbing sheet 5; however, the privacy effects $I_1/I_0$ and $I_2/I_0$ are slightly enhanced.

Figure 36A:
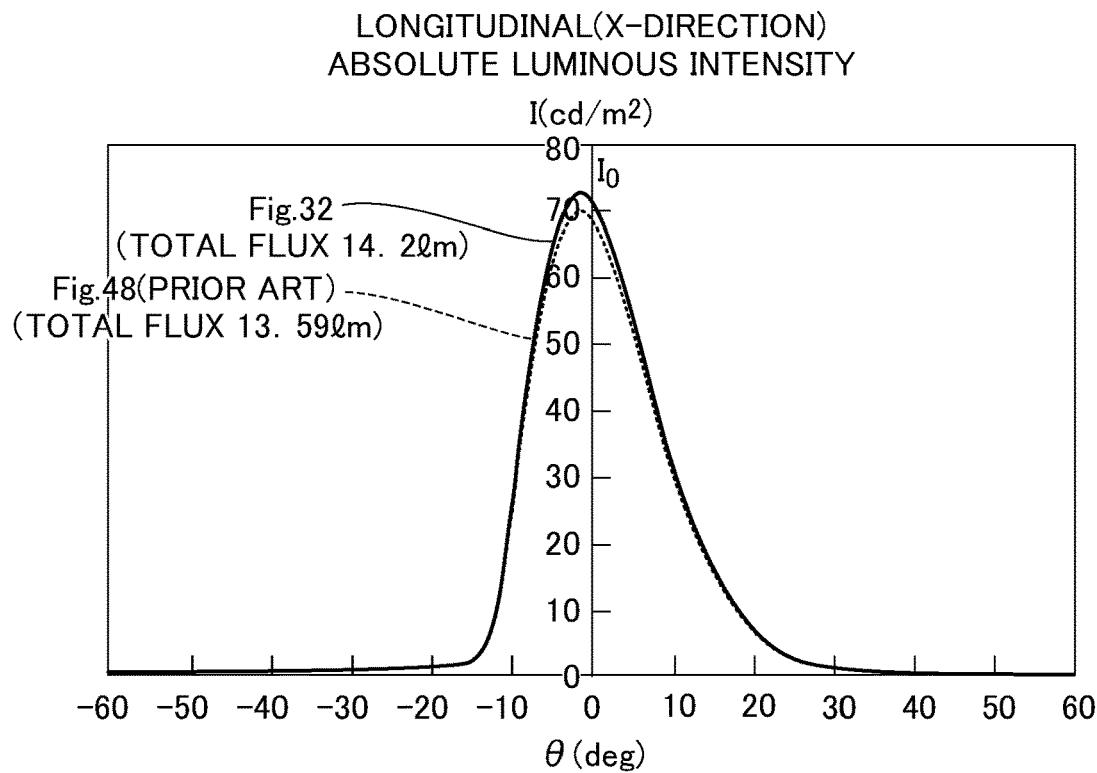
FIG. 36A is a graph showing a longitudinal (X-direction) absolute luminous intensity light distribution of the result of the simulated longitudinal (X-direction) operation of FIG. 33B.
Figure 36B:
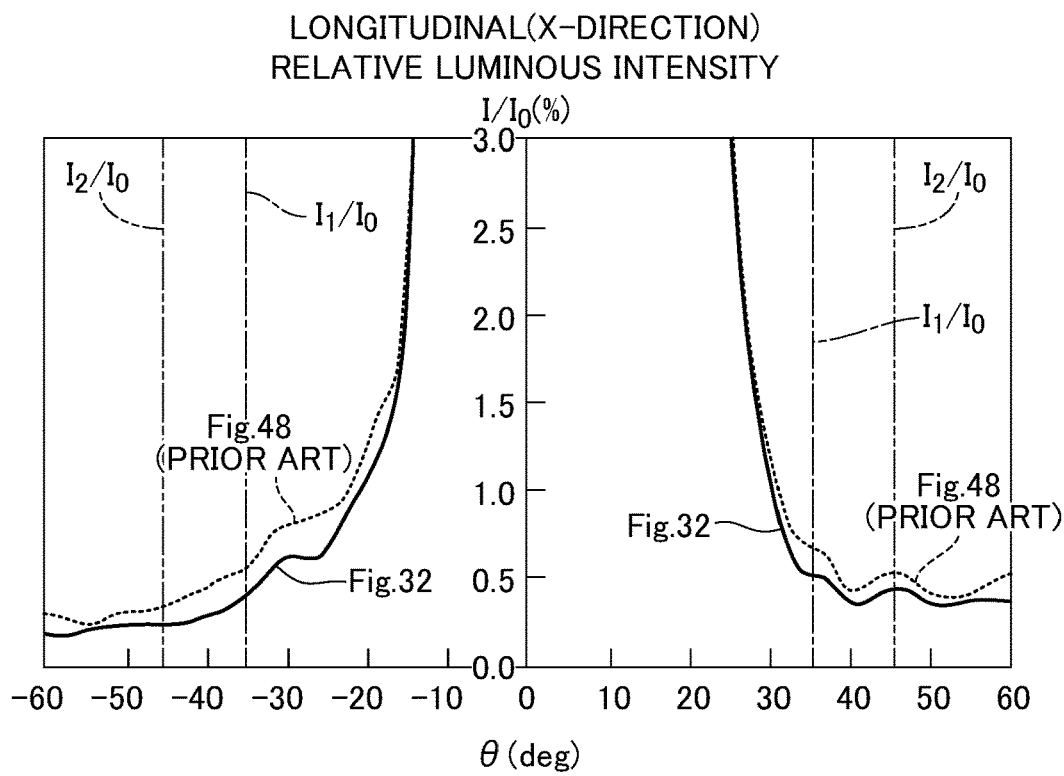
FIG. 36B is a graph showing an enlarged longitudinal (X-direction) relative luminous intensity light distribution of FIG. 36A.

FIG. 36A is a graph showing a longitudinal (X-direction) absolute luminous intensity light distribution of the result of the simulated longitudinal (X-direction) operation of FIG. 33B, FIG. 36B is a graph showing an enlarged longitudinal (X-direction) relative luminous intensity light distribution of FIG. 36A, and FIG. 36C is a table showing the privacy effect of the longitudinal (X-direction) operation of FIG. 33B.

Referring to FIG. 36A, the absolute luminous intensity light distribution of the side-edge type surface light emitting apparatus of FIG. 32 is about the same as that of the side-edge type surface light emitting apparatus of FIG. 48; however, the traverse and longitudinal total luminous flux of the side-edge type surface light emitting apparatus of FIG. 32 is slightly larger than that of the side-edge type surface light emitting apparatus of FIG. 48.

Also, referring to FIGS. 36B and 36C, outside the azimuth θ=−35° and θ=35°, the relative luminous intensity $I_1/I_0$ at θ=±35° and the relative luminous intensity $I_2/I_0$ at θ=±45° are about the same in the apparatus of FIG. 32 and in the apparatus of FIG. 48, and therefore, the privacy effect is about the same in the apparatus of FIG. 32 as in the apparatus of FIG. 48.

Figure 37A:
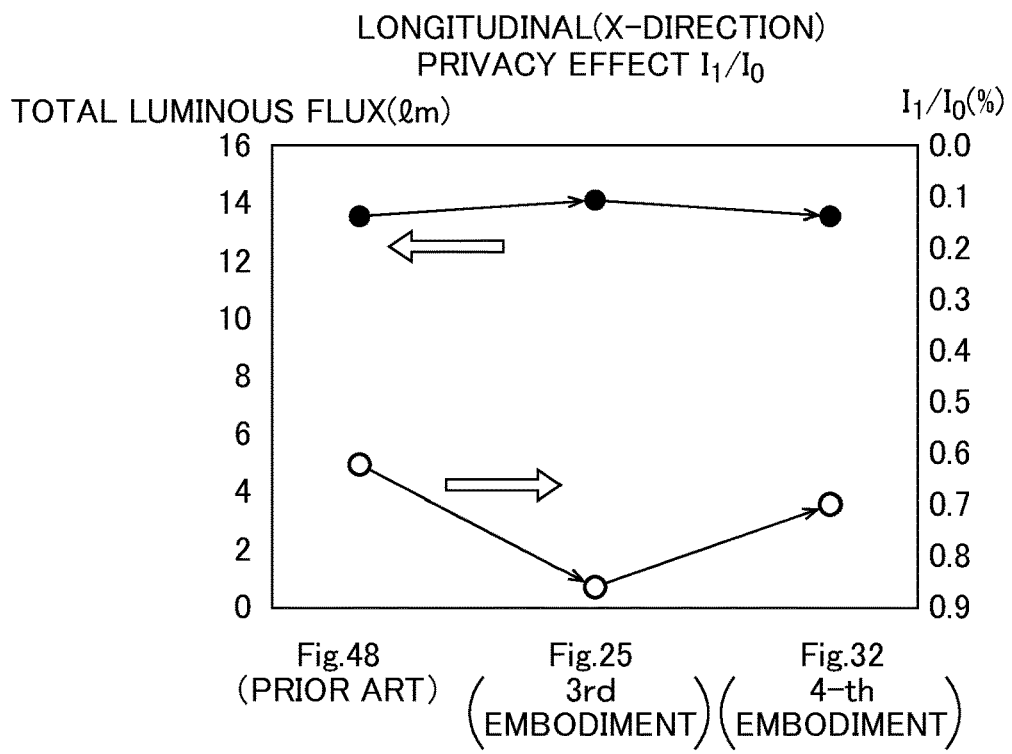
FIG. 37A is a graph showing the total luminous flux and the privacy effect $I_1/I_0$ of the simulated longitudinal (X-direction) operation of FIG. 35B.
Figure 37B:
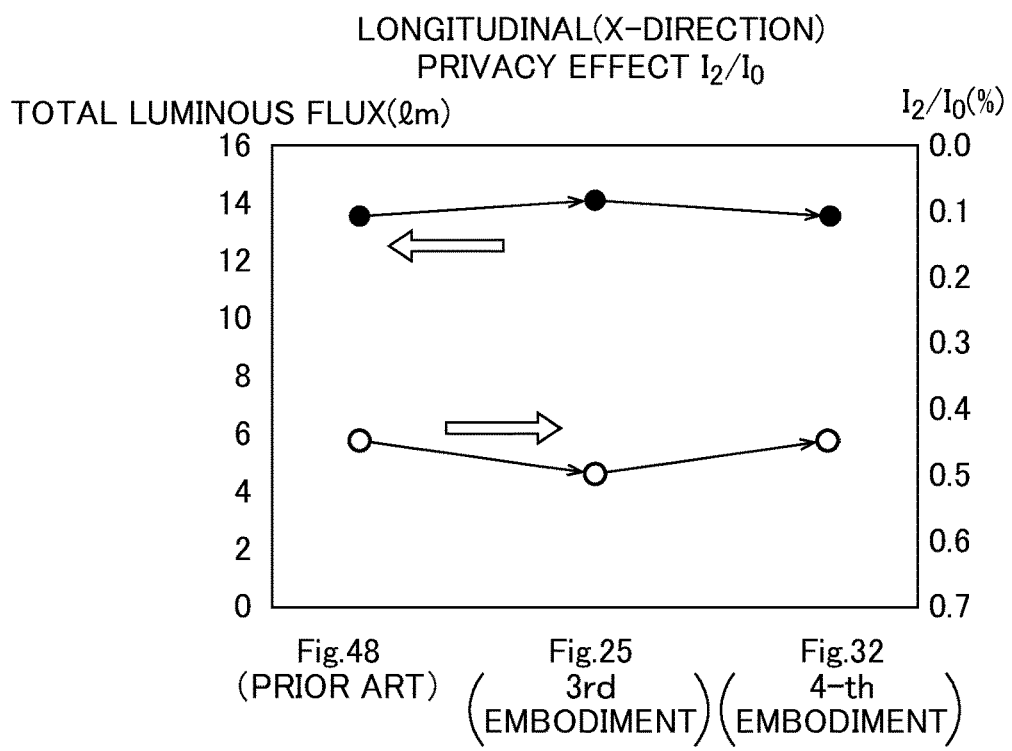
FIG. 37B is a graph showing the total luminous flux and the privacy effect $I_2/I_0$ of the simulated longitudinal (X-direction) operation of FIG. 35B.

FIG. 37A is a graph showing the total luminous flux and the privacy effect $I_1/I_0$ of the simulated longitudinal (X-direction) operation of FIG. 33B, and FIG. 37B is a graph showing the total luminous flux and the privacy effect $I_2/I_0$ of the simulated longitudinal (X-direction) operation of FIG. 33B.

As illustrated in FIGS. 37A and 37B, the traverse and longitudinal total luminous flux is slightly smaller in the side-edge type surface light emitting apparatus of FIG. 32 than the side-edge type surface light emitting apparatus of FIG. 48; however, the privacy effects $I_1/I_0$ and $I_2/I_0$ are slightly enhanced. Note that the longitudinal (X-direction) privacy effect is slightly enhanced as compared with the traverse (Y-direction) privacy effect.

Thus, according to the fourth embodiment as illustrated in FIG. 32, since the outer surface of the light absorbing sheet 5 is flat, the handling in the manufacturing steps would be easy, and also, contaminant matters would not be inserted thereinto. Further, in the component carrying operations, fine defects are hardly generated.

Figure 38:
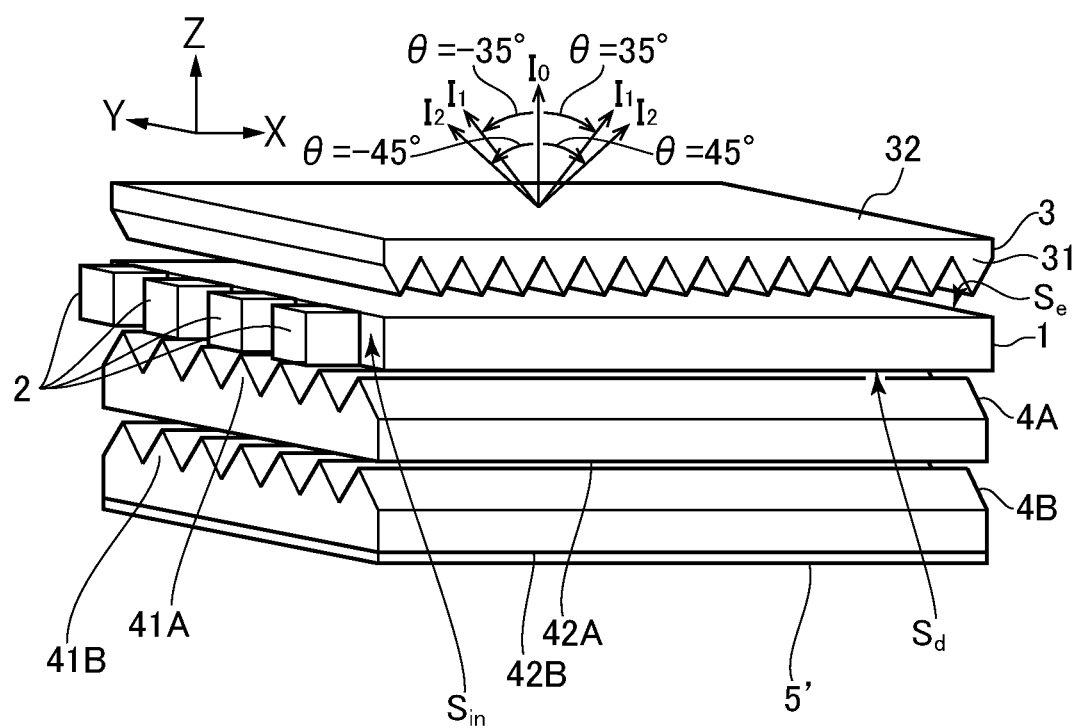
FIG. 38 is a perspective view illustrating a fifth embodiment of the side-edge type surface light emitting apparatus according to the presently disclosed subject matter.

FIG. 38 is a perspective view illustrating a fifth embodiment of the side-edge type surface light emitting apparatus according to the presently disclosed subject matter.

In FIG. 38, a light absorbing layer 5' is provided instead of the light absorbing sheet 5 in the side-edge type surface light emitting apparatus of FIG. 32. In this case, the light absorbing layer 5' is in contact with the lower prism sheet 4B. The light absorbing sheet 5' is also made of polyethylene terephthalate (PET) painted with black ink.

Figure 39A:
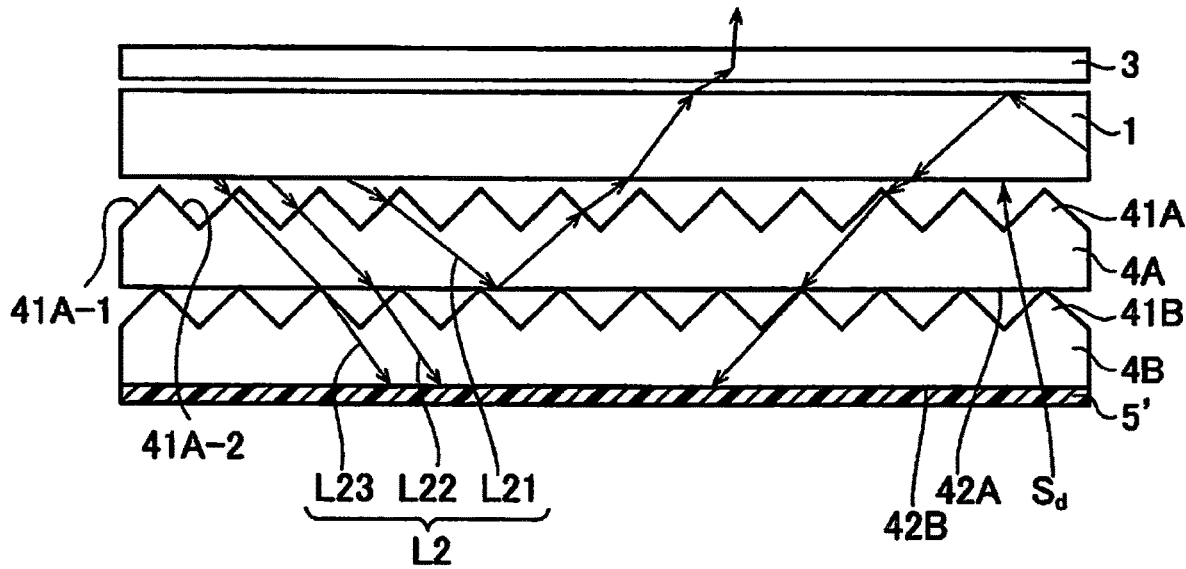
FIG. 39A is a traverse (Y-direction) cross-sectional view for explaining the operation of the side-edge type surface light emitting apparatus of FIG. 38.
Figure 39B:
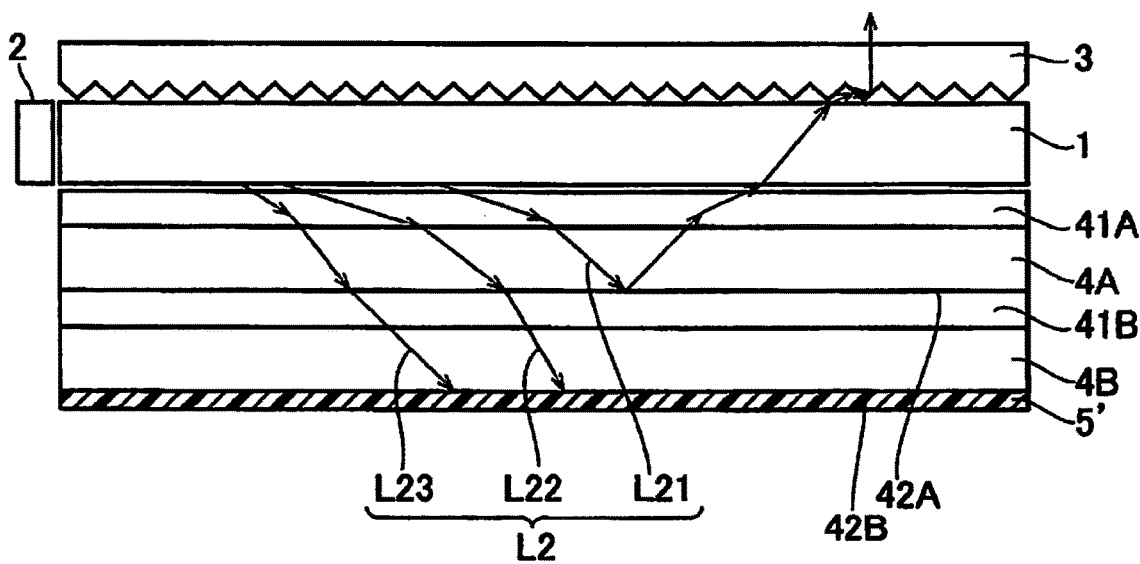
FIG. 39B is a longitudinal (X-direction) cross-sectional view for explaining the operation of the side-edge type surface light emitting apparatus of FIG. 38.

FIG. 39A is a traverse (Y-direction) cross-sectional view for explaining the operation of the side-edge type surface light emitting apparatus of FIG. 38, and FIG. 39B is a longitudinal (X-direction) cross-sectional view for explaining the operation of the side-edge type surface light emitting apparatus of FIG. 38.

As illustrated in FIGS. 39A and 39B, the light L21 of the light L2, which has a relatively large incident angle to the straight-sloped surfaces 41A-1 and 41A-2 of the triangular prisms 41A of the lower prism sheet 4A, is totally reflected by the flat surface 42A and returns to the light guide plate 1. In this case, the incident angle of the light L21 to the flat surface 42A is larger than the critical angle of the lower prism sheet 4A, so that the light L21 is totally reflected by the flat surface 42A to return to the light guide plate 1. As a result, the light L21 can be emitted from the flat surface $S_e$ of the upper prism sheet 3 at the azimuth θ between −35° and 35°, which would particularly enhance the absolute luminous intensity $I_0$ at the azimuth θ=0°.

On the other hand, as illustrated in FIGS. 39A and 39B, the light L22 of the light L2, which has a relatively small incident angle to the straight-sloped surface 41A-1 or 41A-2 of the triangular prism 41A of the lower prism sheet 4A, is refracted at the flat surface 42A and propagates to the lower prism sheet 4B. Finally, the light L22 is absorbed by the light absorbing sheet 5'. In this case, the incident angle of the light L22 to the flat surface 42A is smaller than the critical angle of the lower prism sheet 4. Therefore, the light L22 never returns to the upper prism sheet 3. This would decrease the absolute luminous intensity $I_1$ at the azimuth θ=35° and θ=−35° and the absolute luminous intensity $I_2$ at the azimuth θ=45° and −45°. The relative luminous intensity $I_1/I_0$ at the azimuth θ=35° and −35° and the relative luminous intensity $I_2/I_0$ at the azimuth θ=45° and θ=−45° would decrease, i.e., enhance the privacy effect. However, the total traverse and longitudinal luminous flux would decrease.

Further, as illustrated in FIGS. 39A and 39B, the light L23 of the light L2, which has a medium incident angle to the straight-sloped surface 41A-1 or 41A-2 has an incident angle at the flat surface 42A of the lower prism sheet 4, which is slightly larger than the critical angle thereof. Even in this case, if a part of the light L22 is incident to the tip portions of the triangular prisms 41B of the lower prism sheet 4B, this part of the light L22 is incident to the lower prism sheet 4B, and does not return to the upper prism sheet 3. Therefore, light which should be reflected by the air gap layer without reaching the tip portions of the triangular prisms 41B of the lower prism sheet 4B to degrade the privacy effect is reduced to enhance the privacy effect. Also, in the side-edge type surface light emitting apparatus, light for generating a broad light distribution outside the azimuth θ=−35° to 35° is absorbed by the light absorbing sheet 5'. Therefore, since the narrow light distribution within the azimuth θ=−35° to 35° is not affected by the light absorbing sheet 5', the privacy effect is better while the luminous intensity $I_0$ is maintained. Also, in the side-edge type surface light emitting apparatus of FIG. 38, no air gap layer is present between the lower prism sheet 4B and the light absorbing sheet 5'. As a result, in the light which propagates from the lower prism sheet 4B to the light absorbing sheet 5', light reflected at the interface between the lower prism sheet 4B and the light absorbing sheet 5' would be reduced and also would be absorbed by the light absorbing sheet 5'. Thus, the privacy effect is further enhanced as compared with the side-edge type surface light emitting apparatus of FIG. 32, while the luminous intensity $I_0$ is highly maintained.

Figure 40A:
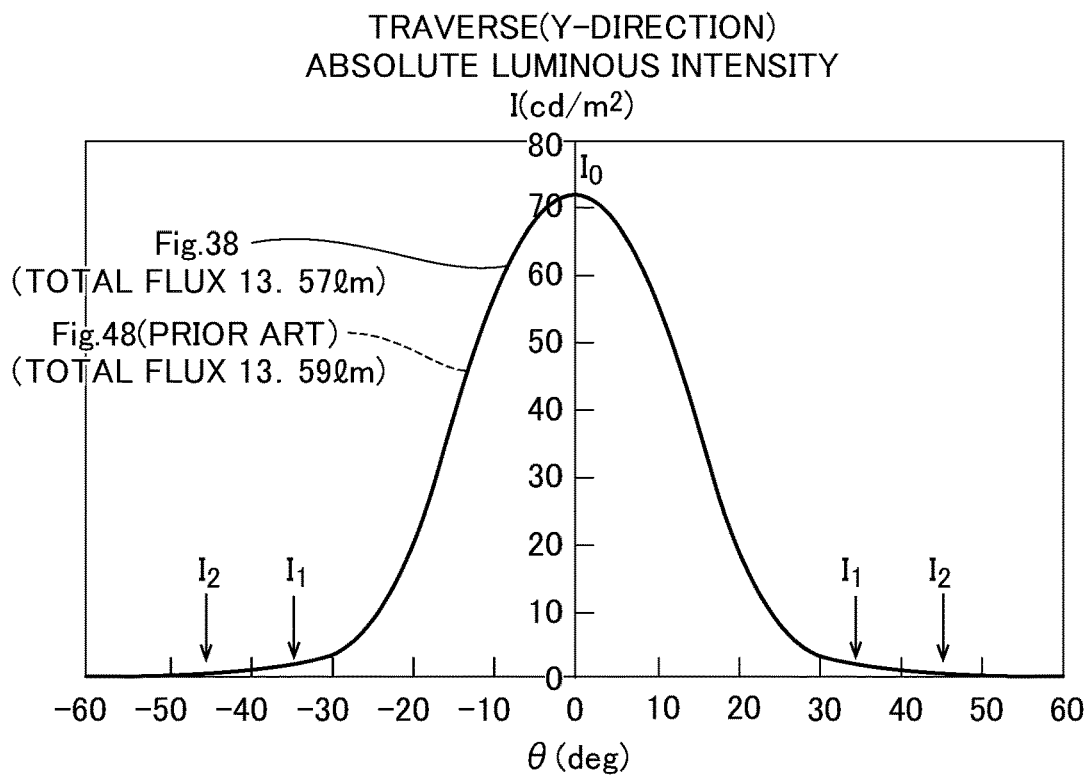
FIG. 40A is a graph showing a traverse (Y-direction) absolute luminous intensity light distribution of the result of the simulated traverse (Y-direction) operation of FIG. 39A.
Figure 40B:
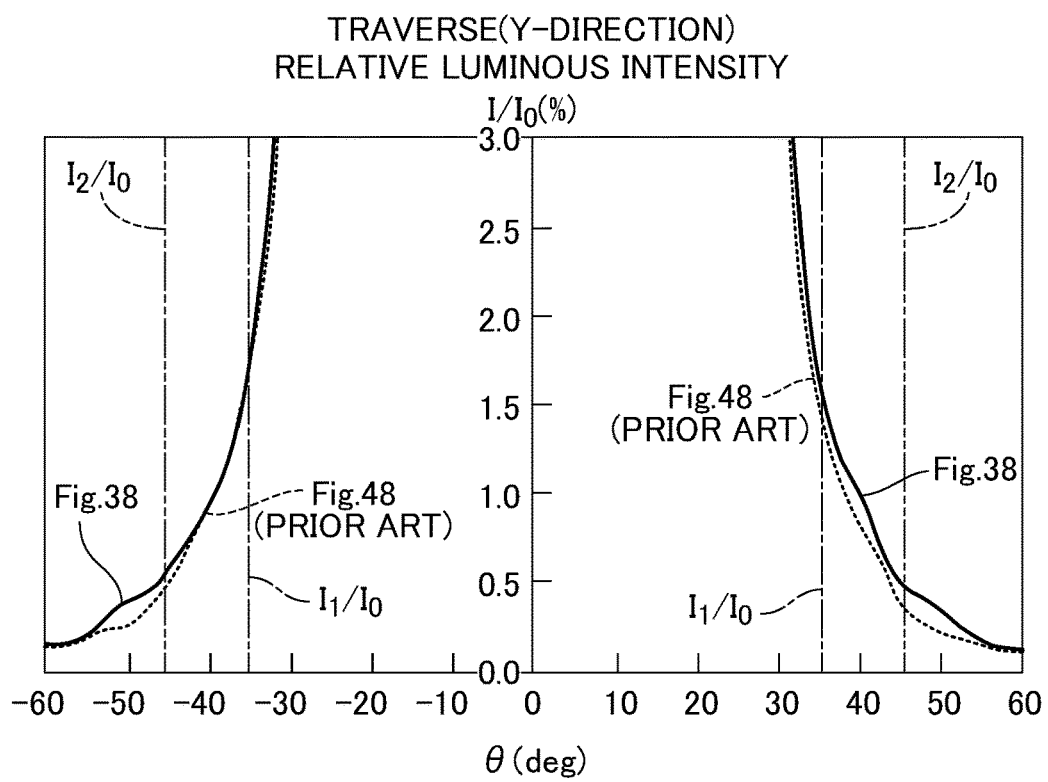
FIG. 40B is a graph showing an enlarged traverse (Y-direction) relative luminous intensity light distribution of FIG. 40A.

FIG. 40A is a graph showing a traverse (Y-direction) absolute luminous intensity light distribution of the result of the simulated traverse (Y-direction) operation of FIG. 39A, FIG. 40B is a graph showing an enlarged traverse (Y-direction) relative luminous intensity light distribution of FIG. 40A, and FIG. 40C is a table showing the privacy effect of the traverse (Y-direction) operation of FIG. 39A.

FIGS. 40A, 40B and 40C show the result of the simulated traverse (Y-direction) operation of FIG. 39A where the side-edge type surface light emitting apparatus of FIG. 38 is compared with the side-edge type surface light emitting apparatus of FIG. 48. Note that the light guide plate 1 and the upper prism sheet 3 are the same in the apparatuses of FIGS. 38 and 48, while the triangular prisms 41A and 41B of the lower prism sheets 4A and 4B of FIG. 38 are upward and the triangular prisms 41 of the lower prism sheet 4 of FIG. 48 are downward. Also, the light absorbing sheet 5' is provided in the apparatus of FIG. 38.

Referring to FIG. 40A, the traverse and longitudinal total luminous flux of the side-edge type surface light emitting apparatus of FIG. 38 is slightly smaller than that of the side-edge type surface light emitting apparatus of FIG. 48. This is caused by the light leaked from the flat surface 42B which is absorbed by the light absorbing sheet 5'.

Also, referring to FIGS. 40B and 40C, outside the azimuth θ=−35° and θ=35°, the relative luminous intensity $I_1/I_0$ at θ=±35° and the relative luminous intensity $I_2/I_0$ at =±45° are about the same in the apparatus of FIG. 38 and in the apparatus of FIG. 48, and therefore, the privacy effect is about the same in the apparatus of FIG. 38 and in the apparatus of FIG. 48, and better than in the apparatus of FIG. 32 due to the absorption of the leaked light from the flat surface 42B by the light absorbing sheet 5'.

Figure 41A:
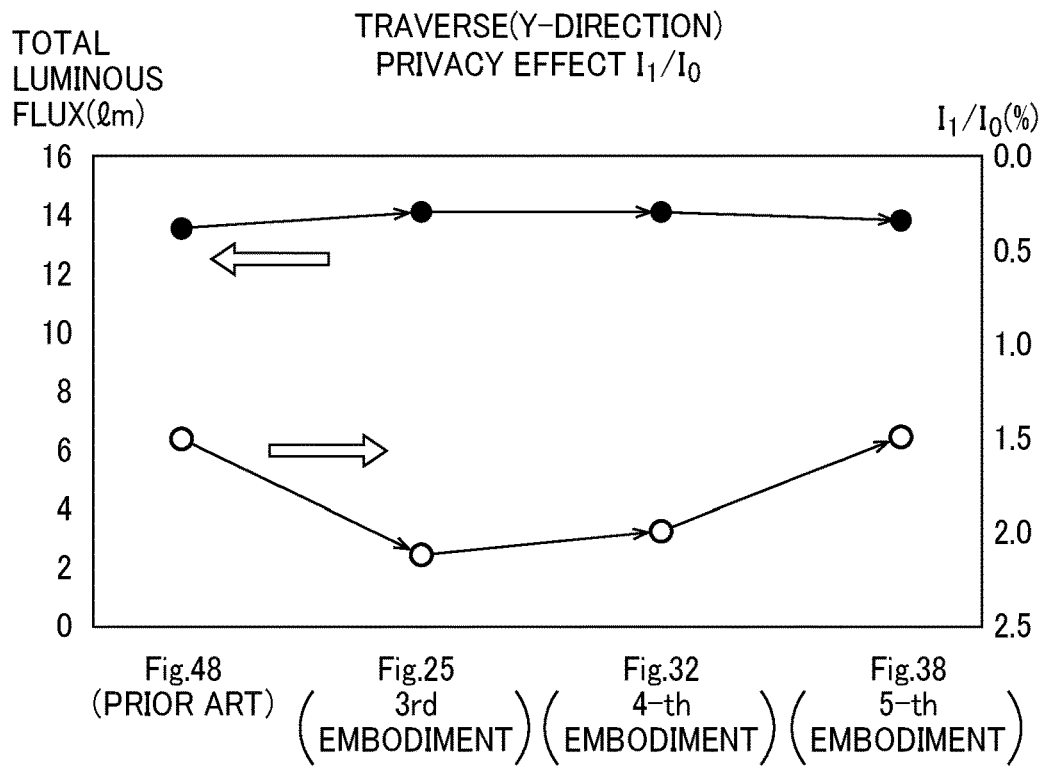
FIG. 41A is a graph showing the total luminous flux and the privacy effect $I_1/I_0$ of the simulated traverse (Y-direction) operation of FIG. 39A.
Figure 41B:
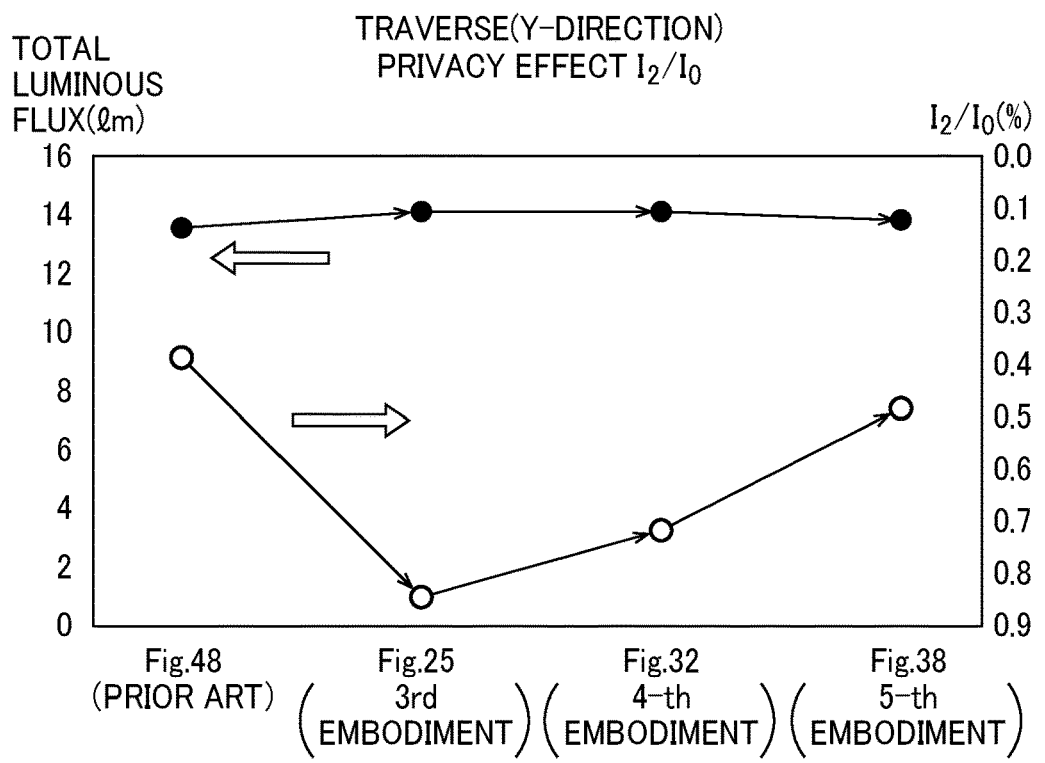
FIG. 41B is a graph showing the total luminous flux and the privacy effect $I_2/I_0$ of the simulated traverse (Y-direction) operation of FIG. 39A.

FIG. 41A is a graph showing the total luminous flux and the privacy effect $I_1/I_0$ of the simulated traverse (Y-direction) operation of FIG. 39A, and FIG. 41B is a graph showing the total luminous flux and the privacy effect $I_2/I_0$ of the simulated traverse (Y-direction) operation of FIG. 39A.

As illustrated in FIGS. 41A and 41B, the traverse and longitudinal total luminous flux is slightly smaller as compared with the side-edge type surface light emitting apparatus of FIG. 32 by the absorption of the leaked light from the flat surface 42B of the lower prism sheet 4B by the light absorbing sheet 5'; however, the privacy effects $I_1/I_0$ and $I_2/I_0$ are much enhanced.

Figure 42A:
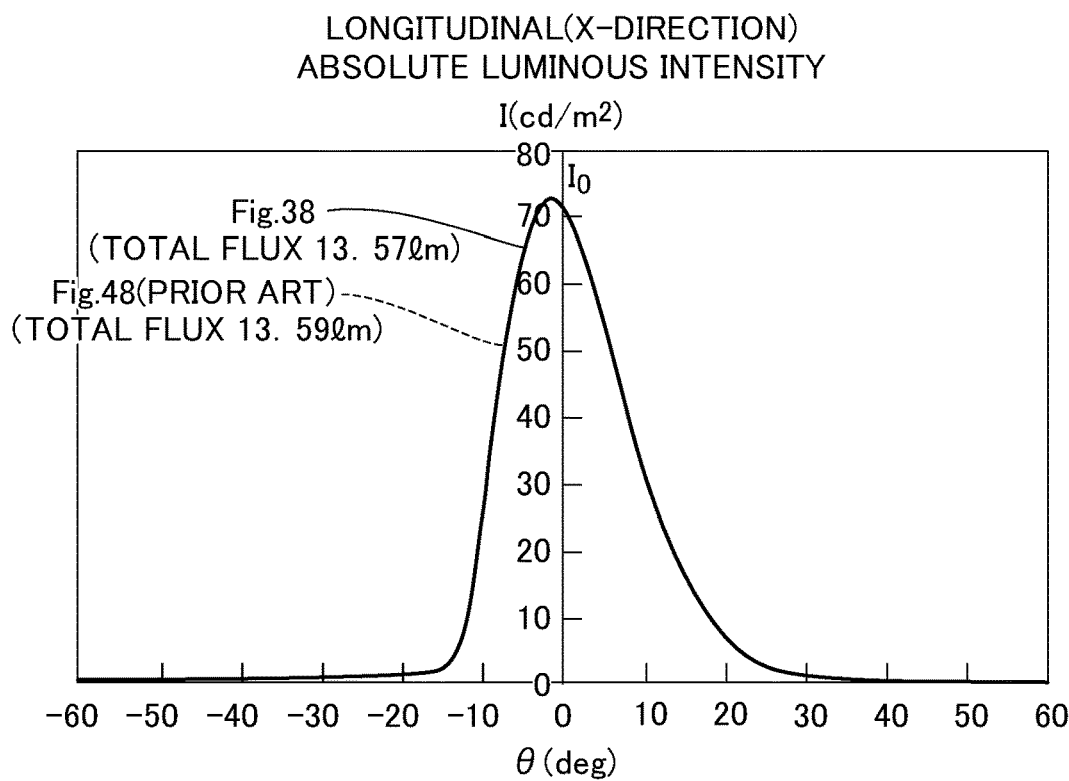
FIG. 42A is a graph showing a longitudinal (X-direction) absolute luminous intensity light distribution of the result of the simulated longitudinal (X-direction) operation of FIG. 39B.
Figure 42B:
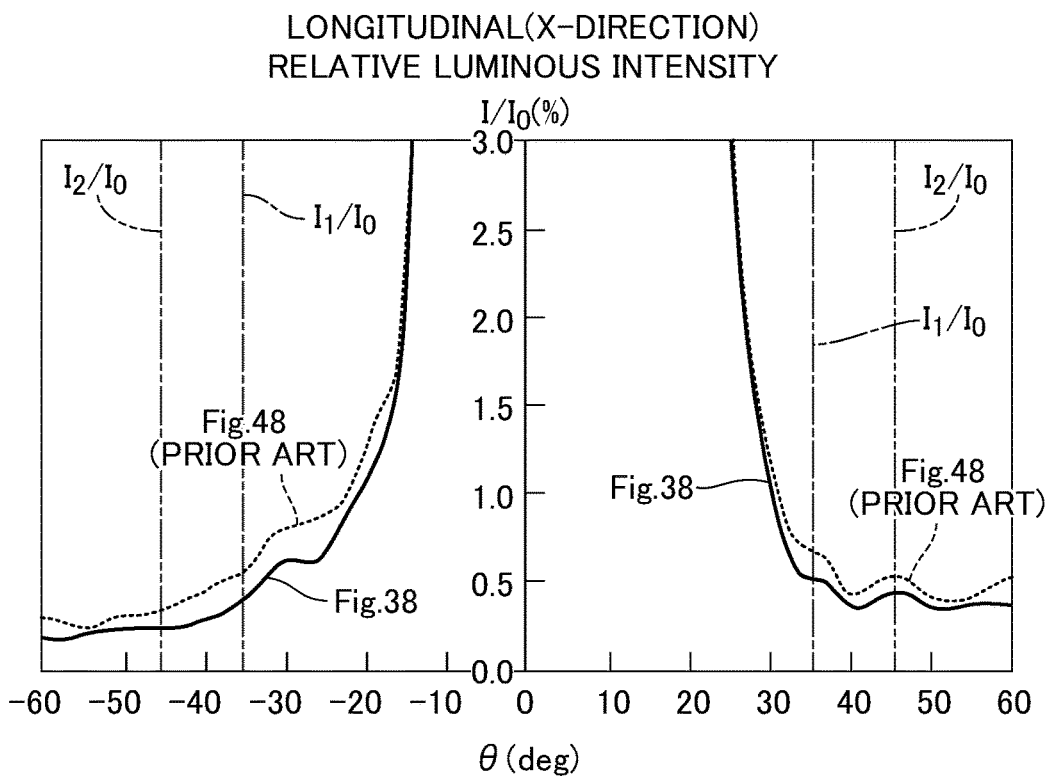
FIG. 42B is a graph showing an enlarged longitudinal (X-direction) relative luminous intensity light distribution of FIG. 42A.

FIG. 42A is a graph showing a longitudinal (X-direction) absolute luminous intensity light distribution of the result of the simulated longitudinal (X-direction) operation of FIG. 39B, FIG. 42B is a graph showing an enlarged longitudinal (X-direction) relative luminous intensity light distribution of FIG. 42A, and FIG. 42C is a table showing the privacy effect of the longitudinal (X-direction) operation of FIG. 39B.

Referring to FIG. 42A, the traverse and longitudinal total luminous flux of the side-edge type surface light emitting apparatus of FIG. 38 is slightly smaller than that of the side-edge type surface light emitting apparatus of FIG. 48.

Also, referring to FIGS. 42B and 42C, outside the azimuth θ=−35° and θ=35°, the relative luminous intensity $I_1/I_0$ at θ=±35° and the relative luminous intensity $I_2/I_0$ at θ=±45° are slightly smaller in the apparatus of FIG. 38 than in the apparatus of FIG. 48, and therefore, the privacy effect is much better in the apparatus of FIG. 38 than in the apparatus of FIG. 48.

Figure 43A:
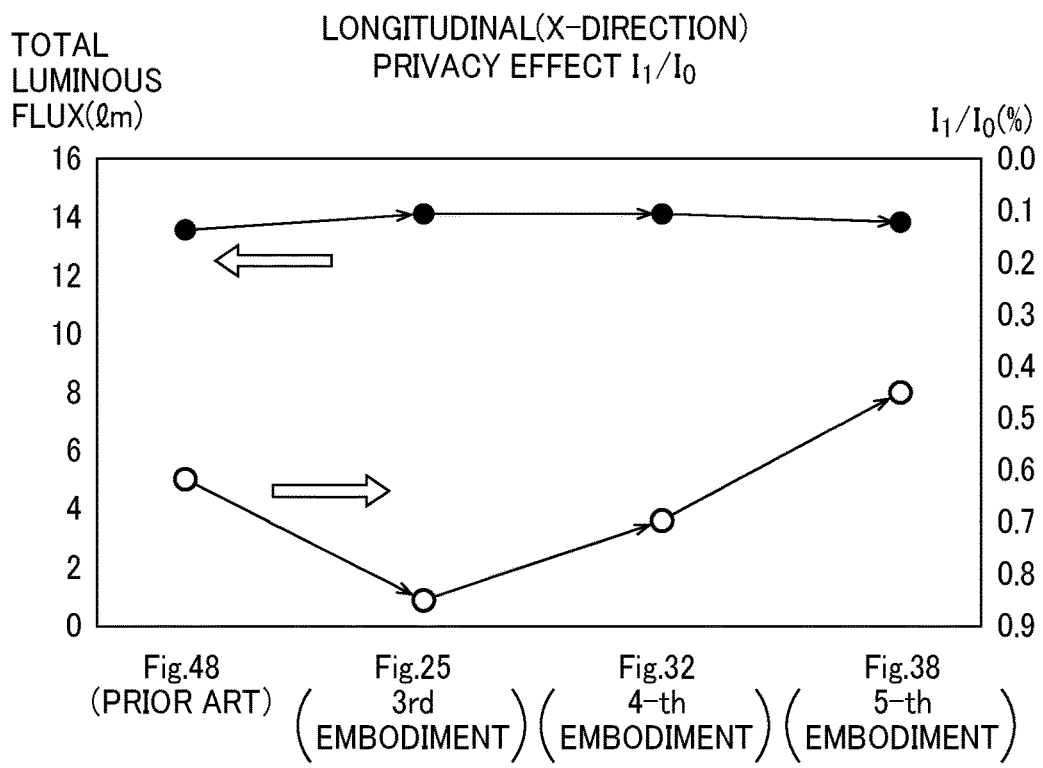
FIG. 43A is a graph showing the total luminous flux and the privacy effect $I_1/I_0$ of the simulated longitudinal (X-direction) operation of FIG. 39B.
Figure 43B:
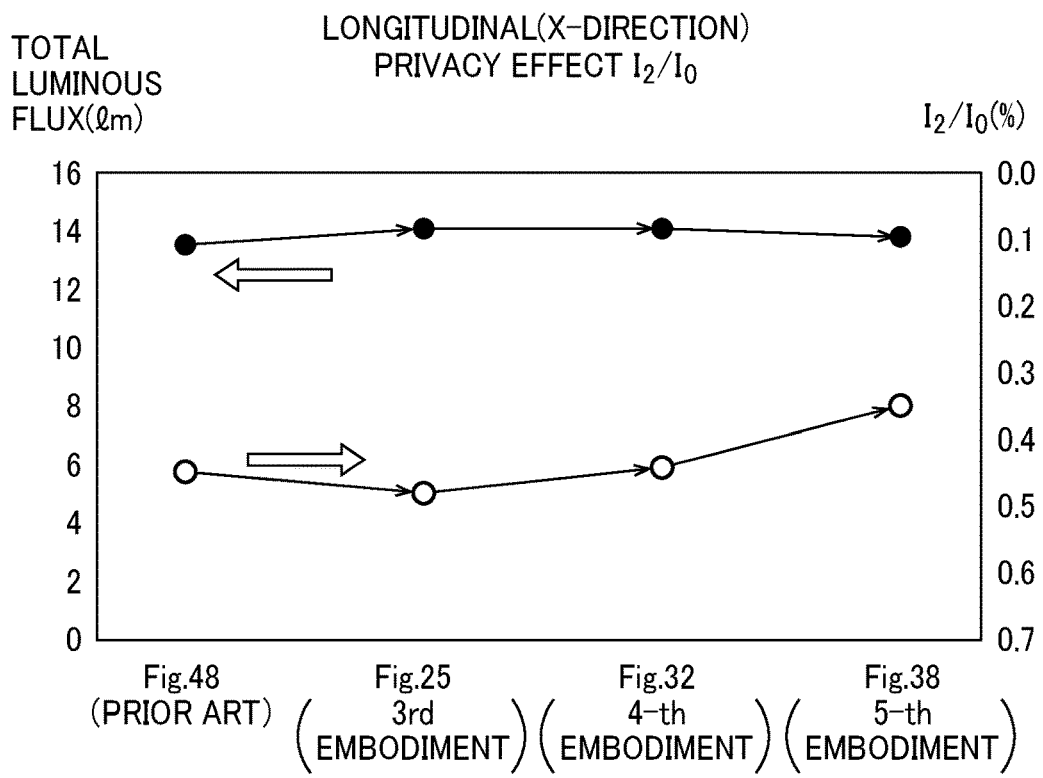
FIG. 43B is a graph showing the total luminous flux and the privacy effect $I_2/I_0$ of the simulated longitudinal (X-direction) operation of FIG. 39B.

FIG. 43A is a graph showing the total luminous flux and the privacy effect $I_1/I_0$ of the simulated longitudinal (X-direction) operation of FIG. 38B, and FIG. 43B is a graph showing the total luminous flux and the privacy effect $I_2/I_0$ of the simulated longitudinal (X-direction) operation of FIG. 38B.

As illustrated in FIGS. 43A and 43B, the traverse and longitudinal total luminous flux is slightly smaller in the side-edge type surface light emitting apparatus of FIG. 38 than the side-edge type surface light emitting apparatus of FIG. 48; however, the privacy effects $I_1/I_0$ and $I_2/I_0$ are remarkably enhanced.

Thus, according to the fifth embodiment illustrated in FIG. 38, the privacy effect is much enhanced by the light absorbing sheet 5', although the total traverse and longitudinal luminous flux is slightly decreased.

In the side-edge type surface light emitting apparatuses of FIGS. 25, 32 and 38, the flat surface 42A of the lower prism sheet 4A is in contact with the apical portions of the triangular prisms 41B of the lower prism sheet 4B by the gravitational effect of the lower prism sheet 4A. The flat surface 42A of the lower prism sheet 4A can be fixed to the apical portions of the triangular prisms 41B of the lower prism sheet 4B by using a light transparent adhesive layer 6, which will be explained with reference to FIG. 44.

Figure 44:
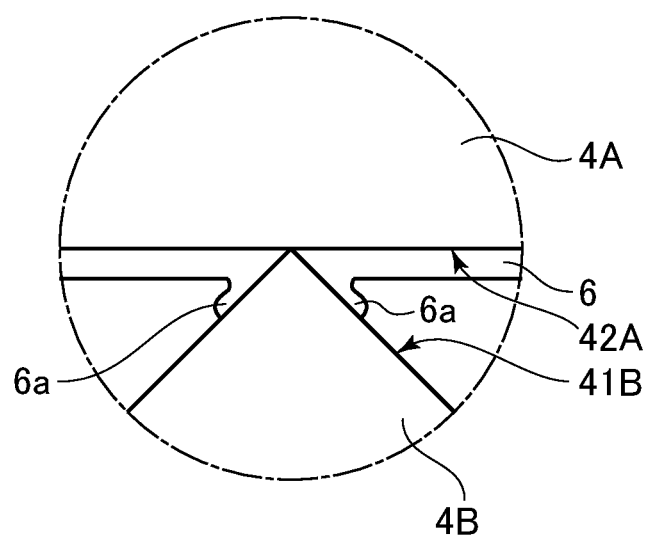
FIG. 44 is a cross-sectional view showing the contact portions of the lower prism sheets of a modification of the side-edge type surface light emitting apparatus of FIG. 25, 32 or 38.

FIG. 44 is a cross-sectional view showing the contact portions of the lower prism sheets of a modification of the side-edge type surface light emitting apparatuses of FIG. 25, 32 or 38.

As illustrated in FIG. 44, a light transparent adhesive layer 6, which has an adhesive force against the lower prism sheets 4A and 4B, is provided on the flat surface 42A of the lower prism sheet 4A. The apical portions of the triangular prisms 41B of the lower prism sheet 4B are forced to penetrate the light transparent adhesive layer 6. In this case, the height $H_D$ of the triangular prisms 41B of the lower prism sheet 4B is about 14 µm, and the thickness of the light transparent adhesive layer 6 including its wicking portion 6a is smaller than 20% of the height $H_U$ of the triangular prisms 41B, and is about 2 µm, for example. The light transparent adhesive layer 6 is made of ultraviolet curing resin such as urethane resin or epoxy resin, which can partially crosslink before adhesion and can completely crosslink after adhesion. (see: U.S. Pat. No. 6,846,089B2).

As illustrated in FIG. 44, before the assembly of the modification of the side-edge type surface light emitting apparatus of FIG. 25, 32 or 38, since the lower prism sheets 4A and 4B are integrated by the light transparent adhesive layer 6 in advance, the handling can be easier and, also, contaminant matters would not be inserted thereinto, and fine defects would not be created.

Thus, in the modification of the side-edge surface light emitting apparatus of FIG. 38 using the integral lower prism sheets 4A and 4B of FIG. 44, the privacy effect can be enhanced while hardly reducing the total luminous flux (or the average illuminous intensity). Similarly, in the modification of the side-edge surface light emitting apparatus of FIG. 25 or 32 using the integral lower prism sheets 4A and 4B of FIG. 44, the privacy effect can be enhanced while hardly reducing the total luminous flux (or the average illuminous intensity).

The total luminous flux (or the average luminous intensity) and the privacy effect of the modification of the side-edge type surface light emitting apparatus of FIG. 38 using the integral lower prism sheets 4A and 4B of FIG. 44 will now be explained in more detail. In this case, since the contact area between the lower prism sheets 4A and 4B is increased by the light transparent adhesive layer 6, it is difficult to simulate the optical characteristic of the apparatus. Therefore, the average illuminous intensity corresponding to the total luminous flux and the privacy effect of the modification of the side-edge type surface light emitting apparatus of FIG. 38 using the integral lower prism sheets 4A and 4B of FIG. 44 as compared with those of the side-edge type surface light emitting apparatus of FIG. 48 was experimentally obtained as illustrated in FIGS. 45A, 45B and 45C.

As illustrated in FIG. 45A, the average luminous intensity of 81 absolute luminous intensities in the modification of the side-edge type surface light emitting apparatus of FIG. 38 using the integral lower prism sheets 4A and 4B is about the same, i.e., 97.7% of the average luminous intensity of 81 absolute luminous intensities in the side-edge type surface light emitting apparatus of FIG. 48. Note that the total luminous flux in the side-edge type surface emitting apparatus of FIG. 38 is about the same, i.e., 99.9% of the total luminous flux in the side-edge type surface emitting apparatus of FIG. 48.

As illustrated in FIG. 45B, the average relative luminous intensities $I_1/I_0$ and $I_2/I_0$ at $\theta=\pm 35°$ and $\theta=45°$ of the traverse (Y-direction) operation in the modification of the side-edge type surface light emitting apparatus of FIG. 38 using the integral lower prism sheets A4 and 4B are improved by improvement ratios of 16.19% and 12.135%, respectively, as compared with the average relative luminous intensities $I_1/I_0$ and $I_2/I_0$ at $\theta=\pm 35°$ and $\theta=45°$ of the traverse (Y-direction) operation in the side-edge type surface light emitting apparatus of FIG. 48. Note that the average relative luminous intensities $I_1/I_0$ and $I_2/I_0$ at $\theta=\pm 35°$ and $\theta=\pm 45°$ of the traverse (Y-direction) operation in the side-edge type surface light emitting apparatus of FIG. 38 are improved by 0% and −19.5%, respectively, as compared with the average relative luminous intensities $I_1/I_0$ and $I_2/I_0$ at $\theta=\pm 35°$ and $\theta=\pm 45°$ of the traverse (Y-direction) operation in the side-edge type surface light emitting apparatus of FIG. 48. Thus, in view of the traverse (Y-direction) privacy effect, the modification of the side-edge type surface light emitting apparatus of FIG. 38 using the integral lower prism sheets 4A and 4B of FIG. 44 is also much improved as compared with the side-edge type surface light emitting apparatus of FIG. 38. Note that the improvement ratio is defined by {the traverse (Y-direction) relative luminous intensity value of FIG. 48}−(the corresponding traverse (Y-direction) relative luminous intensity of modified FIG. 38 or FIG. 38)}÷(the traverse (Y-direction) relative luminous intensity value of FIG. 48)× 100%.

As illustrated in FIG. 45C, the average relative luminous intensities $I_1/I_0$ and $I_2/I_0$ at $\theta=\pm 35°$ and $\theta=45°$ of the longitudinal (X-direction) operation in the modification of the side-edge type surface light emitting apparatus of FIG. 38 using the integral lower prism sheets A4 and 4B of FIG. 44 are improved by improvement ratios of 28.19% and 31.715%, respectively, as compared with the average relative luminous intensities $I_1/I_0$ and $I_2/I_0$ at $\theta=\pm 35°$ and $\theta=45°$ of the longitudinal (X-direction) operation in the side-edge type surface light emitting apparatus of FIG. 48. Note that the average relative luminous intensities $I_1/I_0$ and $I_2/I_0$ at $\theta=\pm 35°$ and $\theta=\pm 45°$ of the longitudinal (X-direction) operation in the side-edge type surface light emitting apparatus of FIG. 38 are improved by 27.42% and 26.09%, respectively, as compared with the average relative luminous intensities $I_1/I_0$ and $I_2/I_0$ at $\theta=\pm 35°$ and $\theta=\pm 45°$ of the longitudinal (X-direction) operation in the side-edge type surface light emitting apparatus of FIG. 48. Thus, in view of the traverse (Y-direction) privacy effect, the modification of the side-edge type surface light emitting apparatus of FIG. 38 using the integral lower prism sheets 4A and 4B of FIG. 44 is also much improved as compared with the side-edge type surface light emitting apparatus of FIG. 38. Note that the improvement ratio is defined by {the longitudinal (X-direction) relative luminous intensity value of FIG. 48}−(the corresponding longitudinal (X-direction) relative luminous intensity of modified FIG. 38 or FIG. 38)}÷(the longitudinal (X-direction) relative luminous intensity value of FIG. 48)× 100%.

Thus, in the modification of the side-edge type surface light emitting apparatus of FIG. 38 using the integral lower prism sheets 4A and 4B of FIG. 44, while the front luminous intensity is maintained as the same level in the side-edge type surface light emitting apparatus of FIG. 48, the privacy effect can be experimentally enhanced.

Next, the setting of the apical angles α A and α B of the triangular prisms 41A and 41B of the lower prism sheet 4A and 4B in the side-edge type surface light emitting apparatus of FIG. 38 will be explained with reference to FIGS. 46A, 46B 46C and 46D and FIGS. 47A, 47B, 47C and 47D.

FIGS. 46A, 46B, 46C and 46D are graphs showing the results of the simulated total luminous flux and the relative luminous intensities $I_1/I_0$ and $I_2/I_0$ when the apical angle α A of the triangular prisms 41A of the lower prism sheet 4A is 90°, 80°, 85°, 95°, 100°, 110°, 120° and 125 while the apical angle α B of the triangular prisms 41B of the lower prism sheet 4B is fixed at 90°. Also, in the triangular prisms 41A, if the width $W_D$ is definite, the smaller the apical angle α A, the smaller the height $H_D$ of the triangular prisms 41A. Therefore, in FIGS. 46A, 46B, 46C and 46D, only the apical angle α A is changed while the height $H_D$ is definite. Further, in FIGS. 46A, 46B, 46C and 46D, the larger the total luminous flux, the higher its plotted point, and the smaller the relative luminous intensity, the higher its plotted point. The plotted points of the total luminous flux are connected by a polygonal line, and the plotted points of the relative luminous intensity are connected by a polygonal line. In FIGS. 46A, 46B, 46C and 46D, the larger the total luminous flux, the larger the luminous intensity of the apparatus, and the smaller the relative luminous intensity, the higher the privacy effect. In other words, the higher the plotted points, the larger the total luminous flux and the higher the privacy effect.

First of all, in view of the backlight efficiency, the apical angles α A=100°, 110° and 125°, at which the total luminous flux is smaller than L90% (=12.24 lm) and is 90% of the total luminous flux L100%, which equals 13.57 lm when αA=α B=90°, are excluded. That is, α A=90°, 80°, 85°, 95° and 120°

Figure 46A:
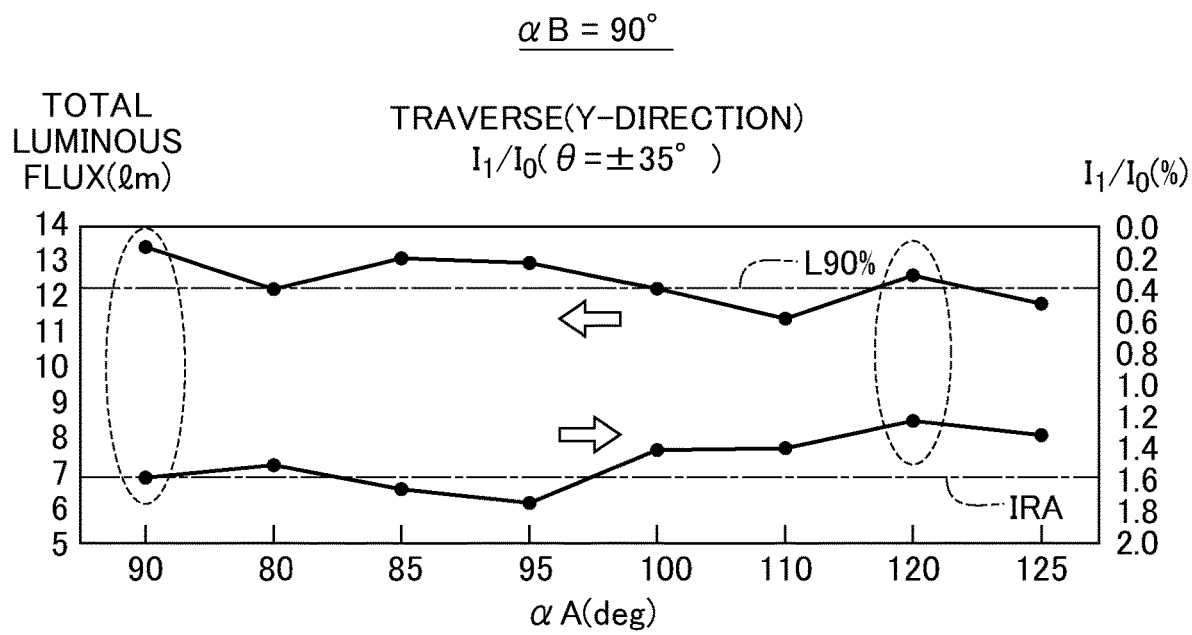
FIG. 46A is a graph showing the total luminous flux and the traverse (Y-direction) relative luminous intensity (privacy effect) $I_1/I_0$ of the side-edge type surface light emitting apparatus of FIG. 38 when the apical angle α A of the triangular prisms 41A of the lower prism sheet 4A is changed while the apical angle α B of the triangular prisms 41B of the lower prism sheet 4B is fixed at 90°.

Next, referring to FIG. 46A, in view of the privacy effect, the apical angles α A=85° and 95°, at which the traverse (X-direction) relative luminous intensity $I_1/I_0$ is larger than the traverse (X-direction) relative luminous intensity $I_1/I_0$ (=IRA) at α A=90° and α B=90°, are excluded. That is, α A=90°, 80°, 100°, 110°, 120° and 125°.

Also, in view of the total luminous flux, α A=90 and 120° is determined to be prominent. Particularly, α A=120° is determined to be most prominent.

Figure 46B:
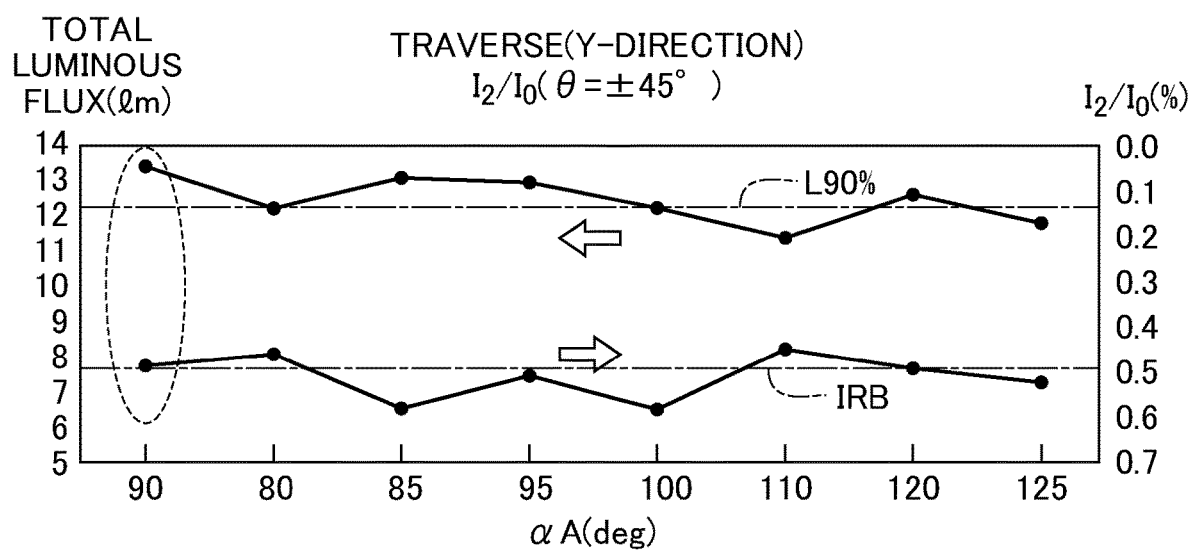
FIG. 46B is a graph showing the total luminous flux and the traverse (Y-direction) relative luminous intensity (privacy effect) $I_2/I_0$ of the side-edge type surface light emitting apparatus of FIG. 38 when the apical angle α A of the triangular prisms 41A of the lower prism sheet 4A is changed while the apical angle α B of the triangular prisms 41B of the lower prism sheet 4B is fixed at 90°.

Next, referring to FIG. 46B, in view of the privacy effect, the apical angles α A=85°, 95°, 100° and 125° at which the traverse (X-direction) relative luminous intensity $I_2/I_0$ is larger than the traverse (X-direction) relative luminous intensity $I_2/I_0$ (=IRB) at α A=90° and α B=90°, are excluded. That is, α A=90°, 80°, 110° and 120°.

Also, in view of the total luminous flux, α A=90 is determined to be prominent.

Figure 46C:
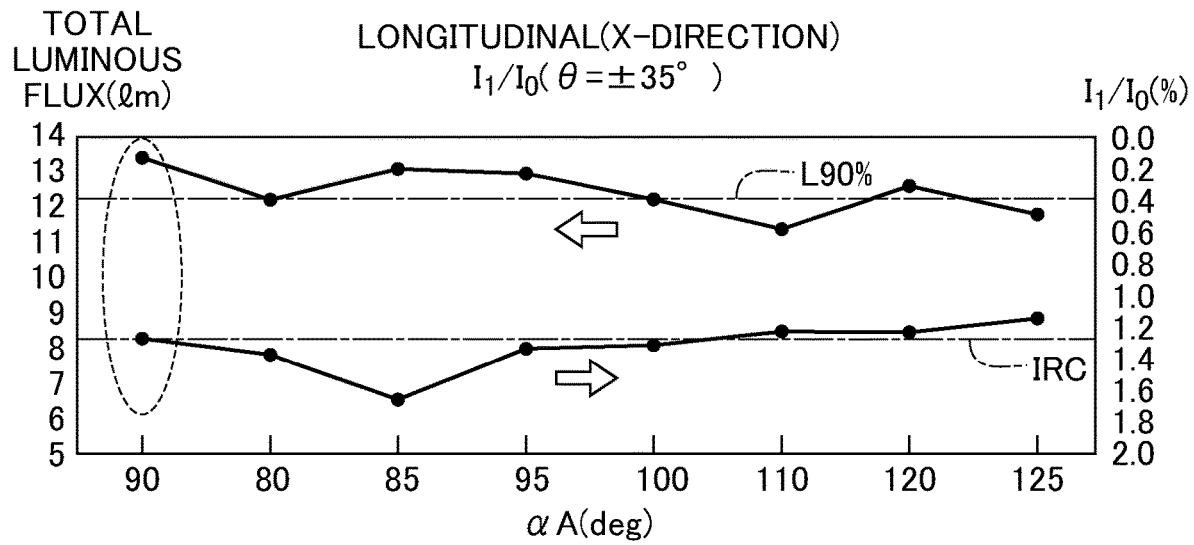
FIG. 46C is a graph showing the total luminous flux and the longitudinal (X-direction) relative luminous intensity (privacy effect) $I_1/I_0$ of the side-edge type surface light emitting apparatus of FIG. 38 when the apical angle α A of the triangular prisms 41A of the lower prism sheet 4A is changed while the apical angle α B of the triangular prisms 41B of the lower prism sheet 4B is fixed at 90°.

Next, referring to FIG. 46C, in view of the privacy effect, the apical angles α A=80°, 85°, 95° and 100° at which the longitudinal (Y-direction) relative luminous intensity $I_1/I_0$ is larger than the longitudinal (Y-direction) relative luminous intensity $I_1/I_0$ (=IRC) at α A=90° and α B=90°, are excluded. That is, α A=90°, 110°, 120° and 125°.

Also, in view of the total luminous flux, α A=90° is determined to be prominent.

Figure 46D:
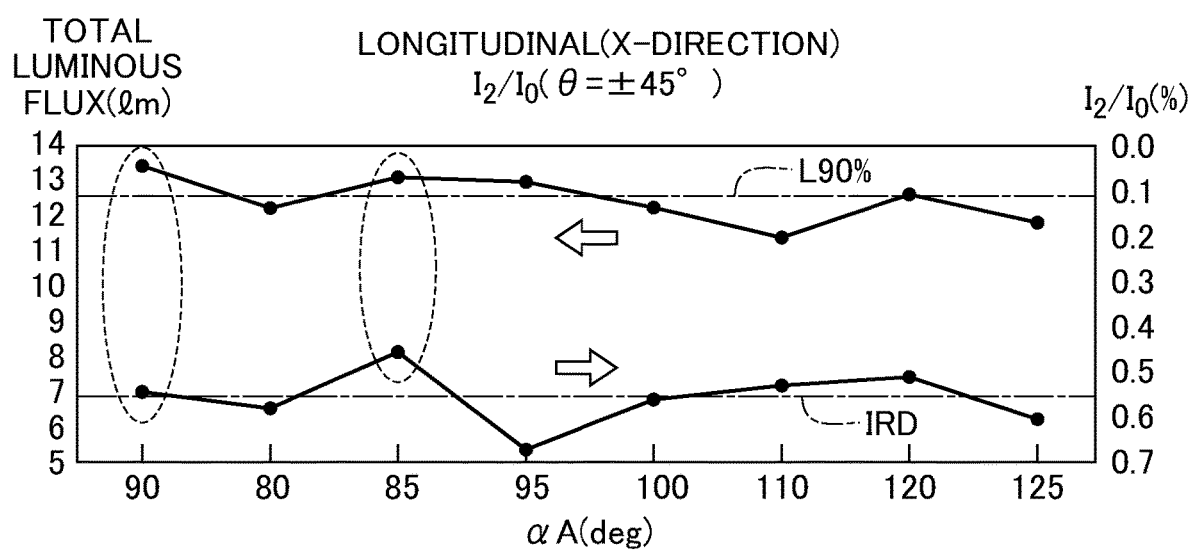
FIG. 46D is a graph showing the total luminous flux and the longitudinal (X-direction) relative luminous intensity (privacy effect) $I_2/I_0$ of the side-edge type surface light emitting apparatus of FIG. 38 when the apical angle α A of the triangular prisms 41A of the lower prism sheet 4A is changed while the apical angle α B of the triangular prisms 41B of the lower prism sheet 4B is fixed at 90°.

Next, referring to FIG. 46D, in view of the privacy effect, the apical angles α A=80°, 95°, 100°, 110°, 120° and 125° at which the longitudinal (Y-direction) relative luminous intensity $I_1/I_0$ is larger than the longitudinal (Y-direction) relative luminous intensity $I_1/I_0$ (=IRA) at α A=90° and α B=90°, are excluded. That is, α A=90° and 85°.

Also, in view of the total luminous flux, α A=90° and 85° is determined to be prominent. Particularly, α A=85° is determined to be most prominent.

Thus, when the apical angle α B of the triangular prisms 4B is fixed at 90°, the apical angle α A of the triangular prisms 4A is determined to be 90°, 85° and 120°, however, the apical angle α A of the triangular prisms 4A is best determined to be 90°. Thus, preferably, α A=85° to 95° centered at 90°.

FIGS. 47A, 47B, 47C and 47D are graphs showing the result of the simulated total luminous flux and the relative luminous intensities $I_1/I_0$ and $I_2/I_0$ when the apical angle α B of the triangular prisms 41B of the lower prism sheet 4B is 90°, 95°, 100°, 85°, 80°, 110° and 120° while the apical angle α A of the triangular prisms 41A of the lower prism sheet 4A is fixed at 90°. Also, in the triangular prisms 41B, if the width $W_D$ is definite, the smaller the apical angle α B, the larger the height $H_D$ of the triangular prisms 41B. Therefore, in FIGS. 47A, 47B, 47C and 47D, only the apical angle α B is changed while the height $H_D$ is definite. Further, in FIGS. 47A, 47B, 47C and 47D, the larger the total luminous flux, the higher its plotted point, and the smaller the relative luminous intensity, the higher its plotted point. The plotted points of the total luminous flux are connected by a polygonal line, and the plotted points of the relative luminous intensity are connected by a polygonal line. In FIGS. 47A, 47B, 47C and 77D, the larger the total luminous flux, the larger the luminous intensity of the apparatus, and the smaller the relative luminous intensity, the higher the privacy effect. In other words, the higher the plotted points, the larger the total luminous flux and the flux by all the apical angles 90°, 95°, 100°, 85°, 80°, 110° and 120° is 99.9 to 100.4 of the total luminous flux L100%, and none of the apical angles are excluded.

Figure 47A:
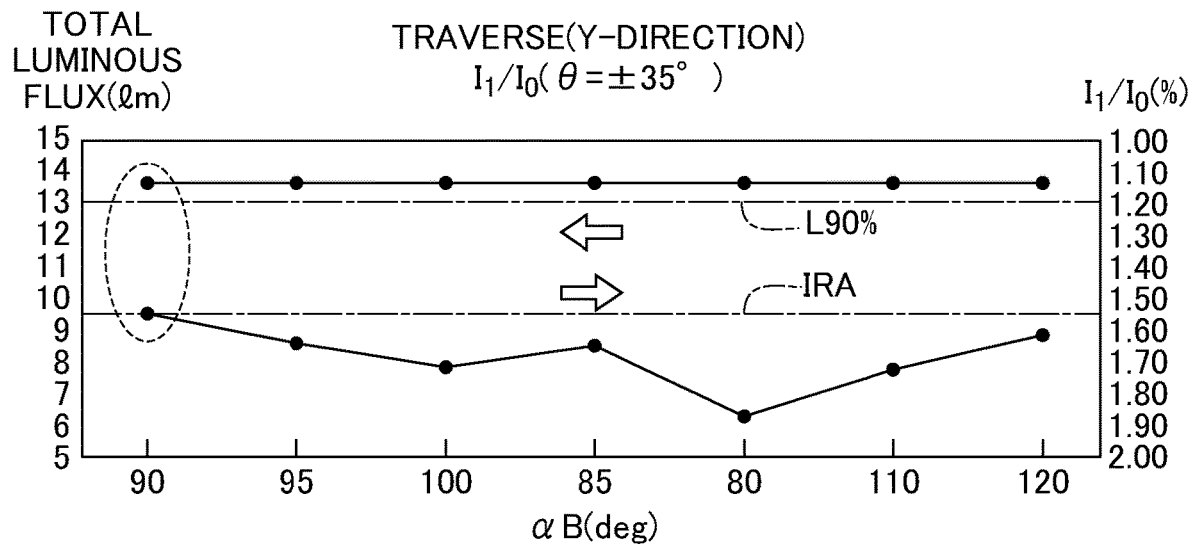
FIG. 47A is a graph showing the total luminous flux and the traverse (Y-direction) relative luminous intensity (privacy effect) $I_1/I_0$ of the side-edge type surface light emitting apparatus of FIG. 38 when the apical angle α B of the triangular prisms 41B of the lower prism sheet 4B is changed while the apical angle α A of the triangular prisms 41A of the lower prism sheet 4A is fixed at 90°.

Next, referring to FIG. 47A, in view of the privacy effect, the apical angles α B=95°, 100°, 85°, 80°, 110° and 120°, at which the traverse (X-direction) relative luminous intensity $I_1/I_0$ is larger than the traverse (X-direction) relative luminous intensity $I_1/I_0$ (=IRA) at α A=90° and α B=90°, are excluded. That is,

α A=90°.

Figure 47B:
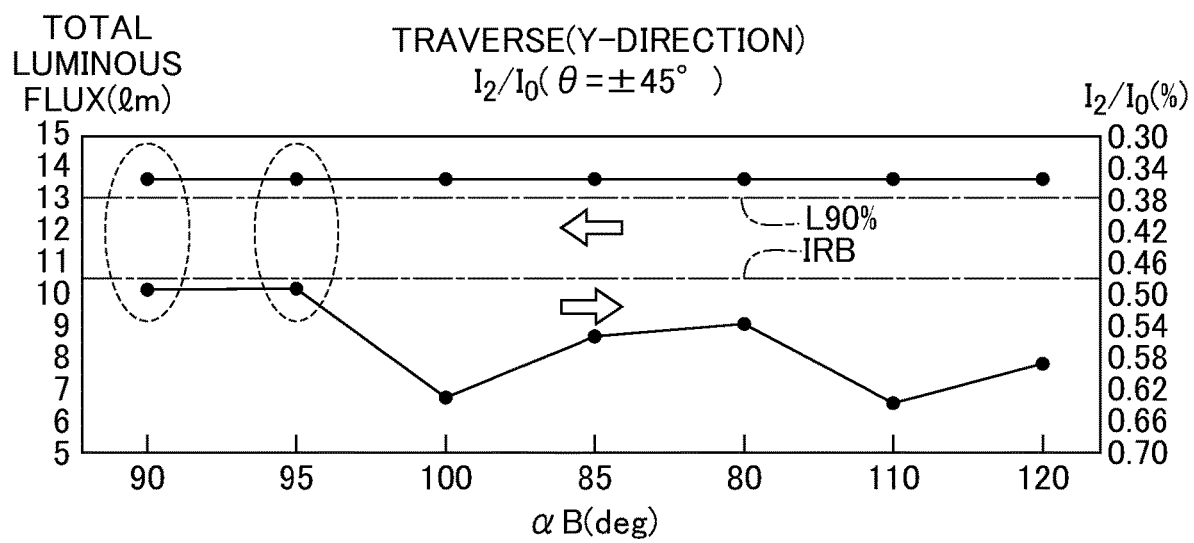
FIG. 47B is a graph showing the total luminous flux and the traverse (Y-direction) relative luminous intensity (privacy effect) $I_2/I_0$ of the side-edge type surface light emitting apparatus of FIG. 38 when the apical angle α B of the triangular prisms 41B of the lower prism sheet 4B is changed while the apical angle α A of the triangular prisms 41A of the lower prism sheet 4A is fixed at 90°.

Next, referring to FIG. 47B, in view of the privacy effect, the apical angles α B=100°, 85°, 80°, 110° and 120° at which the traverse (X-direction) relative luminous intensity $I_2/I_0$ is larger than the traverse (X-direction) relative luminous intensity $I_2/I_0$ (=IRB) at α A=90° and α B=90°, are excluded. That is, α B=90° and 95°.

Particularly, α B=95° is determined to be prominent.

Figure 47C:
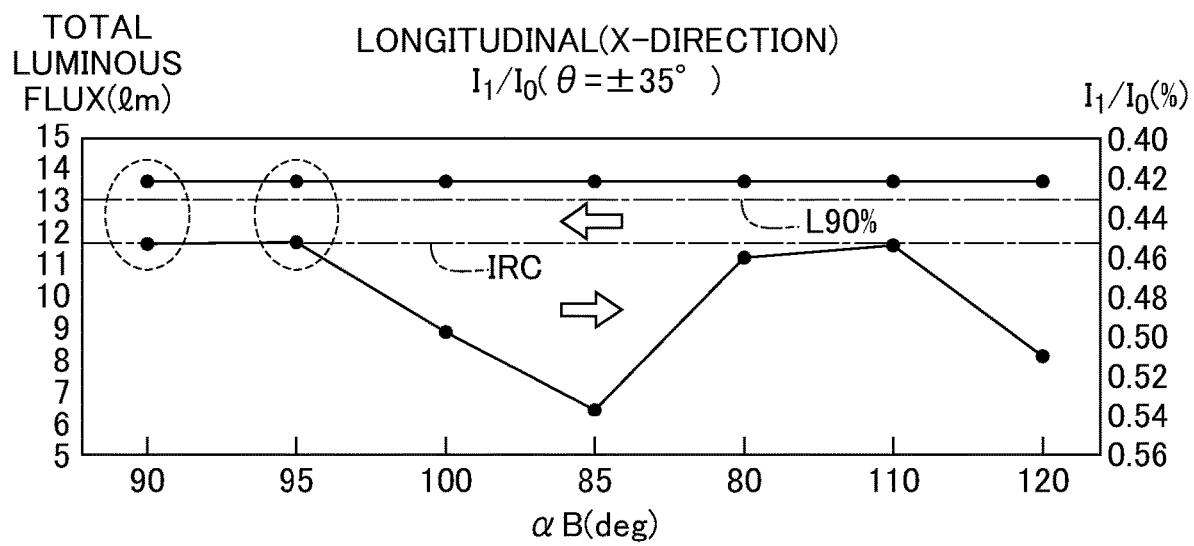
FIG. 47C is a graph showing the total luminous flux and the longitudinal (X-direction) relative luminous intensity (privacy effect) $I_1/I_0$ of the side-edge type surface light emitting apparatus of FIG. 38 when the apical angle α B of the triangular prisms 41B of the lower prism sheet 4B is changed while the apical angle α A of the triangular prisms 41A of the lower prism sheet 4A is fixed at 90°.

Next, referring to FIG. 47C, in view of the privacy effect, the apical angles α B=100°, 85°, 80°, 110° and 120° at which the longitudinal (Y-direction) relative luminous intensity $I_1/I_0$ is larger than the longitudinal (Y-direction) relative luminous intensity $I_1/I_0$ (=IRC) at α A=90° and α B=90°, are excluded. That is, α B=90° and 95°.

Also, in view of the total luminous flux, α B=90 is determined to be prominent.

Figure 47D:
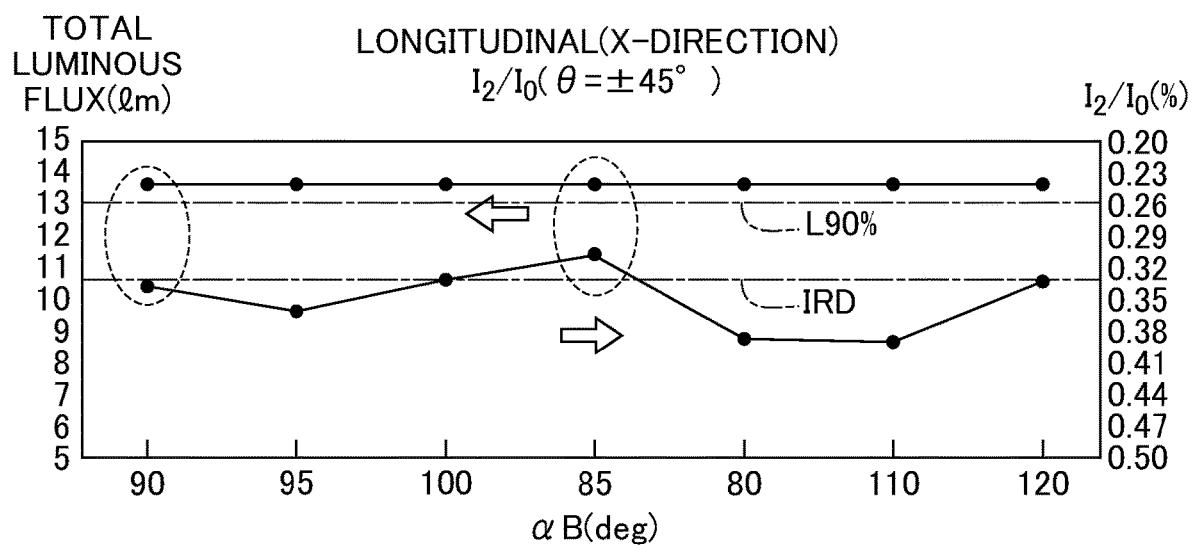
FIG. 47D is a graph showing the total luminous flux and the longitudinal (X-direction) relative luminous intensity (privacy effect) $I_2/I_0$ of the side-edge type surface light emitting apparatus of FIG. 38 when the apical angle α B of the triangular prisms 41B of the lower prism sheet 4B is changed while the apical angle α A of the triangular prisms 41A of the lower prism sheet 4A is fixed at 90°.

Next, referring to FIG. 47D, in view of the privacy effect, the apical angles α B=95°, 80° and 110° at which the longitudinal (Y-direction) relative luminous intensity $I_1/I_0$ is larger than the longitudinal (Y-direction) relative luminous intensity $I_1/I_0$ is larger than the longitudinal (Y-direction) relative luminous intensity $I_1/I_0$ (=IRA) at α A=90° and α B=90°, are excluded. That is, α B=90°, 100°, 85° and 120°.

Also, in view of the total luminous flux, α B=90 and 85° is determined to be prominent. Particularly, α B=85° is determined to be most prominent.

Thus, when the apical angle α A of the angular prisms 4A is fixed at 90°, the apical angle α B of the triangular prisms 4B is determined to be 90°, 95° and 85°, however, the apical angle α B of the angular prisms 4B is best determined to be 90°. Thus, preferably, α B=85° to 95° centered at 90°.

Note that, even in the side-edge type surface light emitting apparatuses of FIGS. 25 and 32, the apical angles α A and α B of the triangular prisms 41A and 42B of the lower prism sheets 4A and 4B are preferably 85° to 95°. In this case, the apical angle α A can be the same as the apical angle α B, or can be different from the apical angle α B. Also, each side of the triangular prisms 41A and 41B can be straight, curved or parabolic. Further, the ridges of the triangular prisms 41A and 41B are straight; however, the ridges can be something other than straight.

It will be apparent to those skilled in the art that various modifications and variations can be made in the presently disclosed subject matter without departing from the spirit or scope of the presently disclosed subject matter. Thus, it is intended that the presently disclosed subject matter covers the modifications and variations of the presently disclosed subject matter provided they come within the scope of the appended claims and their equivalents. All related or prior art references described above and in the Background section of the present specification are hereby incorporated in their entirety by reference.

The invention claimed is:

1. A side-edge type surface light emitting apparatus comprising:
   a light guide plate having a first light emitting surface on an upper side thereof, a light distribution controlling surface on a lower side thereof, and a light incident surface on sides of said first light emitting surface and said light distribution controlling surface;
   a light source disposed on said light incident surface of said light guide plate;
   an upper prism sheet disposed on the upper side of said light guide plate, said upper prism sheet having multiple first prisms on a lower side thereof opposing said first light emitting surface of said light guide plate and a second light emitting surface on an upper side thereof, said first prisms being in parallel with said light incident surface of said light plate;
   a first lower prism sheet disposed on the lower side of said light guide plate, said first lower prism sheet having multiple second prisms on an upper side thereof opposing said light distribution controlling surface of said light guide plate and a first flat surface on a lower side thereof, said second prisms being perpendicular to said light incident surface of said light guide plate;
   a light absorbing sheet opposing said first flat surface of said first lower prism sheet; and
   an air gap layer inserted between said first lower prism sheet and said light absorbing sheet.

2. A side-edge type surface light emitting apparatus comprising:
   a light guide plate having a first light emitting surface on an upper side thereof, a light distribution controlling surface on a lower side thereof, and a light incident surface on sides of said first light emitting surface and said light distribution controlling surface;
   a light source disposed on said light incident surface of said light guide plate;
   an upper prism sheet disposed on the upper side of said light guide plate, said upper prism sheet having multiple first prisms on a lower side thereof opposing said first light emitting surface of said light guide plate and a second light emitting surface on an upper side thereof, said first prisms being in parallel with said light incident surface of said light plate;
   a first lower prism sheet disposed on the lower side of said light guide plate, said first lower prism sheet having multiple second prisms on an upper side thereof opposing said light distribution controlling surface of said light guide plate and a first flat surface on a lower side thereof, said second prisms being perpendicular to said light incident surface of said light guide plate; and
   a second lower prism sheet having multiple third prisms on an upper side thereof contacting said first flat surface of said first lower prism sheet and a second flat surface on a lower side thereof, said third prisms being perpendicular to said light incident surface of said light guide plate.

3. The side-edge type surface light emitting apparatus as set forth in claim 2, wherein apical portions of said third prisms are rounded.

4. The side-edge type surface light emitting apparatus as set forth in claim 2, further comprising:
   a light absorbing sheet opposing said second flat surface of said second lower prism sheet; and
   an air gap layer inserted between said second lower prism sheet and said light absorbing sheet.

5. The side-edge type surface light emitting apparatus as set forth in claim 2, further comprising:
   a light absorbing sheet opposing said first flat surface of said second lower prism sheet, said light absorbing sheet being in contact with said second lower prism sheet.

6. The side-edge type surface light emitting apparatus as set forth in claim 2, further comprising:
   a light transparent adhesive layer disposed on said first flat surface of said first lower prism sheet, apical portions of said third prisms of said second lower prism sheet penetrating said light transparent adhesive layer so that said apical portions of said third prisms are in contact with said first flat surface of said first lower prism sheet.

7. The side-edge type surface light emitting apparatus as set forth in claim 2, wherein said first and second lower prism sheets are integrated by a light transparent adhesive layer.

8. The side-edge type surface light emitting apparatus as set forth in claim 1, wherein each of said first prisms comprises a triangular prism with an apical angle of 85° to 95°.

9. The side-edge type surface light emitting apparatus as set forth in claim 2, wherein each of said second prisms comprises a triangular prism with an apical angle of 85° to 95°.

10. A liquid crystal display unit comprising:
    said side-edge type surface light emitting apparatus as set forth in claim 1; and
    a liquid crystal panel disposed on said second light emitting surface of said upper prism sheet.

11. A liquid crystal display unit comprising:
said side-edge type surface light emitting apparatus as set forth in claim 2; and
a liquid crystal panel disposed on said second light emitting surface of said upper prism sheet.

12. The side-edge type surface light emitting apparatus as set forth in claim 2, wherein each of said first prisms comprises a triangular prism with an apical angle of 85° to 95°.

13. The side-edge type surface light emitting apparatus as set forth in claim 1, wherein each of said second prisms comprises a triangular prism with an apical angle of 85° to 95°.

14. The side-edge type surface light emitting apparatus as set forth in claim 2, wherein each of said third prisms comprises a triangular prism with an apical angle of 85° to 95°.

15. The side-edge type surface light emitting apparatus as set forth in claim 6, wherein a thickness of said light transparent adhesive layer is smaller than 20% of a height of said third prisms.

16. The side-edge type surface light emitting apparatus as set forth in claim 1, wherein a height of said second prisms is smaller than a height of said first prisms.

17. The side-edge type surface light emitting apparatus as set forth in claim 1, wherein said light guide plate comprises multiple upper-side prisms on first light emitting surface and each of said upper-side prisms has a cross section of an isosceles triangle having an apical angle of 80° to 110° with a rounded tip having a curvature radius of 0 to 25 μm.

18. The side-edge type surface light emitting apparatus as set forth in claim 1, wherein said light guide plate comprises multiple lower-side prisms on said light distribution controlling surface,
the farther from said light incident surface said lower-side prisms are located, the larger a width of said lower-side prisms.

19. The side-edge type surface light emitting apparatus as set forth in claim 1, wherein said upper prism sheet comprises a base section with said light emitting flat surface and said first prisms,
said base section comprising polyethylene terephthalate (PET), polycarbonate or polymethyl methacrylate,
said first prisms comprising ultraviolet curing hardening resin.

20. The side-edge type surface light emitting apparatus as set forth in claim 1, wherein said lower prism sheet comprises a base section with said light emitting flat surface and said second prisms,
said base section comprising polyethylene terephthalate (PET), polycarbonate or polymethyl methacrylate,
said first prisms comprising ultraviolet curing hardening resin.

* * * * *